United States Patent [19]
Karasawa et al.

[11] Patent Number: 5,739,797
[45] Date of Patent: Apr. 14, 1998

[54] HEAD-MOUNTED VIRTUAL IMAGE DISPLAY DEVICE HAVING SWITCHING MEANS ENABLING USER TO SELECT EYE TO VIEW IMAGE

[75] Inventors: Joji Karasawa; Hiroshi Kamakura; Shoichi Uchiyama; Hiroyuki Shindo; Takeshi Furihata; Masafumi Sakaguchi, all of Nagano-ken, Japan

[73] Assignee: Seiko Epson Corporation, Tokyo, Japan

[21] Appl. No.: 586,639

[22] PCT Filed: Jun. 22, 1995

[86] PCT No.: PCT/JP95/01250

§ 371 Date: Jan. 22, 1996

§ 102(e) Date: Jan. 22, 1996

[87] PCT Pub. No.: WO96/00406

PCT Pub. Date: Jan. 4, 1996

[30] Foreign Application Priority Data

| Jun. 23, 1994 | [JP] | Japan | 6-141968 |
| Jul. 5, 1994 | [JP] | Japan | 6-153742 |
| Oct. 14, 1994 | [JP] | Japan | 6-249868 |
| Nov. 9, 1994 | [JP] | Japan | 6-275386 |
| Nov. 11, 1994 | [JP] | Japan | 6-277504 |
| Nov. 28, 1994 | [JP] | Japan | 6-293051 |
| Dec. 1, 1994 | [JP] | Japan | 6-298440 |
| Jan. 18, 1995 | [JP] | Japan | 7-005860 |
| Jan. 18, 1995 | [JP] | Japan | 7-005861 |

[51] Int. Cl.⁶ .................................................. G02B 27/02
[52] U.S. Cl. .................................. 345/8; 359/630; 359/632
[58] Field of Search .......................... 345/8; 359/630, 359/632; 349/11

[56] References Cited

U.S. PATENT DOCUMENTS

| 4,805,988 | 2/1989 | Dones | 359/471 |
| 4,997,263 | 3/1991 | Cohen | 349/11 |
| 5,000,544 | 3/1991 | Staveley | 359/630 |
| 5,003,300 | 3/1991 | Wells | 345/8 |

(List continued on next page.)

FOREIGN PATENT DOCUMENTS

| 395570 | 10/1990 | European Pat. Off. |
| 62-21478 | 9/1987 | Japan. |
| 5-100192 | 4/1993 | Japan. |
| 5100192 | 7/1993 | Japan. |
| 6-78247 | 3/1994 | Japan. |
| 7-168120 | 7/1995 | Japan. |

OTHER PUBLICATIONS

Patent Abstracts of Japan, vol. 17, No. 448 (P–1594) JP5–100192 23 Apr. 1993.
Nikki Electronics, 2 Jan. 1984 pp. 158–177.

Primary Examiner—Raymond J. Bayerl
Assistant Examiner—Seth D. Vail
Attorney, Agent, or Firm—Ladas & Parry

[57] ABSTRACT

A head-mounted display device for enlarging an image formed by an image display element as a virtual image. The head-mounted display device according to this invention comprises a virtual image forming optical system (3) including an image display element (9) and a lens (11) for enlarging an image formed by the image display element (9); a device main body (1) that houses the image forming optical means (3); and a switching means mounted in the device main body (1) for holding the virtual image forming optical system (3) in such a way that the system (3) can be moved in the direction of the width of the eye and placing the virtual image forming optical system (3) in front of one of the user's eyes. The image display element (9) and the lens (11) are disposed so that the optical axis of the virtual image forming optical system (3) approximately aligns with the user's line of sight taken while he or she is looking horizontally. The switching means enables the user to easily select the eye to view the virtual image. Therefore, this invention provides high universality and shareability, and enables the user to freely switch the eye to view the virtual image.

20 Claims, 57 Drawing Sheets

U.S. PATENT DOCUMENTS

| | | | |
|---|---|---|---|
| 5,034,809 | 7/1991 | Katoh | 348/53 |
| 5,153,569 | 10/1992 | Kawamura et al. | 345/8 |
| 5,162,828 | 11/1992 | Furness et al. | 353/122 |
| 5,189,512 | 2/1993 | Cameron et al. | 345/8 X |
| 5,392,158 | 2/1995 | Tosaki | 359/630 X |
| 5,450,596 | 9/1995 | Felsenstein | 345/8 X |
| 5,469,185 | 11/1995 | Lebby et al. | 345/8 |

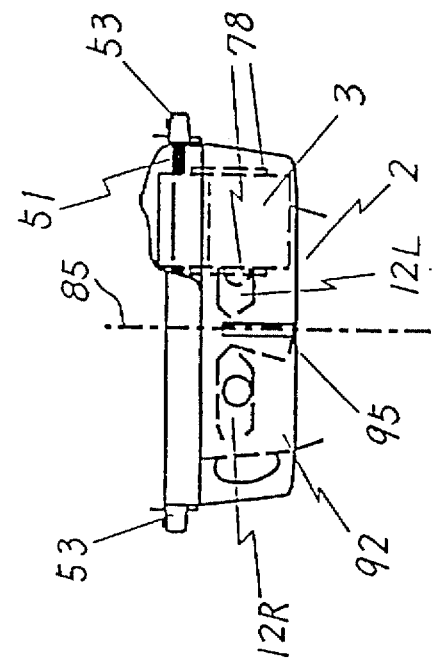
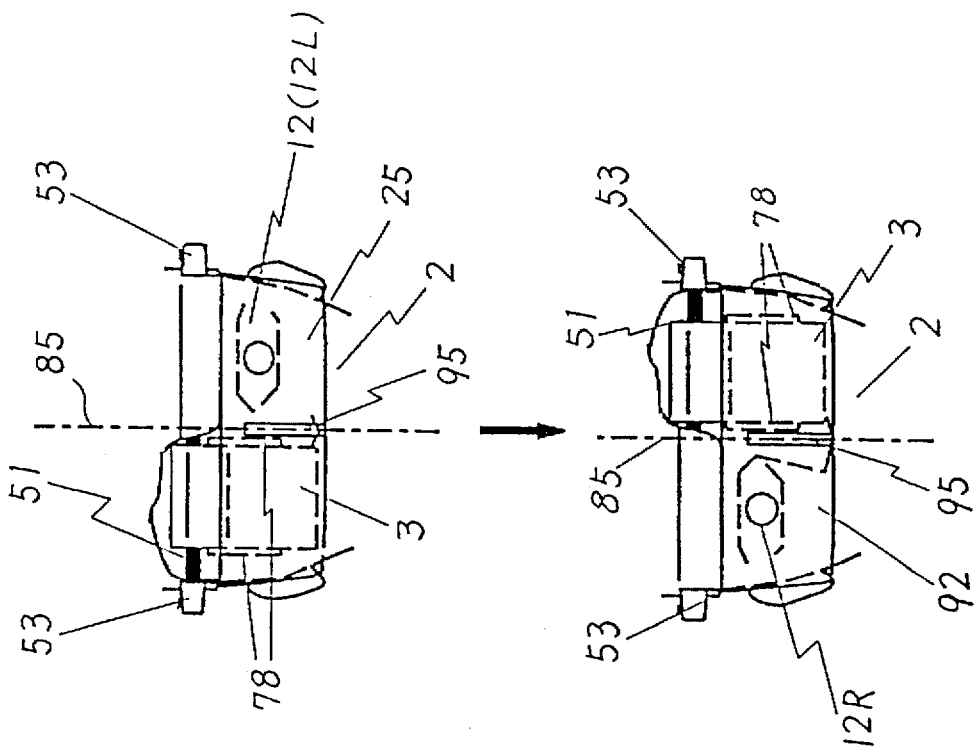
FIG. 31A
FIG. 31B

HEAD-MOUNTED VIRTUAL IMAGE DISPLAY DEVICE HAVING SWITCHING MEANS ENABLING USER TO SELECT EYE TO VIEW IMAGE

BACKGROUND OF THE INVENTION

1. Field of the Invention

The present invention relates to a head-mounted image display device that enlarges an image formed by an image display element and that displays it as a virtual image, and in particular, to such a device that is preferably used as a monitor for a data display in a personal computer or a word processor (hereinafter referred to as PC monitor).

2. Description of the Prior Art

Head-mounted display devices have been proposed to meet demand for increased portability of image and data displays. One typical example is a portable head-mounted display device described in detail in U.S. Pat. No. 5,162,828, which is commercially available under the name of "Virtual Vision SPORT". This device is configured to enlarge an image formed by a liquid crystal display element and to display it as a virtual image around the user's field of view. This device, however, is mainly used as an image display, and is not appropriate as a PC monitor for various reasons stated below.

A known head-mounted display device for displaying data is a spectacle-like head-mounted display device described in Published Unexamined Patent Application No. 5-100,192.

In general, a data display employing such a head-mounted display device is used with an input means such as a keyboard located near the user's hands, and the device is mounted on the user's head to enable the user to monitor input information above the input means. Materials and manuscripts required to input information must sometimes be placed around the input means, so the field of view must be available below the head-mounted display device in order to view the input means and these materials. The above head-mounted display device (U.S. Pat. No. 5,162,828), however, forms virtual images around the user's field of view, as described above, and in particular, commercially available such devices are configured to form virtual images below the user's field of view. The field of view for the virtual image thus overlaps the field of view for the input means, materials or manuscripts. These display devices are significantly inappropriate as PC monitors. In addition, continuing such an operation often results in a fatigue of the user caused by a continuous strain on the muscle responsible for rotating the eyeballs. In addition, the commercially available display devices force the user to look with the dominant eye, and the applicant's experiment described below indicates that this is also one of the reasons for the fatigue. Furthermore, in these devises, a partially transparent shading plate (a visor) defines the field of view for the external sight and all the fields of view are obtained through this plate. Thus, if such a device is used as a PC monitor, for example, the transmittance of extraneous light through the partially transparent shading plate obtained when the input means is viewed is the same as the transmittance of extraneous light seen by the other eye (the eye that does not see the virtual image) when the virtual image is viewed; the applicant's experiment also indicates that this is also one of the reasons for the fatigue.

To partially solve the above problem, the latter head-mounted display device (Published Unexamined Patent Application No. 5-100192) was proposed. This device includes a partially transparent shading plate that enables the user to view information displayed on a data display, as a virtual image in front of the user and to see an input means such as a keyboard below the device. This display device, however, is of what is called a binocular type in which both eyes view respective images from two liquid crystal display elements, and thus brings about a large weight, large costs, and a complicated structure and fails to provide high portability. Accordingly, this device does not meet the basic requirements of PC monitors. In addition, since it requires a binocular fusion when the virtual image is viewed, repetitive and alternative viewing of the virtual image and the input means results in a fatigue. Furthermore, this display device is unavoidably subject to the difference in brightness between the right and left liquid crystal display elements and the difference in image quality such as colors, and this is also one of the reasons for the fatigue. The front field of view is not sufficiently provided while this device is in use, resulting in a sense of oppression and low safety. As a result, the field of view is narrow except for the virtual image, and the user is hindered from performing operations smoothly while viewing materials or manuscripts. Furthermore, said invention pays no attention to the difference between the brightness of the monitor and the brightness on the input means. This causes the pupil to dilate or contract during repetitive and alternative viewing of the virtual image and the input means, being also one of the reasons for the fatigue.

BRIEF SUMMARY OF THE INVENTION

It is a primary objective of this invention to provide a head-mounted display device that provides high visibility and that reduces the user's fatigue.

It is another objective of this invention to provide a head-mounted display device that provides high workability and safety.

It is yet another objective of this invention to provide a head-mounted display device that functions as an ideal PC monitor that has a small weight and size, a simple structure, and high portability and that requires small costs.

A head-mounted display device according to a first aspect of this invention comprises a virtual image forming optical system including an image display element and an enlarging optical means for enlarging an image formed by the image display element as a virtual image; a device main body that houses the virtual image forming optical system; and a switching means mounted in the device main body for holding the virtual image forming optical system in such a way that the system can be moved in the direction of the width of user's eyes and placing the virtual image forming optical system in front of one of the user's eyes. The image display element and the enlarging optical means are disposed so that the optical axis of the virtual image forming optical system approximately aligns with the user's line of sight taken while he or she is looking horizontally.

In the first aspect of this invention, since the virtual image forming optical system is located in front of one of the user's eyes, and the optical axis formed by an virtual image and the user's eyes approximately aligns with the user's line of sight taken while he or she is looking horizontally, the user can view the virtual image in front of one of his or her eyes (for example, the antidominant eye). This maximizes the field of view for the eye that need not see the virtual image as well as that field of view for the eye to see the virtual image which is located below the field of view for the virtual image. As a result, this device enables the user to fully view an input means such as a keyboard and materials or manuscripts, and is suitable as a PC monitor and very safe.

It reduces the user's fatigue because it only requires the user to look in the horizontal direction that is the most natural direction of the line of sight. Furthermore, since this device is of a monocular type, the fatigue of the eyes is relieved compared to binocular type display devices with which the user's eyes are likely to be strained due to an binocular fusion or the difference between the right and left liquid crystal display elements in image quality. It also has a smaller weight and size, a simpler structure, and higher portability than binocular type display devices, and requires smaller costs.

The switching means enables the user to simply select the eye to see the virtual image, thereby providing high universality and shareability and enabling the user to freely switch the eye to see the virtual image.

The fatigue can be reduced even in a long time use by setting the angle in the horizontal direction between the optical axis formed by the virtual image and the user's eyes and a line perpendicular to the user's face, at $-1°$ to $+5°$, desirably, $0°$ to $1°$ when the convergent direction is assumed to be positive, because, in this case, the virtual image is seen in the direction in which the user can see the image most easily with one eye.

According to a second aspect of this invention, in the display device in accordance with the first aspect, the switching means comprises a shaft that is retained so as to rotate without affecting the device main body, that extends approximately in the direction of the width of the user's eyes, that is shaped like a screw, and that has the virtual image forming optical system spirally fitted thereto.

In the second aspect of this invention, the position of the virtual image forming optical system can be simply switched by rotating the switching means retained so as to rotate without affecting the device main body to move rightward or leftward the virtual image forming optical system spirally fitted to the screw of the switching means. Since the virtual image forming optical system is moved in the direction of the width of the user's eyes, the switching means also enables the width of the eyes to be adjusted. This prevents the unnatural movement of the eyeballs to eliminate strains on the eyes caused by the misalignment of the device with the width of the user's eyes, thereby simplifying adjustment mechanisms required for this purpose.

According to a third aspect of this invention, the display device in accordance with the first aspect further has a partially transparent shading plate provided in front of the eye that need not see an image enlarged by the enlarging optical means and having a transmittance of less than 1.

In the third aspect of this invention, since the partially transparent shading plate with a transmittance of less than 1 is disposed in front of the eye that need not see the virtual image, the front and downward fields of view can be maximized while the device is in use without failing to perceive the virtual image, thereby improving workability and safety. Workability and safety can further be improved by preferably using a partially transparent shading plate of a size equal to or larger than that of the field of view for the virtual image and by optimizing the transmittance of the shading plate. The optimal solution for the transmittance that minimizes the fatigue has been confirmed by the experiment described below.

According to a fourth aspect of this invention, the display device in accordance with the third aspect further has a control means for variably controlling the transmittance of the partially transparent shading plate according to the surrounding illuminance.

In the fourth aspect of this invention, the transmittance of the partially transparent shading plate is variably controlled according to the surrounding illuminance so as to optimize the transmittance. This improves workability and safety and minimizes the user's fatigue. The partially transparent shading plate comprises, for example, a polarizing element, a liquid crystal display element, or film-type liquid crystal display element comprised of a liquid crystal filled between deformable resins.

According to a fifth aspect of this invention, in the display device in accordance with the fourth aspect, that transmittance of the partially transparent shading plate is controlled so as to be 3% or less.

According to a sixth aspect of this invention, in the display device in accordance with the fourth aspect, the transmittance of the partially transparent shading plate is controlled so as to increase when the surrounding illuminance is 1001× or less.

In the fifth or sixth aspect of this invention, the transmittance of the partially transparent shading plate is optimized because it is controlled so as to be 3% or less and to increase when the surrounding illuminance is 1001× or less.

According to a seventh aspect of this invention, the display device in accordance with the third aspect further has a partially transparent shading plate with a transmittance of less than 1 which is provided in a space opposite to the user relative to the virtual image forming optical system to cover at least the overall movement area of the virtual image forming optical system.

In the seventh aspect of this invention, the partially transparent shading plate with a transmittance of less than 1 is located all over the image formation area in the movement area of the virtual image forming optical system, so the apparent contrast of the virtual image increases to improve visibility. In addition, the need to remove and install the partially transparent shading plate in switching the eye to see the virtual image is eliminated, thereby enabling the user to easily carry out the switching of the eye to see the virtual image and the adjustment of the eye width.

A compact head-mounted display device can be implemented by preferably disposing the partially transparent shading plate so as to incline about 45° relative to the vertical direction. Furthermore, applying anti-reflection processing to the user's side of the partially transparent shading plate can prevent reflection from the opposite side as well as the surrounding light from affecting the user's side of the shading plate, thereby enabling the implementation of a head-mounted display device with high visibility.

According to an eighth aspect of this invention, the display device in accordance with the first aspect further has a control means for providing variable control based on the surrounding brightness under the device main body and near the user's hands while the device is in use.

In the eighth aspect of this invention, the relationship between the brightness of the virtual image forming optical system and the brightness near the user's hands are optimized to reduce the difference of the brightness perceived by the user alternatively viewing the virtual image and looking near his or her hands, thereby minimizing his or her fatigue. This has also been confirmed by the experiment described below. For example, by disposing an illuminance (brightness) detection means below the device main body so as to sequentially detect the illuminance in front of the device and the brightness near the user's hands, the results of detection can be fed back to optimize the transmittance of the partially transparent shading plate and the brightness of the virtual image forming optical system, thereby enabling the automatic optimization of the transmittance of the shading plate and/or the brightness of the virtual image forming optical system. As a result, the device is always adjusted to its optimal conditions according to the user's operating conditions.

According to a ninth aspect of this invention, in the display device in accordance with the eighth aspect, the brightness of the virtual image forming optical system is controlled so as to be equal to the surrounding brightness.

In the ninth aspect of this invention, the brightness of the virtual image forming optical system is controlled so as to be equal to the surrounding brightness, so the difference of the brightness perceived by the user in alternatively checking the virtual image and viewing the surroundings is eliminated to minimize the user's fatigue.

According to a tenth aspect of this invention, in the display device in accordance with the eighth aspect, the brightness of the virtual image forming optical system is controlled so as to be approximately in proportion to the surrounding brightness.

In the tenth aspect of this invention, the brightness of the virtual image forming optical system is controlled so as to be approximately in proportion to the surrounding brightness, so the difference of the brightness perceived by the user in alternatively checking the virtual image and looking to the surroundings, for example, near his or her hands is eliminated to minimize the user's fatigue.

According to an eleventh aspect of this invention, the display device in accordance with the first aspect further has a diopter adjustment means for adjusting the position in which an enlarged virtual image from the image display element is formed.

In the eleventh aspect of this invention, if the head-mounted display device is used with a keyboard, before starting operations, the switching means is used to place an image formed by the image display element in a position in which the image does not two-dimensionally overlap the keyboard. The diopter adjustment means is also used to set the distance to the virtual image and the distance to the keyboard at the same value. This reduces the amount of the movement of the user's field of view between the image and the keyboard as well as the amount of accommodetion for the eyes, thereby enabling the provision of a head-mounted display device that provides high workability and that reduces a sense of fatigue and uncomfortableness.

According to a twelfth aspect of this invention, the display device in accordance with the eleventh aspect further has a diopter adjustment control on both sides of the virtual image forming optical system.

In the twelfth aspect of this invention, since the diopter adjustment control provided on both sides of the virtual image forming optical system can be used to adjust diopter, diopter can be adjusted easily whether the virtual image forming optical system is located in front of the right or left eye.

According to a thirteenth aspect of this invention, in the display device in accordance with the eleventh aspect, the conditions of the diopter adjustment means are shown so as to correspond to the position in which an virtual image is formed.

In the thirteenth aspect of this invention, since the conditions of the diopter adjustment means are shown so as to correspond to the position in which an enlarged virtual image is formed, the distance from the user's eyes to the keyboard and the distance from the user's eyes to the virtual image can be set at the same value easily. Such a setting reduces the user's fatigue during operations.

According to a fourteenth aspect of this invention, in the display device in accordance with the eleventh aspect, the position in which an enlarged virtual image is formed can be set stepwise at one of a plurality of positions using the diopter adjustment means.

In the fourteenth aspect of this invention, if, for example, the position in which a virtual image is formed is set stepwise at one of a plurality of positions so as to correspond to the range of the distance between the operator's eyes and the keyboard during a VDT operation, the operator can usually adjust diopter quickly and appropriately, and even when changing his or her posture during the operation, also carry out adequate adjustment using a fixed position as a reference with the head-mounted display device mounted on his or her head. In addition, if this position is set stepwise at a distance 50, 60, or 100 cm from the user's eyes, an image can be reliably formed in a position in which the VDT operator usually suffers a reduced fatigue.

According to a fifteenth aspect of this invention, the display device in accordance with the first aspect further has a holding means attached to the device main body via a rotatable hinge section for holding the device main body to the user's head.

In the fifteenth aspect of this invention, rotating the device main body around the hinge section enables the angle of depression to be adjusted to prevent the user from taking an unnatural line of sight, thereby reducing strains on the user's eyes. This also enables the correction of the vertical inclination of the holding means caused by the difference in the user's physique to prevent the positional deviation of the user's eyes from the virtual image forming optical system, thereby reducing strains on the user's eyes. The device main body can be folded toward the holding section around the hinge section to save space.

According to a sixteenth aspect of this invention, the display device in accordance with the first aspect further has a drive circuit fixed and disposed outside the movement space in the transverse movement area of the virtual image forming optical system for driving the image display element and a flexible printed circuit interposed between the image display element and the drive circuit for connecting them together.

In the sixteenth aspect of this invention, the drive circuit is fixed and disposed outside the movement space in the transverse movement area of the virtual image forming optical system, and the image display element and the drive circuit are connected together by the flexible printed circuit, the flexibility of the cable between the virtual image forming optical system and the device main body which is required when the optical system moves in response to the switching of the eye to see the virtual image can be improved to thereby enable the optical system to move reliably and smoothly. In addition, the virtual image forming optical system can be moved within a cable housing space with a small height, resulting in a reduced size of the overall device.

According to a seventeenth aspect of this invention, in the display device in accordance with the sixteenth aspect, the drive circuit has a detachable part disposed approximately in parallel with the direction of the width of the user's eyes for allowing the flexible printed circuit to be attached to or removed from the drive circuit in the direction that aligns with the lateral moving direction of the virtual image forming optical system, and further has a guide means disposed between the detachable part and the image display element for guiding the flexible printed circuit approximately perpendicular to the lateral moving direction of the virtual image forming optical system.

In the seventeenth aspect of this invention, the drive circuit is placed flatly outside the movement space in the lateral movement area of the virtual image forming optical system approximately in parallel with the direction of the width of the user's eyes, so the heat release effect of the drive circuit is enhanced to thereby improve the reliability of the circuit. In addition, placing the drive circuit flatly serves to increase the packaging area of the circuit substrate, thereby reducing the height of the circuit housing space to reduce the size of the overall device. Furthermore, stress on the detachable part and the flexible printed circuit is minimized because the flexible printed circuit can be attached to or removed from the drive circuit in the direction that aligns with the lateral moving direction of the virtual image forming optical system, and the guide means is disposed between the detachable part and the image display element for guiding the flexible printed circuit approximately perpendicular to the lateral moving direction of the virtual image forming optical system. Thus, the accidental removal of flexible printed circuit is prevented, thereby enabling the virtual image forming optical system to move transversely smoothly.

According to an eighteenth aspect of this invention, the display device in accordance with the first aspect further has a center determination support means provided in the approximate center of the device main body and used to determine whether or not the user's center line aligns with the center of the device main body while the device is in use.

In the eighteenth aspect of this invention, the center determination support means is provided in the approximate center of the device main body to enable the center to be always confirmed easily whether the virtual image forming optical system is located in front of the user's right or left eye. This constitution prevents the disalignment of the optical axis of the virtual image forming optical system with the user's line of sight which is caused by the misplacement of the device main body.

In the display device in accordance with the eighteenth aspect of this invention, by preferably disposing the partially transparent shading plate outside the virtual image forming optical system relative to the user so as to cover the fields of view of both eyes and providing a location mark at the center of the shading plate as the center determination support means, the user can use the location mark to determine the center despite defocusing, thereby suppressing the positional deviation of the display device regardless of the transverse movement of the virtual image forming optical system. Consequently, the positional deviation of the display device can be prevented without affecting the transverse movement of the virtual image forming optical system, thereby minimizing a fatigue caused by such a deviation.

According to a nineteenth aspect of this invention, the display device in accordance with the first aspect further has an antidominant eye determination support means provided in the approximate center of the device main body and used to determine the antidominant eye.

In the nineteenth aspect of this invention, by providing the antidominant eye determination support means in the approximate center of the width of the user's eyes in the device main body, the relative positions of a virtual image and an image of the antidominant eye determination support means which are determined by both eyes can be compared to the same relative positions which are determined by only one eye to see the virtual image, thereby enabling the easy determination of the eye to see the virtual image (the antidominant eye). That is, the applicant's experiment indicates that allowing the antidominant eye to see the virtual image a little more reduces the fatigue of the eyes compared to the use of the dominant eye. The antidominant eye determination support means can thus be used to determine which eye has a poorer eyesight. The virtual image forming optical system can then be moved so as to stand in front of the antidominant eye to allow this eye to view the virtual image.

In the device in accordance with the nineteenth aspect of this invention, by preferably disposing the partially transparent shading plate outside the virtual image forming optical system so as to cover the fields of view of both eyes and providing the antidominant eye determination support means at the approximate center of the width of the user's eye, the operator can easily determine the eye to see the virtual image, with the head-mounted display device mounted on his or her head. In this operation, the antidominant eye which is used to see the virtual image can be determined easily by comparing the relative positions of a virtual image or an external sight information and an image of the antidominant eye determination support means which are determined by both eyes, the same relative positions determined by only one of the eyes, and the same relative positions determined by the other eye, thereby preventing the eye to see the virtual image from being mistakenly selected. This also leads to the reduced fatigue of the operator's eyes.

According to a twentieth aspect of this invention, in a head-mounted display device in accordance with the first aspect, the virtual image forming optical system has a partially transparent mirror and further has a pupil detection means disposed in the position corresponding to the optical axis of the virtual image forming optical system for detecting the position of the user's pupil via the partially transparent mirror, and a means for informing the user of the misalignment of the virtual image forming optical system with the pupil in response to the output of the pupil detection means.

In the twentieth aspect of this invention, since the partially transparent mirror is provided in the virtual image forming optical system, and the pupil detection means is disposed via the partially transparent mirror in the position corresponding to the optical axis of the virtual image forming optical system, the position of the user's pupil can be detected without providing a larger device main body. In addition, the position of the user's pupil can be detected and the user can be informed of the misalignment of it with the virtual image forming optical system, if any, so the virtual image forming optical system can be positioned easily and accurately in front of the user's pupil. This reduces the fatigue of the eyes caused by the misplacement of the device.

Furthermore, if the means for informing the user of the misalignment of the user's pupil with the virtual image forming optical system employs, for example, sounds, the constitution of the display device is simplified, and the user can notice the misalignment more easily.

If the means for informing the user of the misalignment of the user's pupil with the virtual image forming optical system allows the image formed by the image display element to disappear for this purpose, misuse due to the misalignment can be prevented, and the user can notice the misuse without affecting surrounding people. As a result, strains on the eyes and uncomfortableness can be reduced, and the power of the device can be reduced. If this means displays overlapping images for this purpose, misuse due to the misalignment of the user's pupil with the virtual image forming optical system can be prevented, and the user can notice the misuse without affecting surrounding people, even under noisy conditions, or even if he or she is hard of hearing. Consequently, strains on the eyes and uncomfortableness can be reduced.

BRIEF DESCRIPTION OF THE DRAWINGS

FIG. 31A and 31B describe the movement of a virtual image forming optical system in the direction of the width of the eye according to a seventh embodiment of this invention;

DETAILED DESCRIPTION OF THE PREFERRED EMBODIMENTS

(Embodiment 1)

Figure 1:
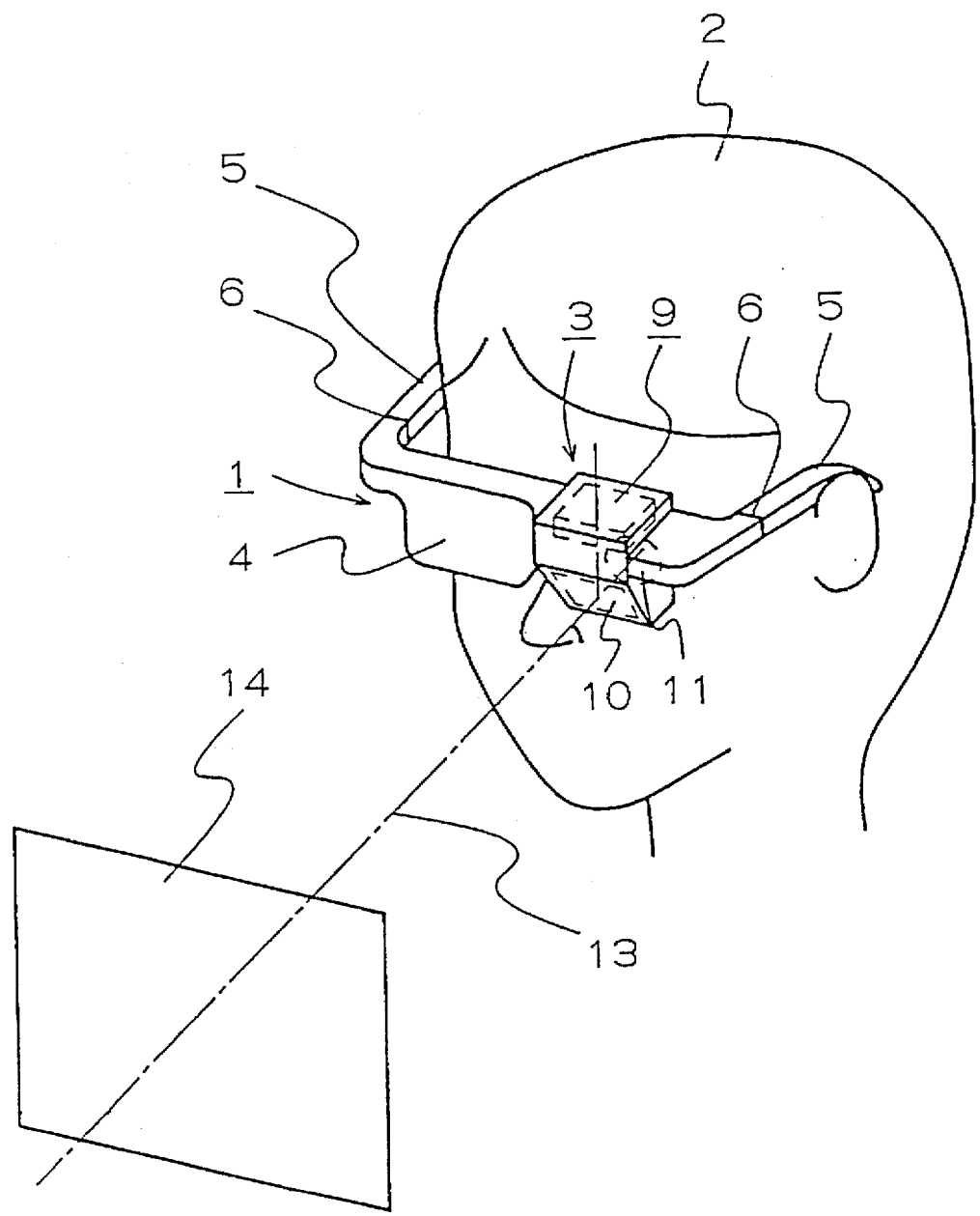
FIG. 1 is a model perspective view showing a first embodiment of this invention.
Figure 2:
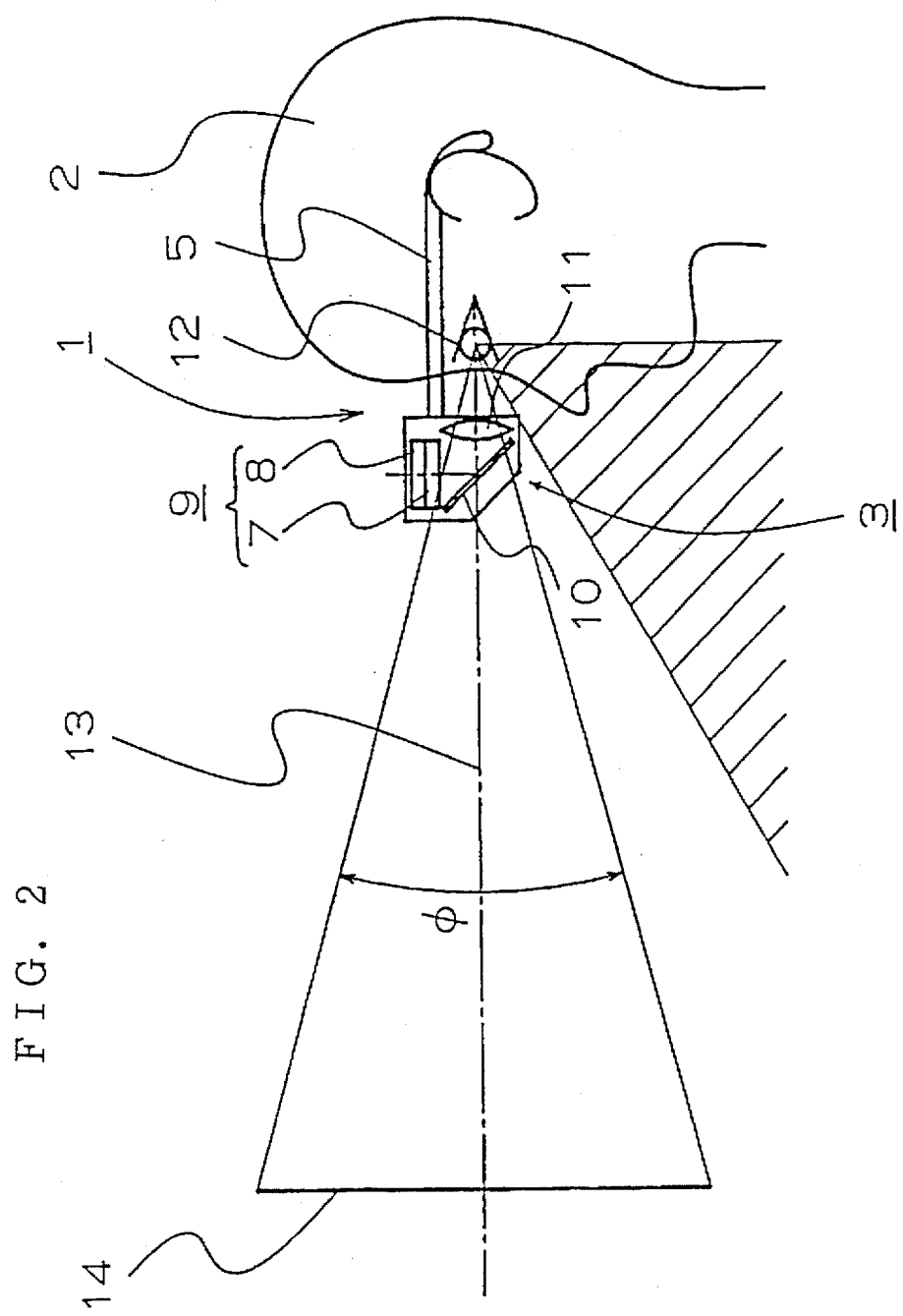
FIG. 2 is a model side view showing the first embodiment.

FIGS. 1 and 2 are model drawings showing a first embodiment indicating the principle of the operation of this invention. FIG. 1 is a perspective, and FIG. 2 is a side view. Both figures also show the position of an internal optical system.

In FIGS. 1 and 2, a device main body 1 has a vertical image forming optical system 3 in its front corresponding to one of the eyes of a user 2 and a partially transparent shading plate 4 in front of the other eye. The virtual image forming optical system 3 and the partially transparent shading plate 4 are connected together near the center of the user's face via the structure of the device, and connected to a right and left temples 5 foldably retained by a hinge 6, via the structure of the device extending rightward from the optical system and leftward from the shading plate. The device main body 1 is approximately shaped like spectacles, and supported by the user's ears and nose or the user's temples and nose so as to be retained on the user's head.

The virtual image forming optical system 3 comprises an image display element 9 consisting of a liquid crystal panel 7 and a back light 8 for irradiating the panel with light from behind, a reflection mirror 10, and a lens 11 that acts as an enlarging optical means. An image light formed and output by the image display element 9 has its path changed by the reflection mirror 10 and formed as an image within the user's eye 12 by the lens 11. In this case, if the image formation plane of the image display element 9 is located beyond the object-side focus of the lens 11 and near the lens 11 and the eye 12 is located near the image-side focus of the lens 11, then the image formation function of the lens 11 causes an enlarged virtual image 14 of screen information to be seen on the extension of the optical axis 13 of the virtual image forming optical system 3.

In these figures, the optical axis 13 of the virtual image forming optical system 3 is formed by a virtual image 14 and the user's eye 12, and approximately aligns with the user's line of sight when he or she looks to the horizontal direction, as is apparent from the side view shown in FIG. 2. In addition, the applicant's investigation indicates that if this device is used as a PC monitor, the horizontal angle of view of the virtual image is desirably 30° to 40°, which corresponds to a vertical angle of view φ of 23° to 30°. As shown in FIG. 2, a sufficient field of view for the external sight (the hatched area in the figure) is available below the field of view for the virtual image defined by the vertical angle of view φ in the vertical direction, although precisely speaking, this field of view is somewhat reduced by the virtual image forming optical system 3. According to this embodiment, the virtual image forming optical system 3 is disposed in front of only one eye, and the front field of view for the other eye is inherently available, so in operation, an input means such as a keyboard and materials or manuscripts can be sufficiently viewed. This display device is thus suitable as a PC monitor and very safe.

In addition, the user's fatigue is reduced because the user can continue viewing the virtual image in the horizontal direction that is the most natural direction of the line of sight. Furthermore, since this device is of a monocular type, the fatigue of the eyes is relieved compared to binocular type display devices with which the user's eyes are likely to be strained due to a binocular fusion or the difference in image quality between the right and left liquid crystal display elements. This device also has a smaller weight and size, a simpler structure, and higher portability than binocular type devices, and requires smaller costs.

Table 1 shows the results of subjective evaluation in which the fatigue of the dominant eye was compared to that of the antidominant eye (hereinafter called the "other eye") after each eye had been allowed to see a virtual image. Five subjects were used, and the virtual image forming optical system 3 shown in the first embodiment (FIGS. 1 and 2) was set in front of the dominant eye or the other eye to have them continue inputting data from a subject document for one hour. For both the dominant eye and the other eye, the partially transparent shading plate 4 was set in front of the eye that need not see the virtual image in such a way that the shading plate would provide full or partial shading. The results are also shown in the table. The degree of the fatigue was classified into four levels: A: no sense of fatigue; B: somewhat fatigued; C: substantially fatigued; D: painfully fatigued. White circles represent the number of subjects, while black circles represent the number of subjects who could not get over their fatigue after operation.

Table 1 indicates that compared to the dominant eye, allowing the other eye to view the virtual image reduces the fatigue regardless of form of the partially transparent shading plate 4. Allowing the other eye to view the virtual image not only serves to relieve the fatigue but also enables the implementation of a PC monitor that reduces strains on the operator's eyes.

TABLE 1

| Form | Fatigue | | | |
|---|---|---|---|---|
| | A | B | C | D |
| Other eye, full transmission | o | oo● | o | |
| Other eye, partial transmission | o | ooo | | |
| Other eye, shading | o | oo●● | | |
| Dominant eye, full transmission | | o● | o● | ● |
| Dominant eye, partial transmission | o | o | ●● | ● |
| Dominant eye, shading | | o | ●●● | ● |

As described above, Table 1 shows the relationship between the degree of fatigue and the transmittance of the partially transparent shading plate 4. This table indicates that when the other eye is allowed to view the virtual image, the sense of fatigue is weakest with partial transmission, second weakest with shading, and strongest with full transmission, although this is not clear in the case of the dominant eye. In particular, it is found that no fatigue is virtually sensed when the other eye is allowed to view the virtual image while simultaneously the partially transparent shading plate set to provide partial transmission is placed in front of the dominant eye. The inventor assumes that the reasons are as follows.

First, information from the dominant eye is dominant in the sense of sight. This is because the ophthalmic nerve from the dominant eye including the associated cerebral nerve has a higher sensitivity. The fatigue can thus be reduced by displaying on the other eye a virtual image with a high stimulus.

Second, the partially transparent shading plate set to provide partial transmission prevents a decrease in the contrast of the virtual image caused by the overlapping of the virtual image and the external sight to enable the virtual image to be seen clearly, thereby reducing the fatigue.

Third, when the virtual image and the input means such as a keyboard are repetitively and alternatively viewed, the use of the partially transparent shading plate set to provide partial transmission causes an appropriate amount of light to constantly enter the eye to see the virtual image through the shading plate, thereby reducing the dilation and contraction of the pupil to relieve the fatigue.

Fourth, the partially transparent shading plate set to provide partial transmission serves to provide a sufficient front field of view for the external sight to alleviate the sense of oppression while the device is in use and to present fields of view and safety appropriate for the operation, thereby contributing the reduction of the fatigue.

Consequently, the fatigue can be reduced and safety can be ensured by setting the virtual image forming optical system 3 in front of one of the user's eyes and disposing in front of the other eye the partially transparent shading plate 4 with a transmittance of less than 1.

Figure 3:
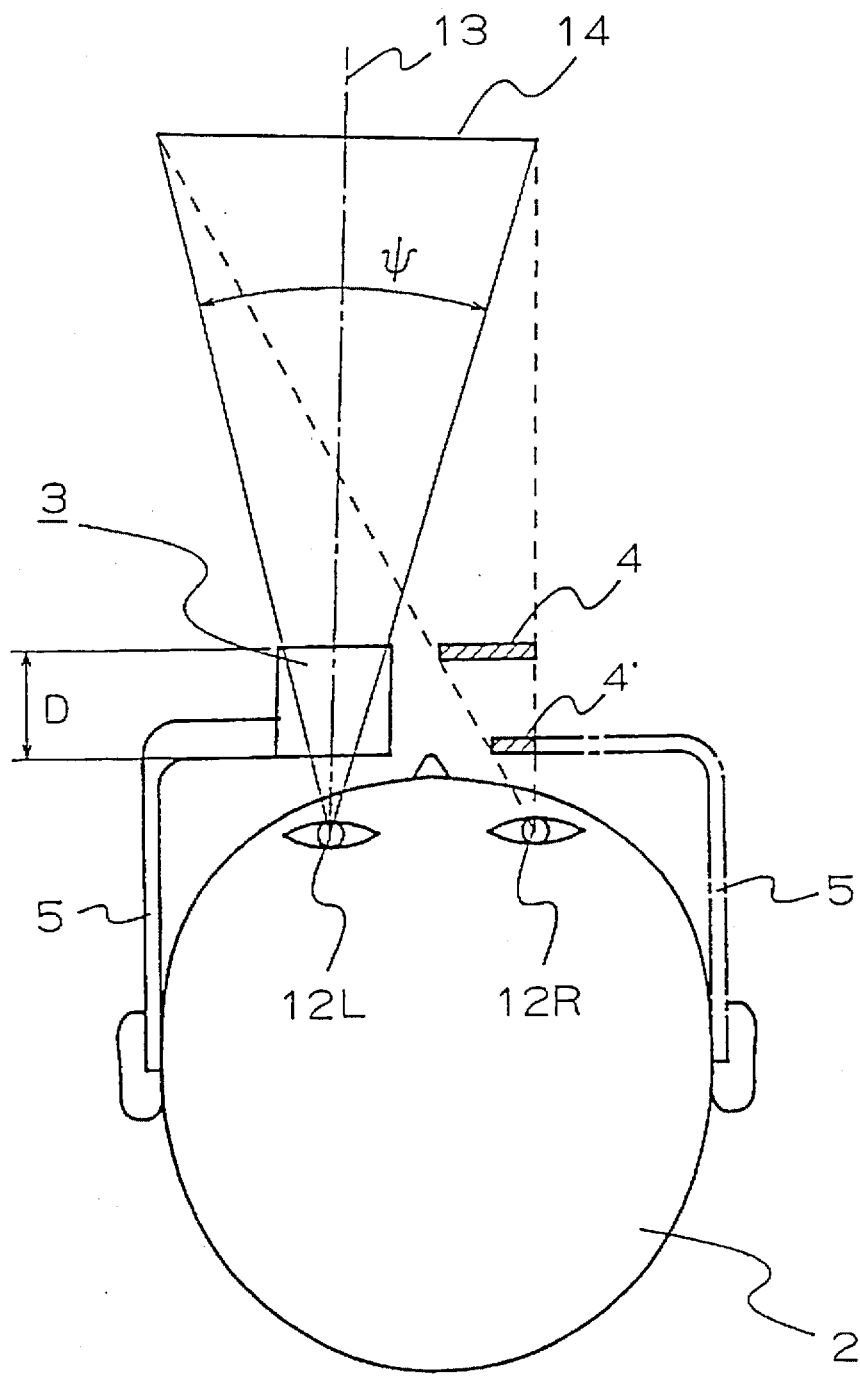
FIG. 3 is a model plan describing the position of a partially transparent shading plate according to the first embodiment.

FIG. 3 is a model plan describing the position of the partially transparent shading plate 4. The virtual image forming optical system 3 and the other basic components in this figure are the same as in FIGS. 1 and 2. The virtual image forming optical system 3 is located in front of one of the user's eyes (the left eye 12L in this figure), and the line of sight glance taken when the user 2 looks in the horizontal direction aligns with an optical path 13 formed by the eye 12L and a virtual image 14. The virtual image 14 is seen at a horizontal view of angle $\psi$. In this case, if the other eye 12R sees this virtual image 14 as a real image, then its horizontal field of view is the area shown by the broken line. This is also true in the vertical direction, and only the eye 12L actually sees the virtual image 14. A similar visual operation is probably performed in the user's brain. Thus, by setting in front of the eye 12R the partially transparent shading plate 4 (or 4') that is at least larger than the area shown by the broken line, the user 2 can see the virtual image 14 without overlapping the image 14 and an image of the external sight in the corresponding area. The partially transparent shading plate 4 (or 4') can be set in the position of 4 or 4' or any position between 4 and 4' as long as its longitudinal position is within the longitudinal thickness D of the virtual image forming optical system 3 relative to the user's face. Placing the partially transparent shading plate 4 within the thickness D of the virtual image forming optical system 3 also serves to reduce the size of the device main body.

Figure 4:
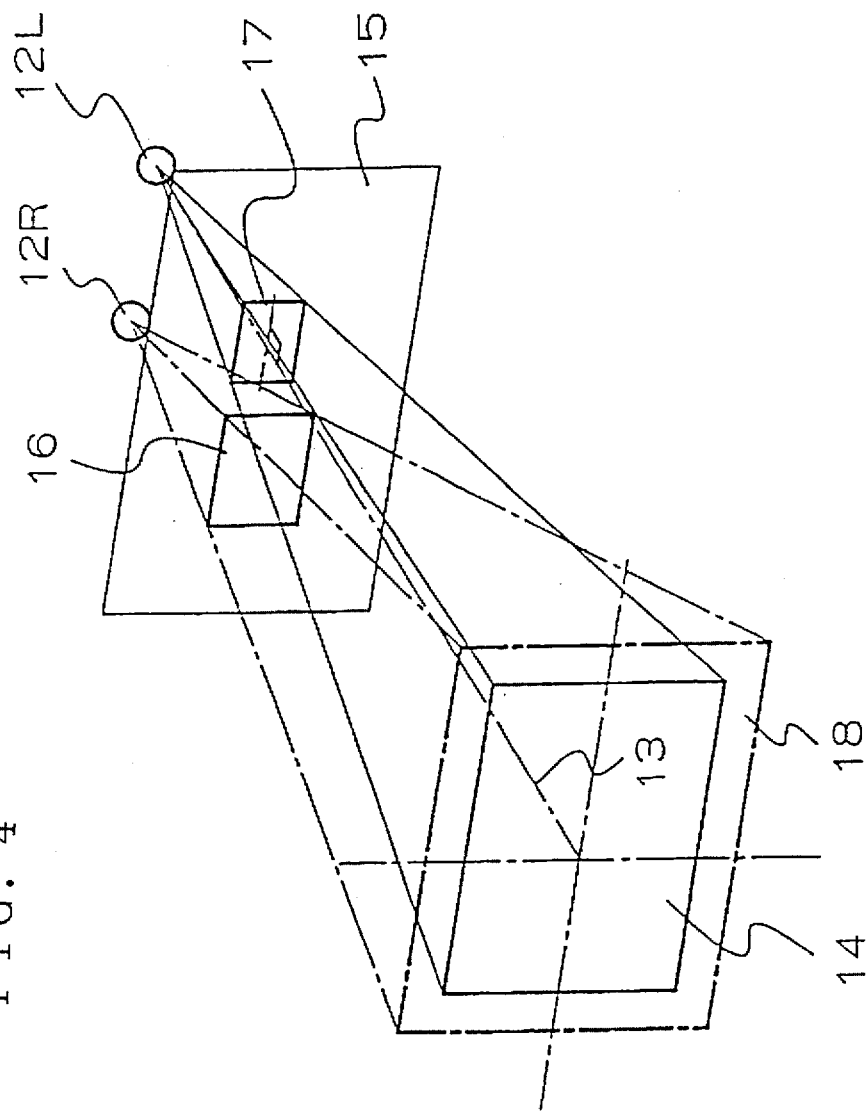
FIG. 4 is a model drawing describing the size of the partially transparent shading plate according to the first embodiment.

As described above, the longitudinal position of the partially transparent shading plate 4 (or 4') need change its size depending on its longitudinal position. FIG. 4 is a model drawing describing the size of the partially transparent shading plate 4. The partially transparent shading plate 4 (or 4') is not necessarily a plane but may be a curved plate. It is preferable that the shape of a surface 16 projected on an arbitrary surface 15 intersecting the optical axis 13 formed by the user's eye 12L and the virtual image 14 be approximately similar to that of a cross section 17 on the interesecting surface 15 of the field of view for the virtual image formed by the virtual image forming optical system 3 and that the area of the former is equal to or larger than that of the latter. If this condition is met, a dead angle zone 18 for the eye 12R can be formed around the virtual image 14 by the projected surface 16 (that is, the partially transparent shading plate), as shown in FIG. 4. The user 2 can thus view the virtual image 14 without overlapping the image 14 and the external image in the corresponding area.

As described above, by disposing the partially transparent shading plate with a transmittance of less than 1 in front of the eye that need not see the virtual image, and setting the size of the shading plate so as to be equal to or larger than that of the field of view for the virtual image, for optimization, the front and downward fields of view can be maximized with the visibility of the virtual image maintained, thereby improving workability and safety.

Figure 5:
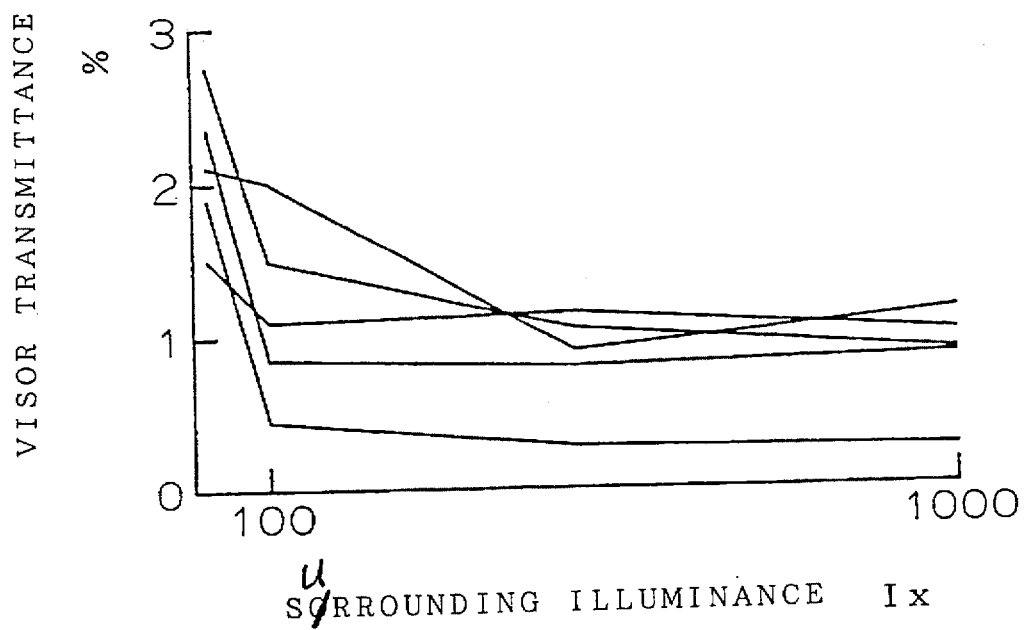
FIG. 5 shows the results of experiment on the relationship between the surrounding illuminance and the transmittance of the partially transparent shading plate.

FIG. 5 shows the results of experiment on the relationship between the surrounding illuminance and the transmittance of the partially transparent shading plate. In this experiment, the surrounding illuminance on the outer surface of the partially transparent shading plate was varied while the five subjects attempted to subjectively optimize the transmittance of the partially transparent shading plate. The optimized transmittance may serve to balance the above conditions, that is, to prevent a decrease in the contrast of the virtual image, to reduce the dilation and contraction of the pupil, to relieve the sense of oppression while the device is in use, and to provide fields of view and safety required for the operation. The surrounding illuminance expressed on the horizontal axis ranges from the illuminance measured when the lights are put out in an airplane to the illuminance measured at the window in a room was assumed.

Although a surrounding illuminance of 10001× or higher is expected, the transmittance of the partially transparent shading plate tends to be saturated at a surrounding illuminance of about 500lx, so the transmittance of the shading plate is preferably 3% or less regardless of surrounding illuminance. In addition, if the surrounding illuminance is 100lx or lower, the transmittance of the partially transparent shading plate should be higher than when the surrounding illuminance is higher than this value. This is also because doing so enables the above conditions to be met.

Methods for controlling the transmittance of the partially transparent shading plate include the use of a partially transparent shading plate comprising a polarizing element or a liquid crystal display element with a polarizing element. In the former case, two polarizing sheets may be rotatably placed on each other, and the angle between their transmission axes may then be rotationally adjusted to control the transmittance. The partially transparent shading plate in this case has a variable transmittance and is most inexpensive. In the latter case, the partially transparent shading plate comprises a liquid crystal display element consisting of liquid crystal filled between glass substrates, and, in particular, a film-type liquid crystal display element consisting of liquid crystal filled between deformable resins is preferable. In this case, the partially transparent shading plate can be formed so as to have an arbitrary curvature, resulting in the increased degree of freedom in design. In either case, the use of a liquid crystal display element enables the construction of a partially transparent shading plate that is inexpensive, that can be electrically controlled, and that has a variable transmittance.

Figure 6:
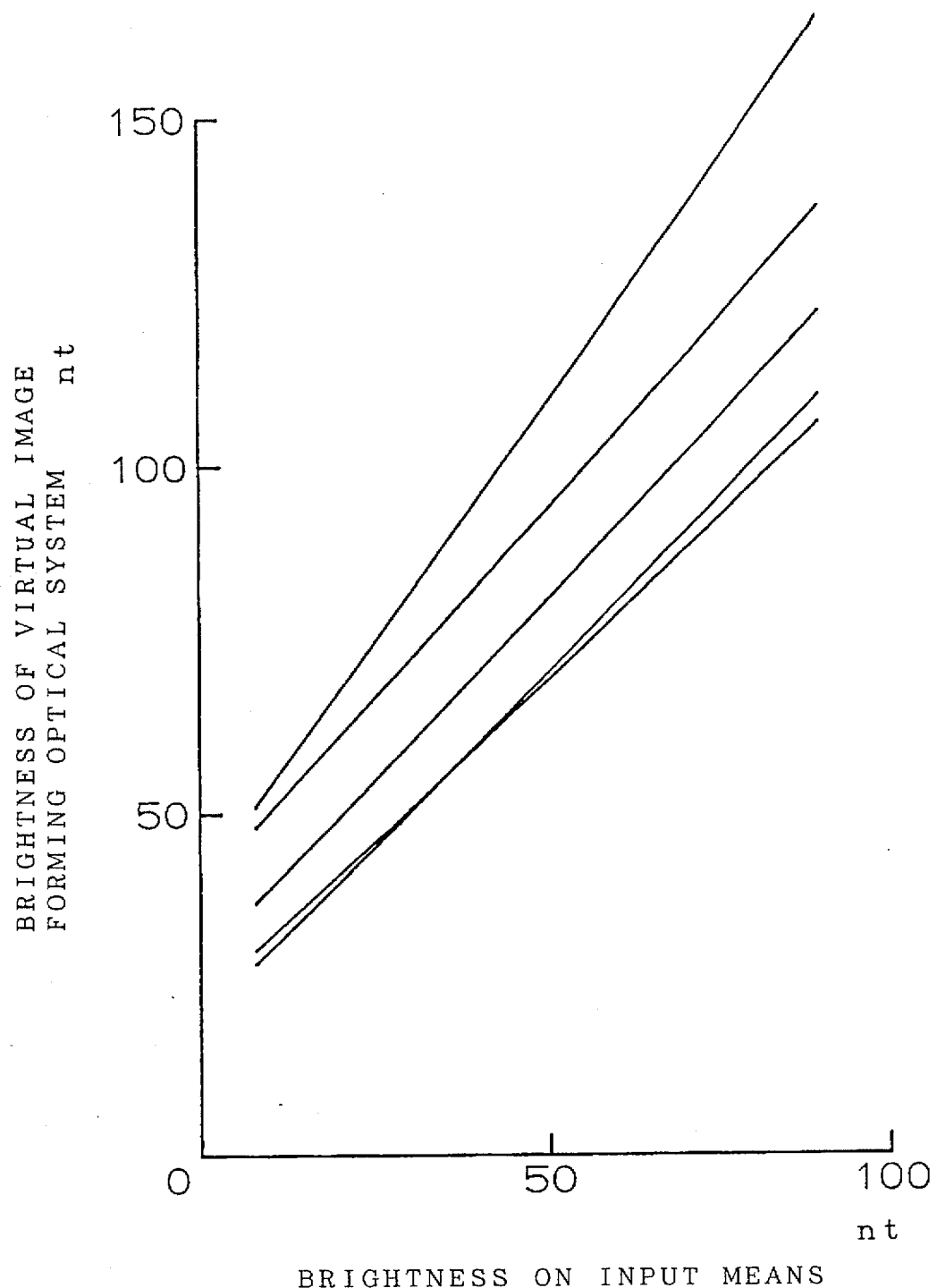
FIG. 6 shows the results of experiment on the relationship between the surrounding illuminance and the brightness of the transmittance of a virtual image forming optical system.

FIG. 6 shows the results of experiment on the relationship between the surrounding brightness (liminance) and the brightness (luminance) of the virtual image forming optical system. In this experiment, the illuminance around the user was varied, that is, the surrounding brightness near the user's hands below the device main body was varied while the five subjects attempted to subjectively optimize the brightness of the virtual image forming optical system. The optimized brightness may enable the user to see the virtual image most clearly when repetitively and alternatively looking at the virtual image and around the user's hands. The transmittance of the partially transparent shading plate was fixed at 3% according to the results of the experiment in FIG. 5. The surrounding illuminance on the user was set at the same value as in the experiment in FIG. 5, and the brightness near the user's hands was measured.

FIG. 6 clearly shows that the surrounding brightness is in proportion to the brightness of the virtual image forming optical system although different subjects revealed somewhat different inclinations and absolute values. When the diameters of the subjects' pupils were calculated using this brightness data, it was found that they remained almost unchanged even when the subject was alternatively looking at the virtual image and around his or her hands. This of course means that the brightness of the virtual image forming optical system is approximately the same as the brightness near the subject's hands, and it is expected that the data in FIG. 6 ideally forms a straight line in which Y=X. Of course, when an input means such as a keyboard which must be viewed by the user during the operation is placed near the user's hands during the operation, the brightness near the user's hands is equal to the brightness on the input means, so the optimum condition in this case is that the brightness of the virtual image forming optical system is approximately the same as the brightness on the input means. This is because the difference between the shading of the virtual image forming optical system and the shading near the user's hands or on the input means is minimized while the user is repetitively and alternatively looking at the virtual image and around his or her hands, thereby minimizing the dilation and contraction of the user's pupil to further minimize the fatigue of the muscles responsible for dilating or contracting the pupil.

Methods for controlling the brightness of the virtual image forming optical system include the use of a polarizing element, a liquid crystal display element with a polarizing element, or an electrochromic element, and the variation of the brightness of an illumination means in the image display element. The former two methods involve polarization, and if an image light from the image display element is linearly polarized to the liquid crystal display element, the enlarging optical means in the subsequent stage may disturb the polarized light. Thus, this means is preferably installed between the image display element and the enlarging optical means or between the liquid crystal panel and the back light. If the polarizing element is used, two polarizing sheets may be rotatably placed on each other, and the angle between their transmission axes may be rotationally adjusted to control the transmittance, as described in the experiment in FIG. 5. If an image display element subject to linear polarization as described above is used, only the rotation of a single polarization is required. In any case, this is most inexpensive method for adjusting brightness. If the liquid crystal display element is used, the degree of freedom in design is improved by using a liquid crystal display element consisting of liquid crystal filled between glass substrates, or in particular, a film-type liquid crystal display element consisting of liquid crystal filled between deformable resins, as in the experiment in FIG. 5. An advantage of this method is that an electrically controlled brightness adjustment mechanism can be constructed inexpensively. If the electrochromic element is used, the installation position is not particularly limited, and a polarizing element is not required as in the former two methods. A bright virtual image forming optical system with a high degree of freedom in design and the highest transmittance can be implemented, and a wide range of the transmittance is available. If the variation of the brightness of the illumination means in the image display element is used, a control circuit is configured as specifically described in the following embodiment. To achieve the same purpose, however, the voltage of a drive circuit for the illumination means which is part of the control circuit may also be manually controlled.

Figure 7:
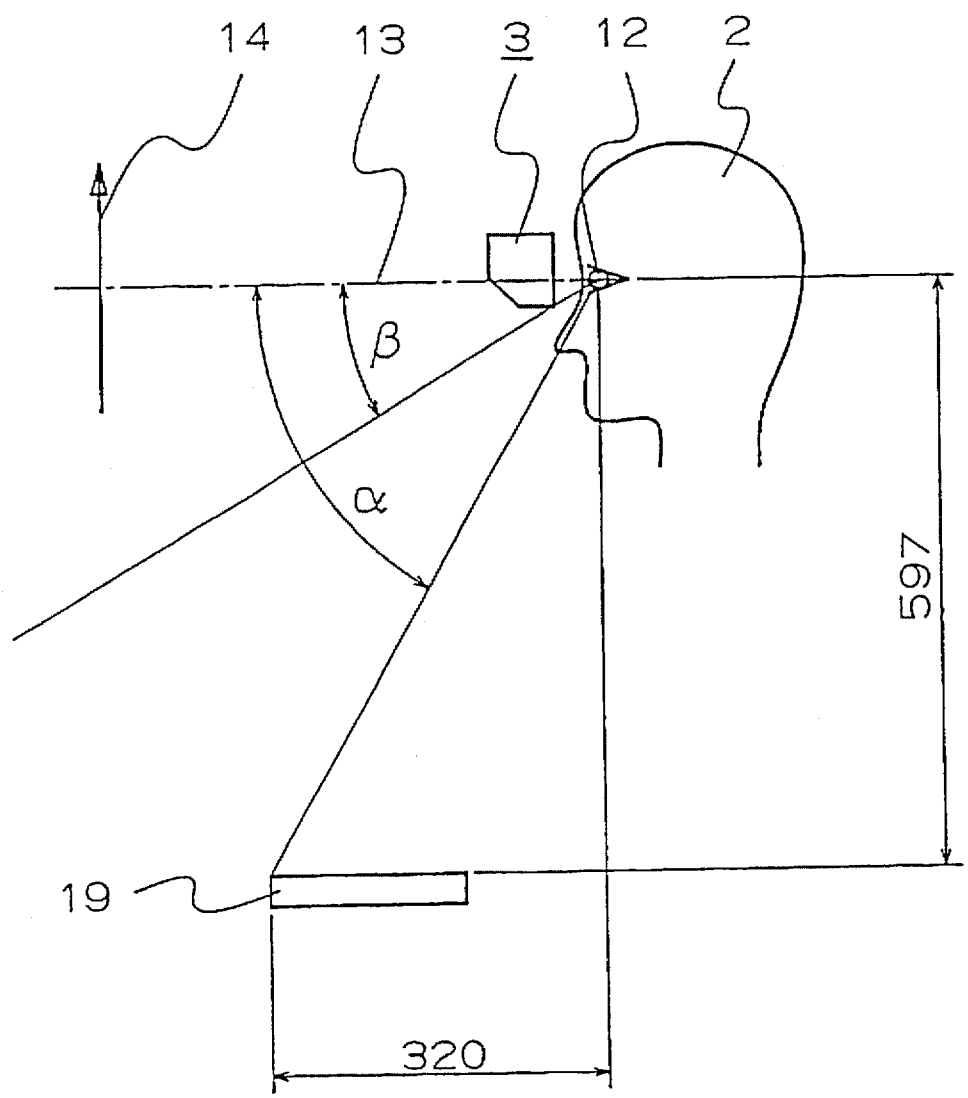
FIG. 7 describes the virtual image forming optical system in the first embodiment and an input means located below the optical system.

FIG. 7 shows the virtual image forming optical system and the input means located below. As described above, the virtual image forming optical system 3 is disposed in front of the user's face so that the optical axis 13 formed by the user's eye 12 and the virtual image 14 approximately aligns with the line of sight taken by the user 2 when looking in the horizontal direction. The input means 19 such as a keyboard is located near the user's hands.

This figure shows the ergonomically recommended positional relationship between the user 2 and the input means 19 during a VDT operation. That is, the distance from the eye 12 to the tip of the input means 19 is about 320 mm and the distance from the surface of the input means 19 and the eye 12 is about 597 mm that is the maximum value for the male. In this case, the maximum angle of depression α when the eye 12 sees the tip of the input means 19 can be determined to be about 62°. The user's front field of view depends on the virtual image forming optical system 3, and the downward field of view is limited by the bottom of the structure of the virtual image forming optical system 3. In other words, by setting at 62° or less in the vertical direction the angle β between the upper end of the field of view below the structure of the virtual image forming optical system 3 and the line of sight taken by the user 2 when looking in the horizontal direction, the user 2 can view the input means 19 without being disturbed by the structure of the virtual image forming optical system 3. The above constitution enables the input means such as a keyboard to be placed in an ergonomically optimum position to reduce the fatigue caused by the input operation.

Figure 8:
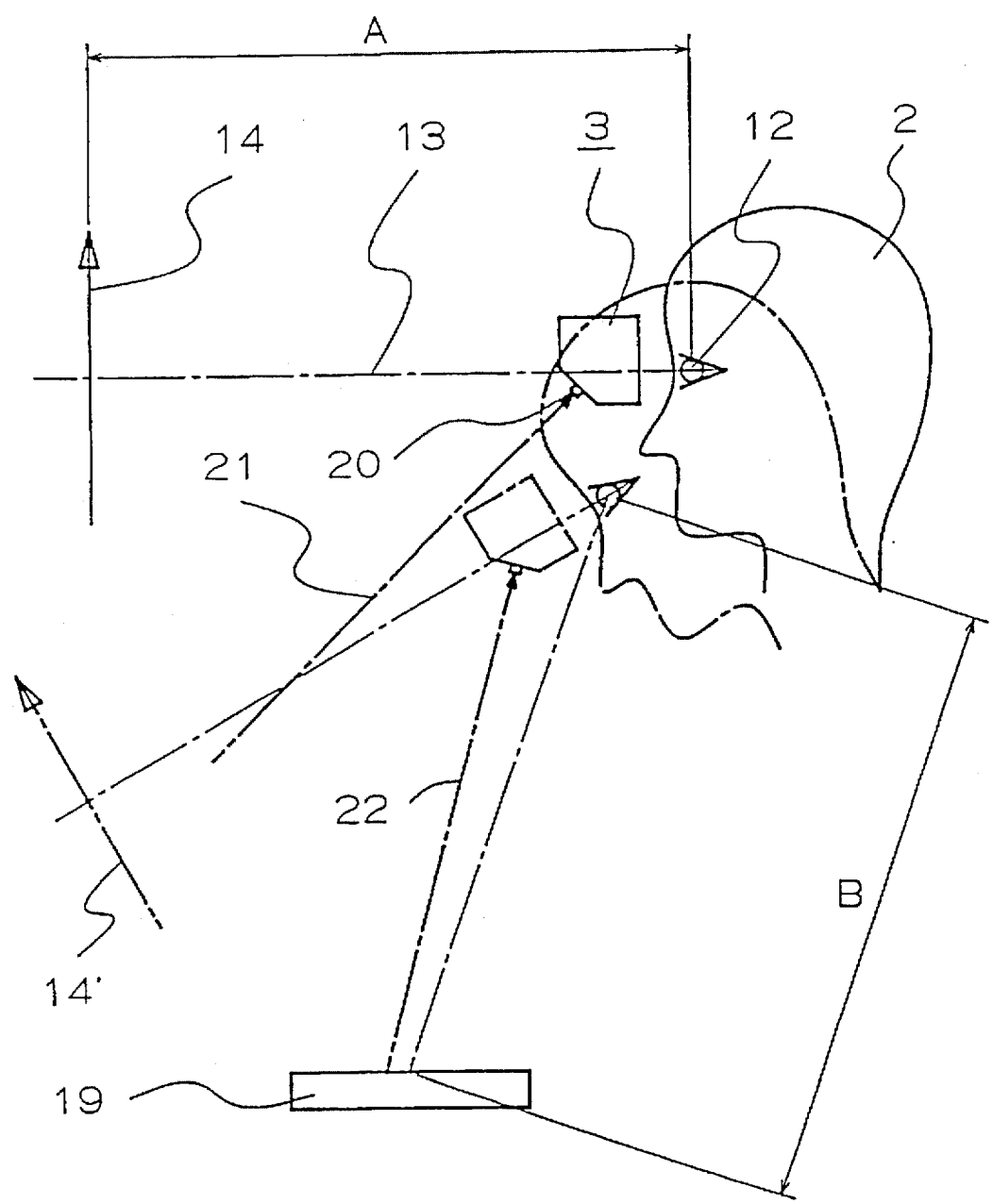
FIG. 8 shows the relationship between the distance to a virtual image when this image is viewed and the distances to the virtual image and an input means when this input means is viewed.

FIG. 8 shows the distance to the virtual image when this image is viewed and the input means when this input means is viewed. As described above, the vertical image forming optical system 3 is disposed in front of the user's face, and the user 2 sees the virtual image 14 at a distance A from the eye 12. The distance A in this case is referred to as a virtual image perceiving distance. When viewing the input means 19 such as a keyboard located near the user's hands, the user 2 assumes a posture shown in the figure, precisely speaking, with his or her head inclined. A distance B in this case is referred to as a viewing distance.

The user 2 adjusts his or her eye 12 to the virtual image perceiving distance A when viewing the virtual image 14, while adjusting it to the viewing distance B when viewing the input means 19. Consequently, when alternatively viewing the virtual image 14 and the input means 19, the user must adjust his or her eye to the corresponding distance each time the user changes the target, resulting in the fatigue increasing with increasing frequency of adjustment. Thus, setting the virtual image perceiving distance A and the viewing distance B at approximately the same value substantially eliminates the need of these adjustments, thereby reducing the fatigue caused by the repetition of adjustments.

The virtual image perceiving distance A varies among users due to the difference among their eyesight and resting positions. Since, however, the allowable range of focusing available to the user is somewhat wide, the virtual image perceiving distance A can be adjusted within this allowable range. To do this, the relative distance between the image display element and the enlarging optical means may be varied, and a mechanism for moving the image display element and the enlarging optical means in the directions of their respective optical axes may be provided. In this case, the adjustment can be carried out easily by repetitively and alternatively viewing the virtual image 14 and the input means 19 while matching the virtual image perceiving distance A with the viewing distance B.

Figure 9:
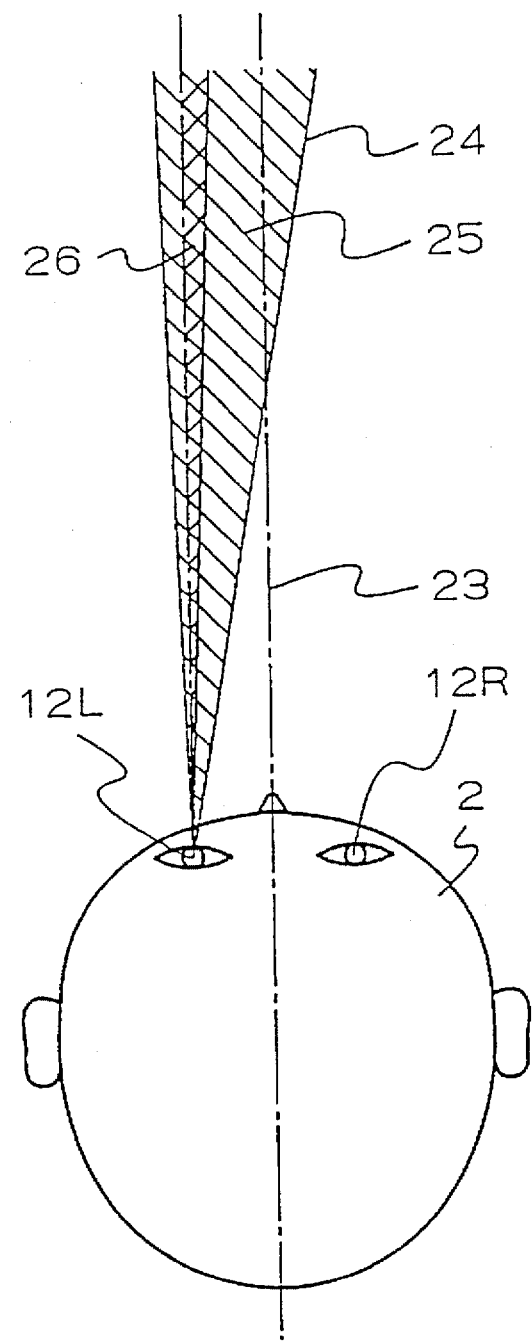
FIG. 9 describes the horizontal position in which a virtual image is formed.

FIG. 9 describes the horizontal position in which a virtual image is formed. Table 2 shows the results of experiment that were used to determine this position.

TABLE 2

| Subject | Allowable range A | Optimum value |
| --- | --- | --- |
| 1 | −1° < A < +5° | +0.5° |
| 2 | −1° < A < +4° | 0° |
| 3 | −1° < A < +4° | +1° |
| 4 | −1° < A < +4° | 0° |
| 5 | −1° < A < +5° | +1° |

Table 2 shows the results of experiment in which five subjects were provided with a virtual image forming optical system and asked to subjectively determine the allowable range of horizontal angles at which they can view the virtual image without being subjected to loads as well as the optimum value within the allowable range. Each angle is formed in the horizontal direction between a line 23 perpendicular to the user's face and the optical axis formed by the virtual image and the left eye 12L, as shown in FIG. 9.

The congestion direction, for example, the direction of the optical axis 24 in this figure is assumed to be positive, whereas the opposite direction is assumed to be negative. The results in Table 2 can be described in conjunction with FIG. 9. In FIG. 9, a single hatching 25 indicates the range of −1° to 5°, whereas a double hatching 26 denotes the range of 0° to +1°. It can be judged that the single hatching area 25 is the allowable range and that the double hatching area 26 is most preferable.

If the optical axis formed by the user's eye and the virtual image is placed within these areas, the user 2 can view the virtual image in the direction in which the image can be seen most clearly with a single eye, without being subjected to loads. The user suffers little fatigue during not only short time use but also long time use.

In FIG. 8, the device main body also has on its underside a photosensor 20 that acts as a illuminance (brightness) detection means, and the results of detection by this sensor are fed back to optimize the transmittance of the partially transparent shading plate and the brightness of the virtual image forming optical system. As shown in FIG. 8 described above, the user 2 has to incline his or her head when moving his or her line of sight between the virtual image 14 and the input means 19. The detection direction of the photosensor 20 disposed on the underside of the device main body thus changes between a direction 21 and a direction 22 in response to the movement of the device associated with the movement of the head. The illuminance from the direction 21 (the surrounding illuminance on the outer surface of the partially transparent shading plate) detected by the photosensor 20 when the user is viewing the virtual image 14 can be used to control the transmittance of the shading plate, while the brightness from the direction 22 (the brightness on the input means 19) detected by the photosensor 20 can be used to control the brightness of the virtual image forming optical system 3. The transmittance and the brightness can thus be automatically controlled on the basis of the relationship described above for FIGS. 5 and 6. As a result, both the transmittance of the partially transparent shading plate and the brightness of the virtual image forming optical system can be automatically optimized, so the device main body is always adjusted to its optimal conditions depending on how the user is using the device, thereby reducing the user's fatigue.

In the optical arrangement of the virtual image forming optical device shown in FIG. 2, the photosensor 20 is most preferably disposed on the rear side of the reflection mirror in terms of spatial efficiency and detection direction. Both of these control means are desirably provided to relieve the fatigue, but the fatigue can be significantly reduced using only one of the control means.

Next, an example of a control circuit for automatically adjusting the transmittance of the partially transparent shading plate and the brightness of the virtual image forming optical system is described with reference to FIGS. 10A, 10B, and 11.

Figure 10A:
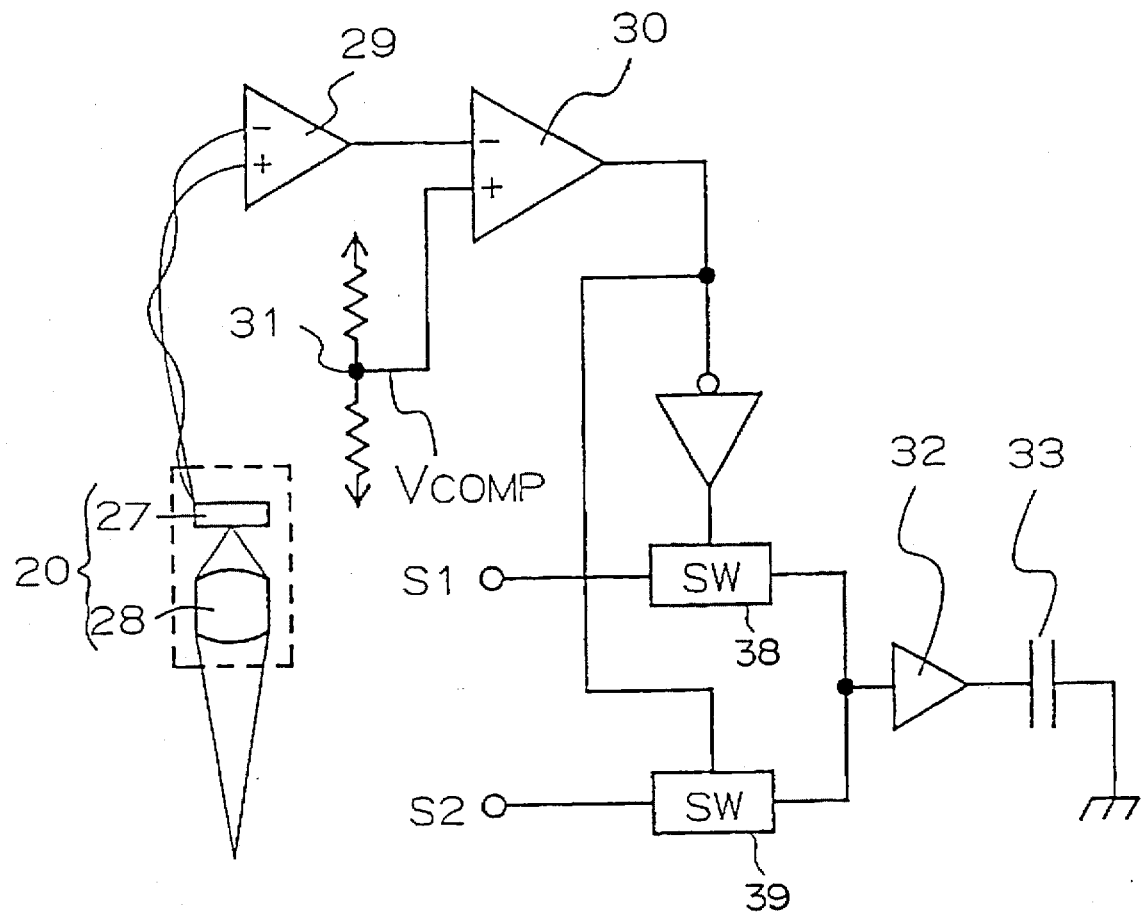
FIGS. 10A describes a circuit for controlling the transmittance of the partially transparent optical system.
Figure 10B:
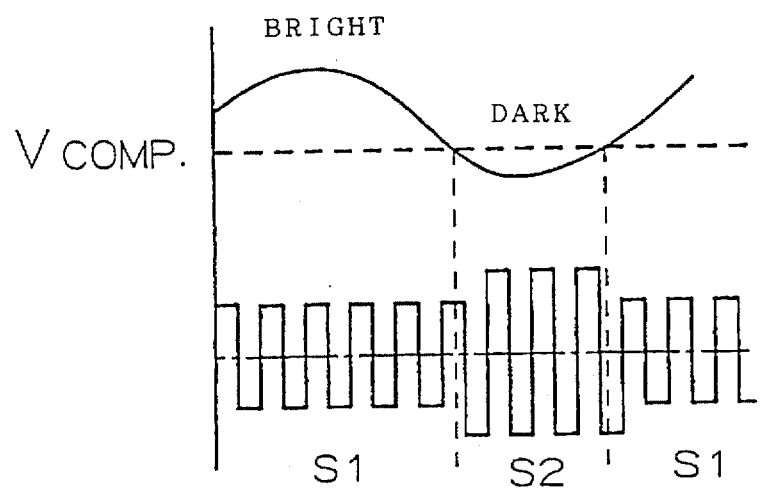
FIG. 10B is a timing chart showing a waveform obtained while the circuit is operating.

FIGS. 10A and 10B show an example of the use of a liquid crystal display element for controlling the transmittance of the partially transparent shading plate; FIG. 10A is a circuit diagram, and FIG. 10B is a flowchart showing a waveform obtained while the liquid crystal display element is operating. The photosensor 20 comprises a photodiode 27 and a lens 28 that forms input light as an image on the photodiode 27, which then outputs a detection signal. This detection signal is amplified by an amplifier 29 and input to a negative terminal of an operational amplifier 30. A resistor 31 for controlling the voltage is connected to a positive terminal of the operational amplifier 30 to supply a voltage corresponding to 1001×. The operational amplifier 30 attempts to determine the amounts of both inputs. If it determines that the illuminance input to the photosensor is larger than the reference illuminance of 1001×, a switch 38 switches on a signal S1, which is amplified by an amplifier 32 and then input to a liquid crystal display element 33. On the contrary, if the operational amplifier 30 determines that the illuminance input to the photosensor is smaller than the reference illuminance of 1001×, a switch 39 switches on a signal S2, which is amplified by the amplifier 32 and then input to the liquid crystal display element 33. If the liquid crystal display element is in a display mode called "Normally Black", and has an amplitude such as shown in FIG. 10B, the transmittance of the partially transparent shading plate decreases when the signal S1 is selected, whereas the transmittance of the partially transparent shading plate increases when the signal S2 is selected, thereby providing desired control. The transmittance can be controlled more precisely by increasing the number of signals.

Figure 11:
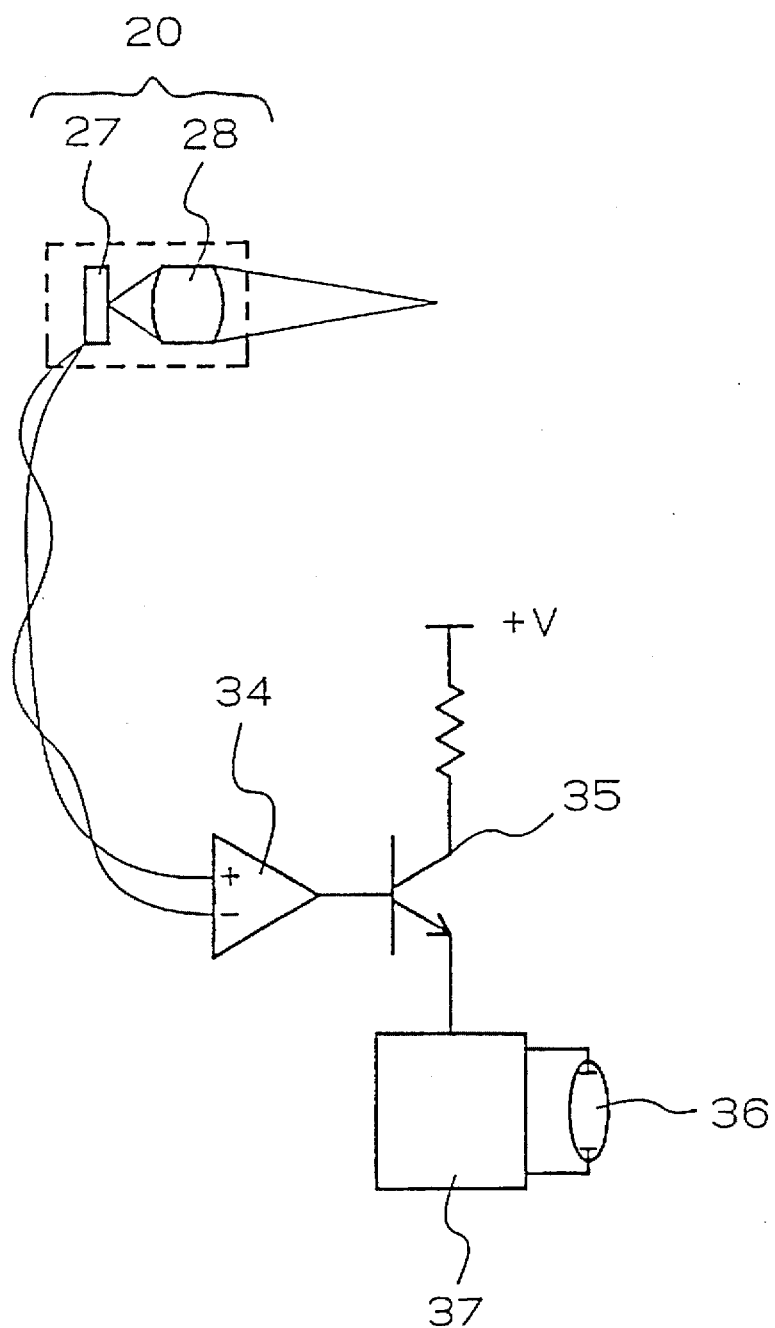
FIG. 11 is a circuit diagram showing an embodiment of brightness control by the virtual image forming optical system.

FIG. 11 is a circuit diagram showing an example of brightness control provided by the virtual image forming optical system. A detection signal from the photosensor 20 is amplified by an amplifier 34 and then input to a transistor 35. The voltage of a drive circuit 37 for a fluorescent light 36 that acts as an illumination means is then controlled according to the input voltage. Consequently, the fluorescent light 36 has its brightness controlled according to the detection signal from the photosensor 20, that is, the brightness of the virtual image forming optical system is controlled.

If the above two controls are used together, changes in the detection direction of the photosensor 20 may be confirmed by monitoring for rapid changes in the detection signal from the photosensor 20, or the movement of the user's head is mechanically detected while the detection signal from the photosensor 20 is used to control either the transmittance of the partially transparent shading plate or the brightness of the virtual image forming optical system.

A switching means according to this invention has not been referred to in Embodiment 1, but will be described in detail in Embodiment 2 and subsequent embodiments described below.

(Embodiment 2)

Figure 12:
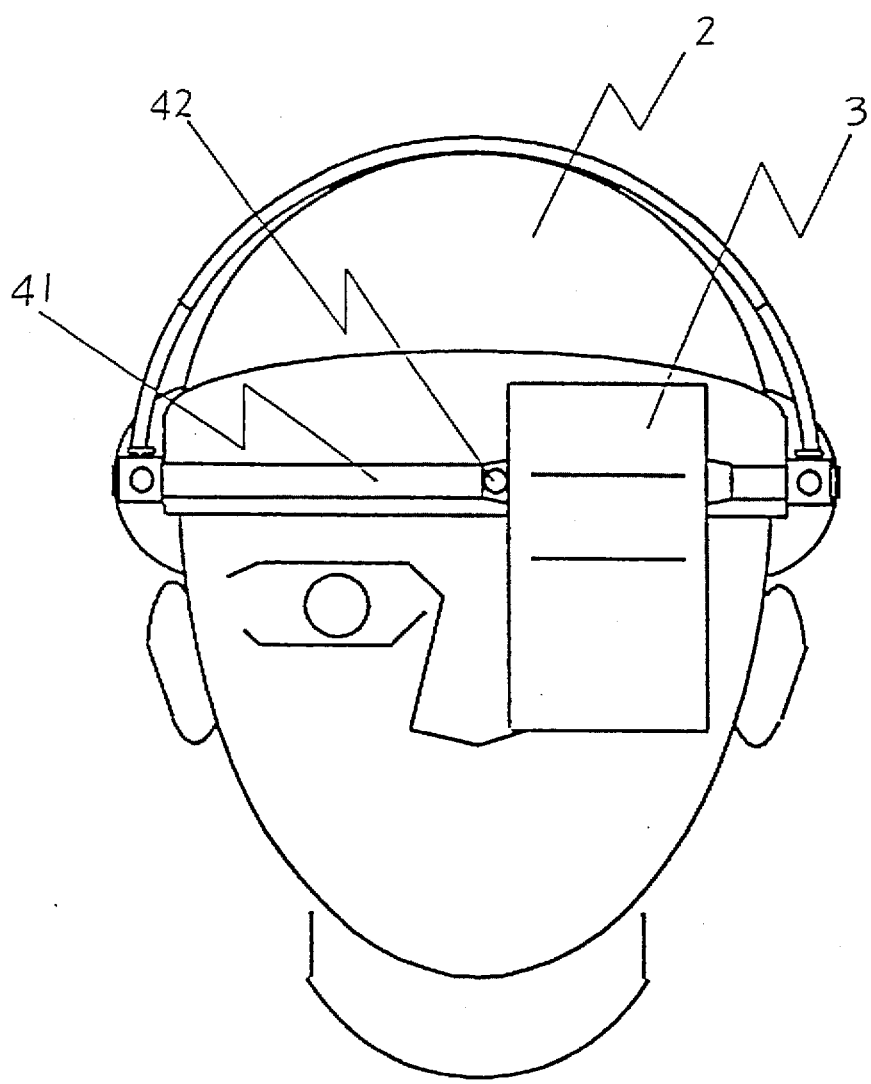
FIG. 12 is a model front view showing a second embodiment of this invention.
Figure 13:
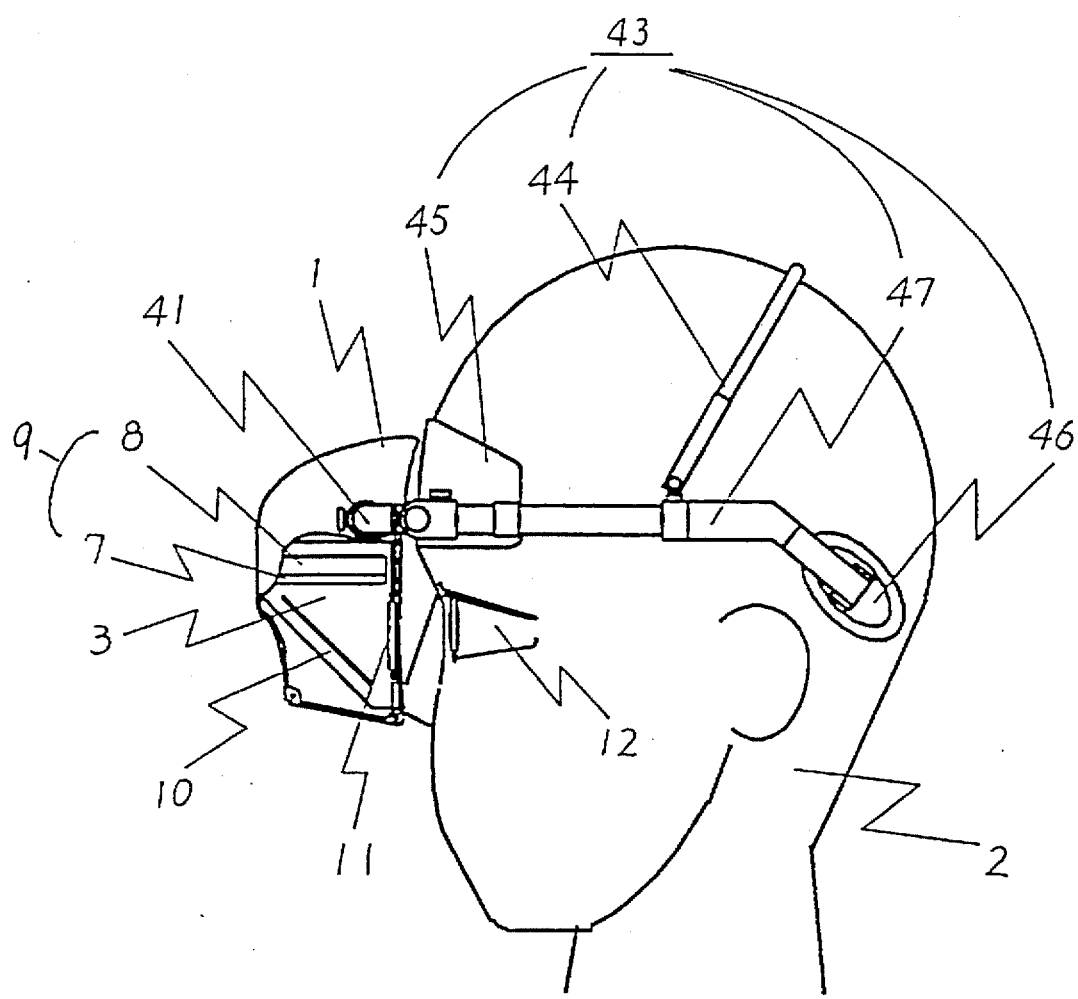
FIG. 13 is a model side view showing the second embodiment.

FIGS. 12 and 13 are model drawings describing a second embodiment according to this invention. FIG. 12 is a front view, and FIG. 13 is a side view. Both figures also show the position of an internal optical system. The internal structure of the virtual image forming optical system 3 is the same as in Embodiment 1, so it carries the same reference numerals as in Embodiment 1, and its description is omitted.

The device main body 1 includes the virtual image forming optical system 3 located in front of one eye of the user 2. The virtual image forming optical system 3 extends approximately in the direction of the width of the user's eye, and is fictionally fitted via a fixing screw 42 to shaft 41 with an approximately cylindrical cross section which engages a holding section 43. The holding section 43 comprises an arm 44, a forehead pad 45, a pad, and a slider 47, as shown in the figure.

The virtual image forming optical system 3 is fictionally fitted via a fixing screw 42 to the shaft 41 with an approximately cylindrical cross section which is fixed to the holding section 43, as described above. When the fixing screw 42 is loosened, the virtual image forming optical system 3 can be then moved on the shaft 41. When the fixing screw 42 is tightened again, the virtual image forming optical system 3 is fictionally fitted to the shaft 41, and retained so that it can move approximately in the direction of the with of the user's eye along the shaft 41. Thus, the user 2 can easily select the eye 12 to see the virtual image simply by transversely moving the virtual image forming optical system 3. Therefore, the head-mounted display device according to this embodiment provides high universality and shareability, and enables the user 2 to arbitrarily switch the eye to view the virtual image between the right and left eyes.

Since the virtual image forming optical system 3 is moved approximately in the direction of the width of the user's eye when the eye 12 to view the virtual image is switched, the width of the eye can also be adjusted so as to prevent the user from moving his or her eyeballs unnaturally, thereby reducing the fatigue caused by the misalignment of the device with the user's eye and simplifying the structure of the associated adjustment mechanism. Furthermore, since the virtual image forming optical system 3 is fictionally fitted to the shaft 41 with an approximately cylindrical cross section, the angle of depression can be adjusted by rotating the virtual image forming optical system 3 around the shaft 41, thereby enabling each user to view optimal images.

The shaft 41 should have a linear portion corresponding to the width of the user's eye (max: 72 mm), and the connection between the shaft 41 and the holding section 43 should have a structure that prevents the shaft 41 from being affected by the elastic deformation of the holding section 43. The virtual image forming optical system 3 may also be fictionally fitted to the shaft 41 by using a spring to apply force to the shaft 41. In this case, the fixing screw 42 need not be loosened when the virtual image forming optical system 3 is moved transversely, resulting in simplified switching operation.

(Embodiment 3)

Figure 14:
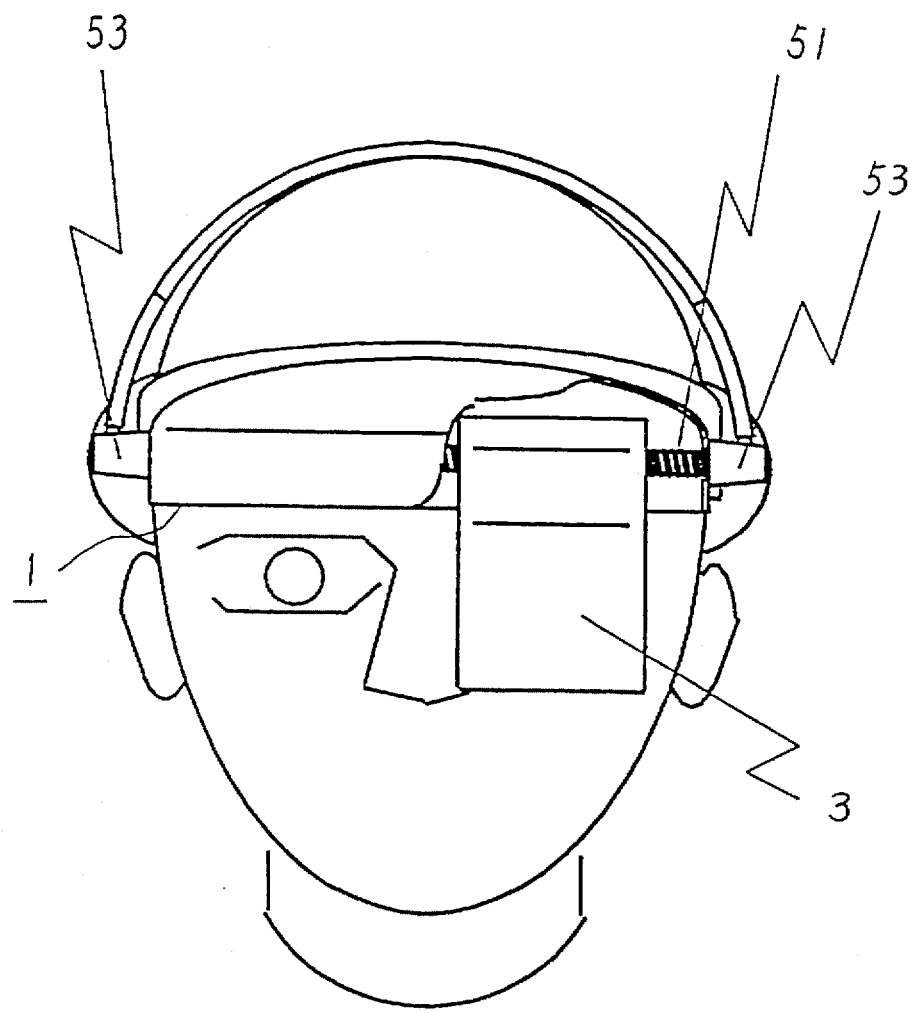
FIG. 14 is a model front view showing a third embodiment of this invention.
Figure 15:
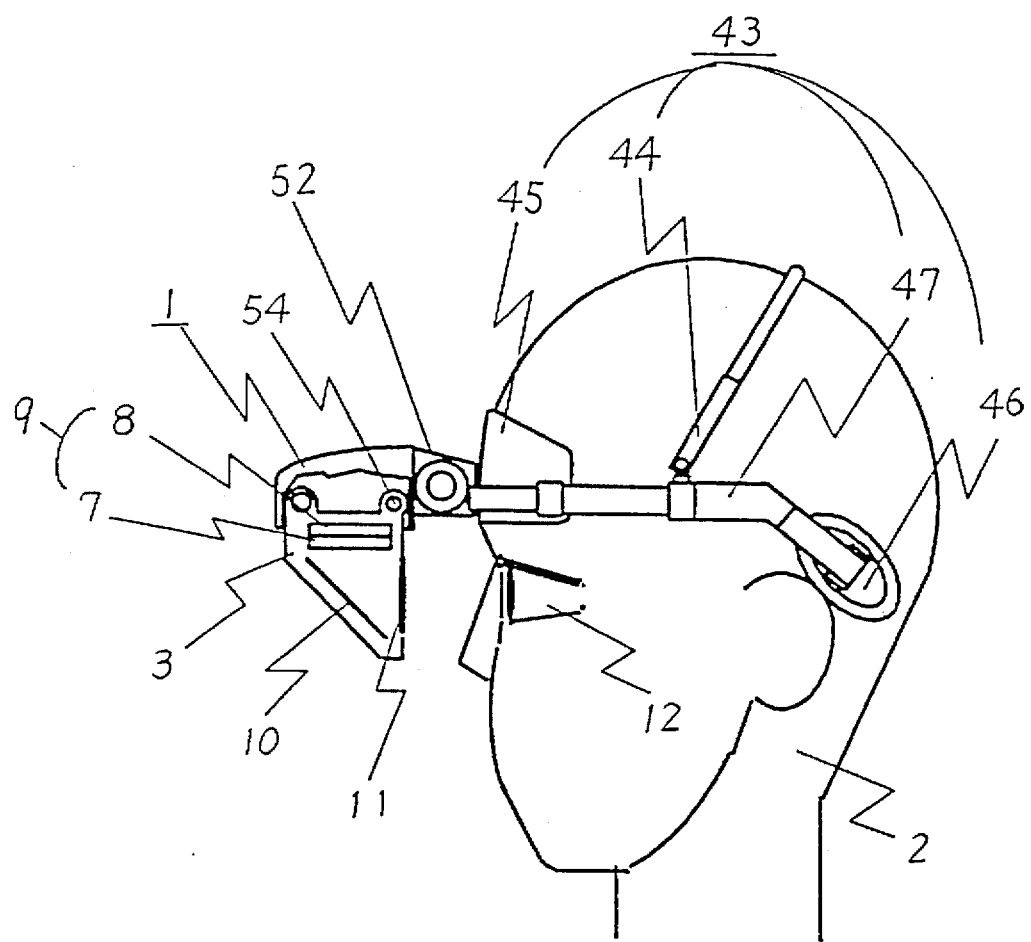
FIG. 15 is a model side view showing the third embodiment.

FIGS. 14 and 15 are model drawings describing a third embodiment according to this invention. FIG. 14 is a front view, and FIG. 15 is a side view. Both figures also show the position of an internal optical system. The internal structure of the virtual image forming optical system 3 is the same as in Embodiment 1, so it carries the same reference numerals as in Embodiment 1, and its description is omitted.

The device main body 1 includes the virtual image forming optical system 3 located in front of one eye of the user 2. The virtual image forming optical system 3 is idly retained so as to rotate without affecting the device main body 1, and extends in the direction of the width of the user's eye. The optical system 3 is held on the device main body 1 via a shaft 51 shaped like a screw, and the main body 1 engages the holding section 43 via a hinge section 52.

The shaft 51 has a knob 53 at both ends thereof. Rotating the knob 53 causes the shaft 51 to rotate without affecting the device main body 1, thereby enabling the virtual image forming optical system 3 spirally fitted to the shaft 51 to move approximately in the direction the width of the user's eye. In this case, by providing a guide shaft 54 or a guide plane 54 in the virtual image forming optical system 3 in such a way that it sits in parallel with the shaft 51, the virtual image forming optical system 3 can be moved more stably, and the user 2 can simply select the eye 12 to view the virtual image. Therefore, the head-mounted display device according to this invention provides high universality and shareability, and enables the user 2 to arbitrarily switch the eye to view the virtual image between the right and left eyes.

Since the virtual image forming optical system 3 is moved approximately in the direction of the width of the user's eye when the eye 12 to view the virtual image is switched, the width of the eye can also be adjusted so as to prevent the user from moving his or her eyeballs unnaturally, thereby reducing the fatigue caused by the misalignment of the device with the user's eye and simplifying the structure of the associated adjustment mechanism.

In this embodiment, the hinge section 52 engages the device main body 1 via a shaft 55 the tip of which is shaped like a screw, and the device main body 1 is fixed to the holding section 43 by rotating a control 56 located at both ends of the shaft 55 in order to obtain tightening torque. Rotating the control 56 to loosen the tightening thus enables the angle of depression to be adjusted around the hinge section 52, thereby hindering the user from taking an unnatural line of sight to relieve the fatigue of the eyes. In addition, although the difference in the user's physique causes the holding section 43 to move upward or downward or to incline, further triggering similar movement of the device main body 1, this movement can be corrected by changing the angle of the device main body 1 around the hinge section 52, thereby avoiding the misalignment of the virtual image forming optical system 3 with the user's eye 12 to prevent the fatigue caused by such misalignment. Furthermore, the device main body 1 can be folded toward the holding section 43 around the hinge section to save space.

In the embodiment in FIGS. 12 to 15, the holding section 43 comprises an elastic body consisting of a spring steel plate generally made of SUS 304 or the like which is covered by a resin. The holding section has an approximate U-shape, and is supported on the user's forehead by the forehead pad 45 and on the user's head behind the ear by the pad 46. The forehead pad 45 is mounted so as to cover the forehead before the temple, and the pad 46 engages the slider 47. Since the almost overall holding section 43 can be uniformly and elastically deformed, it can fit any shape of the head and thus absorb the difference in the user's physique, thereby providing high strength, universality, and shareability. In addition, the holding section 43 is supported at three points, that is, on the user's forehead and on both sides of the head behind each ear, so the device can be mounted stably, and eliminates the sense of oppression due to the presence of an empty space above and behind the user's head. It also prevents the user from feeling tightened around the head, and enables the use of a head rest to assume a relaxed posture when sitting in a seat in a travelling body such as an airplane. The user can use this device with spectacles on because the holding section 43 is supported on the forehead and on the sides of the head behind each ear.

Figure 16A:
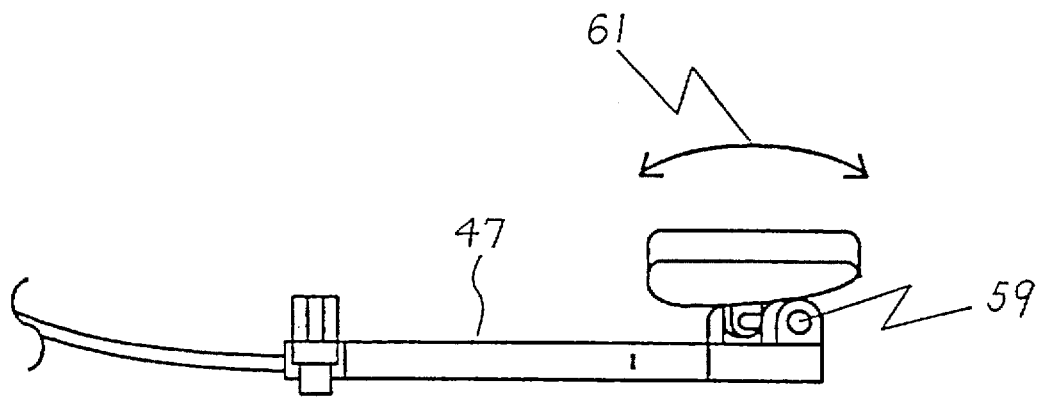
FIG. 16A and 16B are a top view and a side view, respectively, showing the structure of a slider representing the third embodiment.
Figure 16B:
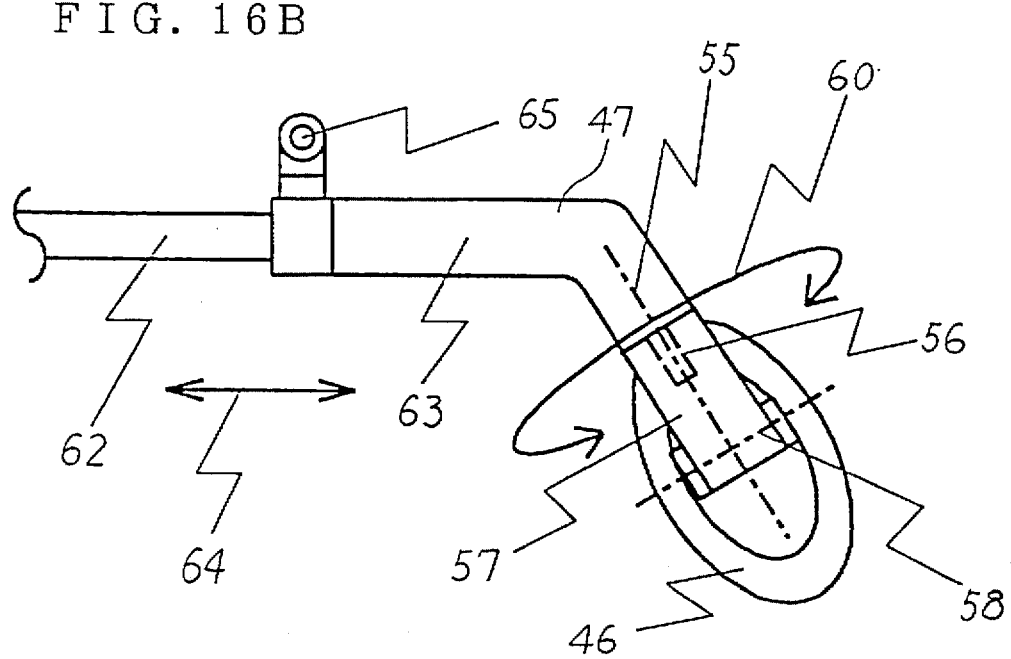

As shown in FIGS. 16A and 16B, the slider 47 extends diagonally downward and has at the tip of its central axis 55 a shaft 56 fitted to a bearing on a slider joint 57. The slider joint 57 has a shaft 59 at its other end a shaft 59 extending in the direction 58 perpendicular to the central axis 55 of the slider 47 and fitted to a bearing on the pad 46. With this configuration, the pad 46 can rotate around the shaft 56 of the slider 47 (the direction 60) together with the slider joint 57, and also rotate in the direction 61 perpendicular to the above direction around the shaft 59 of the slider joint 57. This enables the pad to fit any shape of the head. Furthermore, if the pad 46 is symmetrical relative to the shaft 56 of the slider 47, the series of operations can be performed more smoothly. In addition, the slider 47 comprises a slider A62 and a slider B63 and has a spring and a latch inside, so it can be allowed to conform to any circumferential length of the head by longitudinally 64 moving the slider A62 relative to the slider B63.

Figure 17:
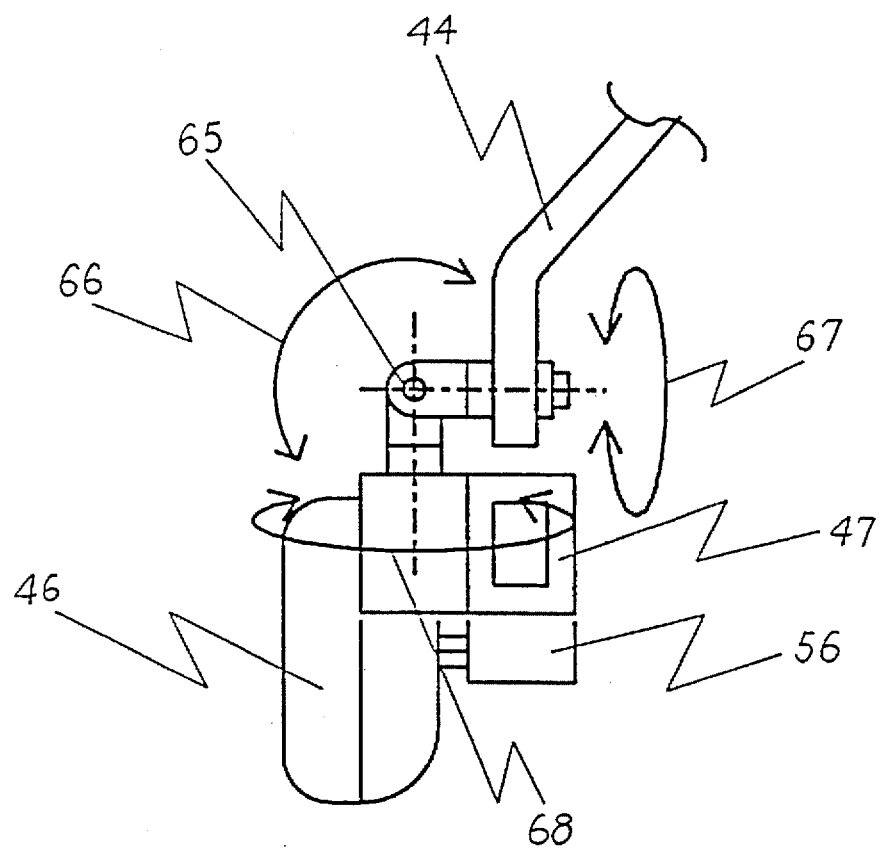
FIG. 17 describes the operation of a supporting point representing the third embodiment.

The device can be mounted further stably by providing an arm 44 with a cylindrical cross section in the position corresponding to the top of the user's head. The arm 44 has its support point 65 located at the side end of the slider B63 of the slider 47, comprises an elastic body with an approximate U shape along the top of the user's head, and is telescopic due to its structure similar to the telescopic mechanism of the slider 47. The support point 65 of the arm 44 has a structure shown in FIG. 17 to enable the arm 44 to rotate around the X axis (66), the Y axis (67), and the Z axis (68), relative to the slider 47 to easily absorb the effect of the elastic deformation of the holding section 43. The arm 44 can also be folded toward the holding section 43 to save space. Since the support point 65 of the arm 44 is located at the side end of the slider B63 of the slider 47, its position relative to the ear substantially remains unchanged when the slider 47 stretches or contracts depending on the size of the head, thereby reducing the effect of the difference in the user's physique on safety. In addition, due to its cylindrical cross section, the arm 44 can contact any user's head in an approximately fixed manner and be always mounted stably, wherever on the top of the head the arm is placed.

(Embodiment 4)

Figure 18:
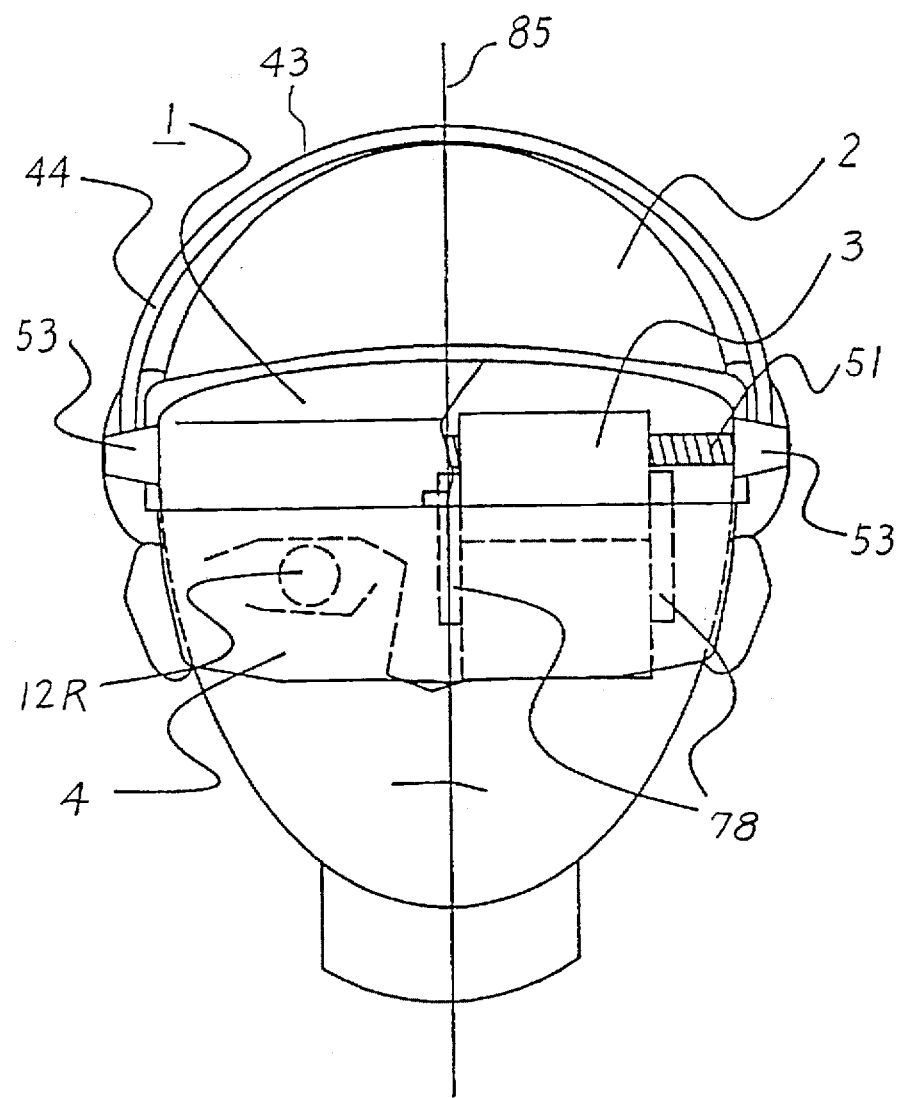
FIG. 18 is a model front view showing a fourth embodiment of this invention.
Figure 19:
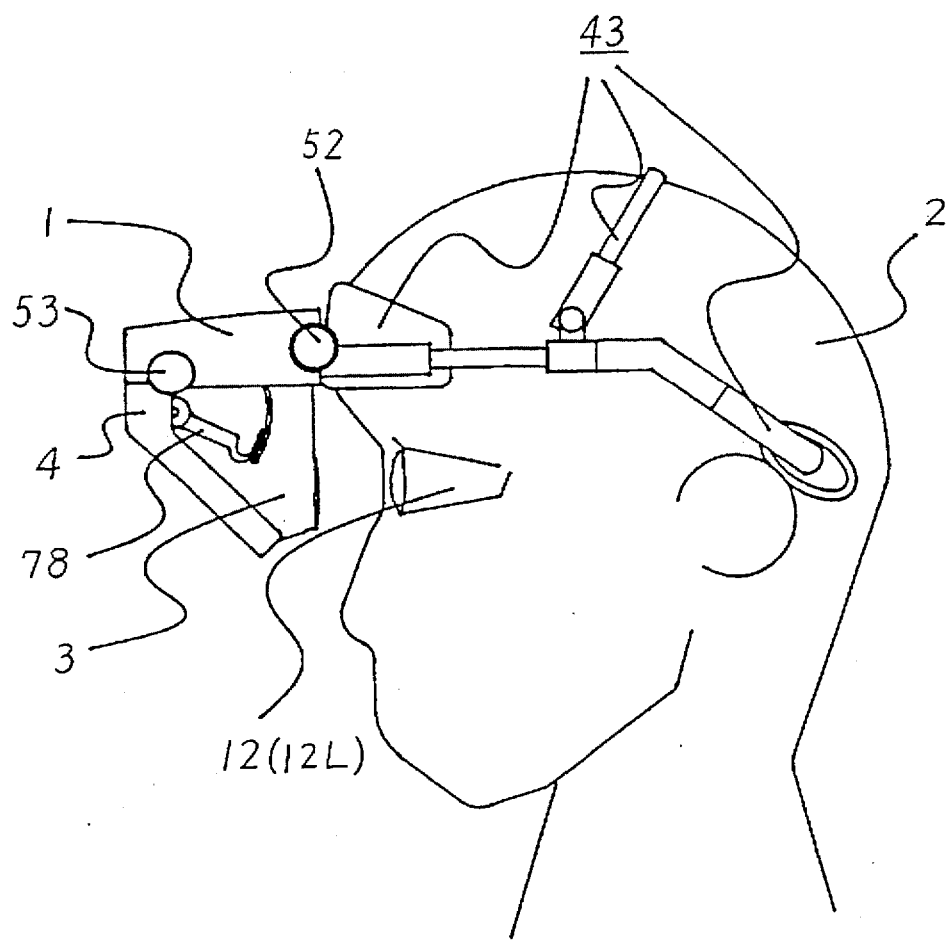
FIG. 19 is a model side view showing the fourth embodiment.
Figure 20:
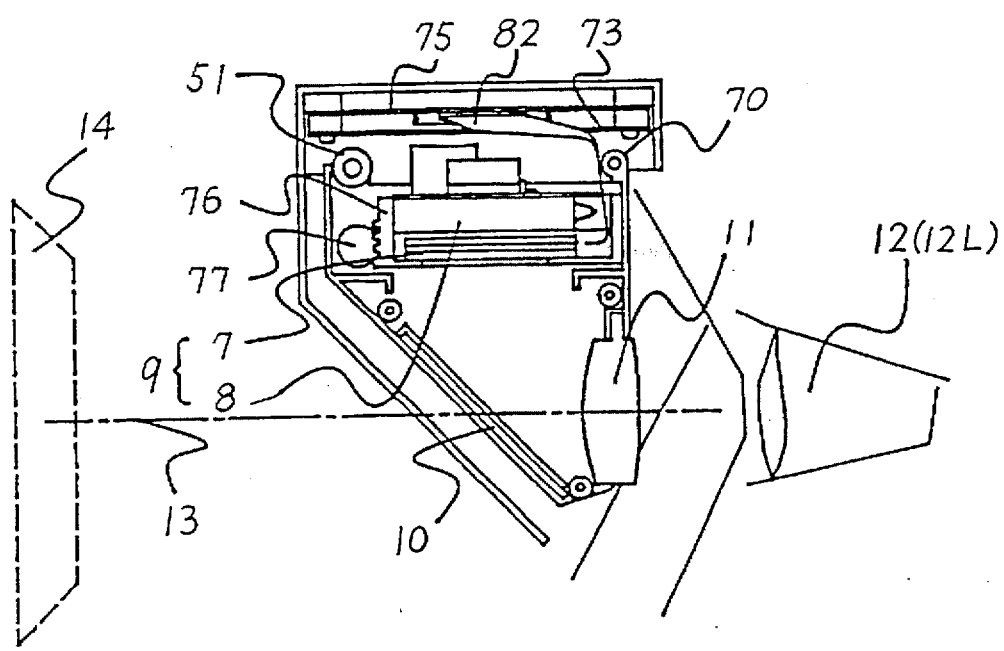
FIG. 20 is an enlarged view of an optical system representing the fourth embodiment.

FIGS. 18, 19, and 20 are model drawings showing a fourth invention of this invention. FIG. 18 is a front view, FIG. 19 is a side view, and FIG. 20 is an enlarge view of the virtual image forming optical system.

The device main body 1 includes the virtual image forming optical system 3 in front of one eye of the user 2. The virtual image forming optical system 3 is retained so as to rotate without affecting the device main body 1. The optical system 3 extends approximately in the direction of the width of the user's eye, is spirally connected to the shaft 51 shaped like a screw and retained on the device main body 1. The optical system 3 also engages the device main body via a guide shaft 70 extending in parallel with the shaft 51, and the device main body 1 engages a holding section 63 via the hinge section 52. The shaft 51 includes the knob 53 at both ends thereof, and rotating the knob 53 causes the shaft 51 to rotate without affecting the device main body 1. The virtual image forming optical system 3 spirally connected to the shaft 51 can thus be guided between the shaft 51 and a guide shaft 70 to move approximately in the direction of the width of the user's eye.

The virtual image forming optical system 3 comprises the image display element 9 consisting of the liquid crystal panel 7 and the back light 8 for irradiating the liquid crystal panel 7, and the reflection mirror 10, and the lens 11 that acts as an enlarging optical means, as in the above embodiment. An image light formed and output by the image display element 9 has its optical path changed by the reflection mirror 10, and is then formed by the lens 11 as an image in the user's eye 12 to view the virtual image. If the image formation surface of the image display element 9 is disposed between the object side focus of the lens 11 and the lens 11 and the eye 12 to view the virtual image is located near the image side focus of the lens 11, the image forming effect of the lens 11 allows the enlarged virtual image 14 of screen information to be seen on the extension of the optical axis 13 of the virtual image forming optical system 3. The partially transparent shading plate 4 is responsible for shading the eye that need not view the virtual image, for example, the right eye 12R, and setting the transmittance of the partially transparent shading plate at 1 or less causes the contrast to appear to the user to have increased, resulting in good visibility.

Figure 21:
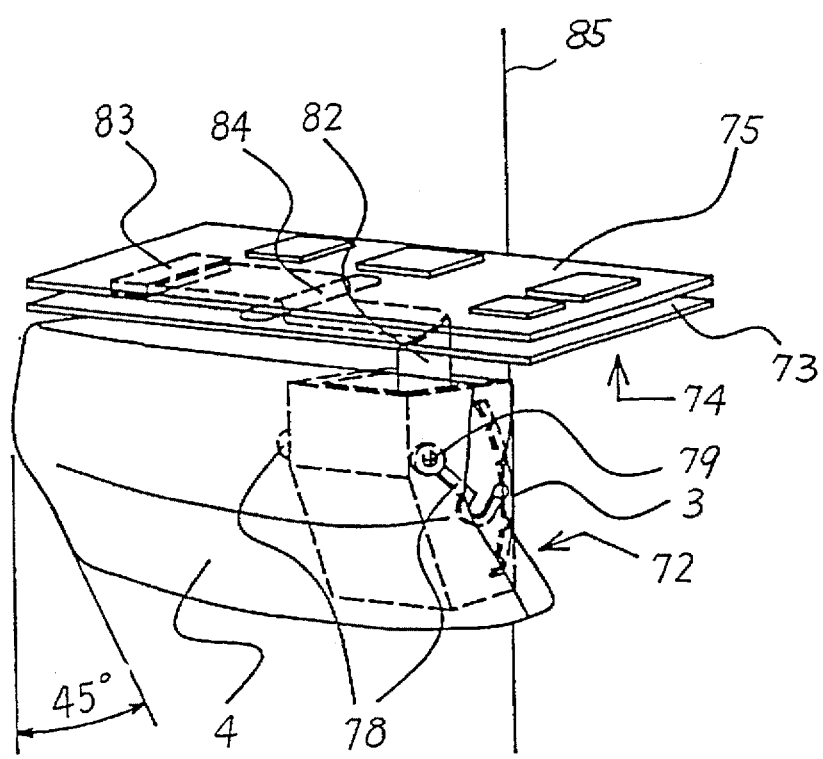
FIG. 21 is a model perspective view of the optical system in FIG. 20.

As shown in FIG. 18, since the partially transparent shading plate 4 is disposed in front of the user's eyes, in a space opposite to the user 2 relative to virtual image forming optical system 3, and at least all over the virtual image formation area within the movement area of the virtual image forming optical system 3, the removal and mounting of the partially transparent shading plate 4 are not required when the knobs 53 are rotated to move the virtual image forming optical system 3. Thus, the user 2 can simply change the eye to view the virtual image. In this case, the reflection mirror 10 is disposed at an angle of approximately 45° from the vertical direction, so the lower end of the partially transparent shading plate 4 is prevented from jumping forward by placing the shading plate 4 at an angle of approximately 45° from the vertical direction as shown in FIG. 21. This contributes to the reduction of the size of the device main body 1. In this case, applying antireflection processing to the user 2 side surface A72 of the partially transparent shading plate 4 can prevent reflection from the surface B74 of a partition 73 that opposes to the surface A72 and the surrounding light from affecting the surface A72, leading to further improved visibility. The partition 73 is provided to protect a drive circuit 75 disposed thereover.

Figure 22:
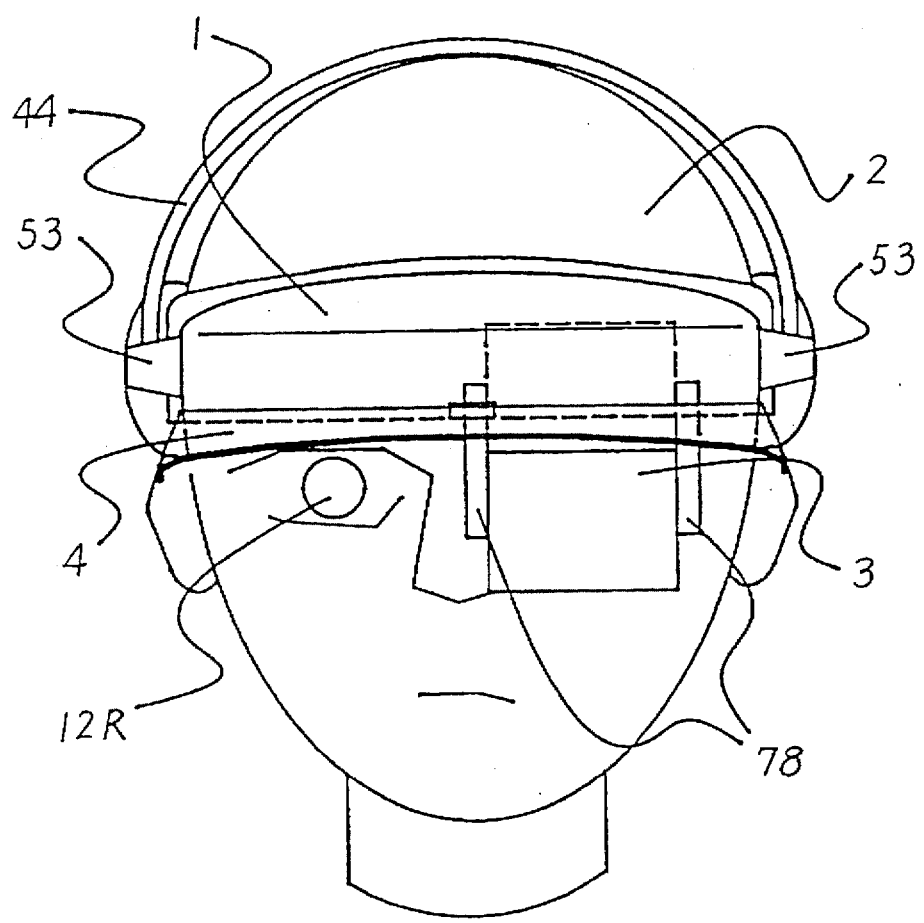
FIG. 22 is a model front view showing a variation of the fourth embodiment.
Figure 23:
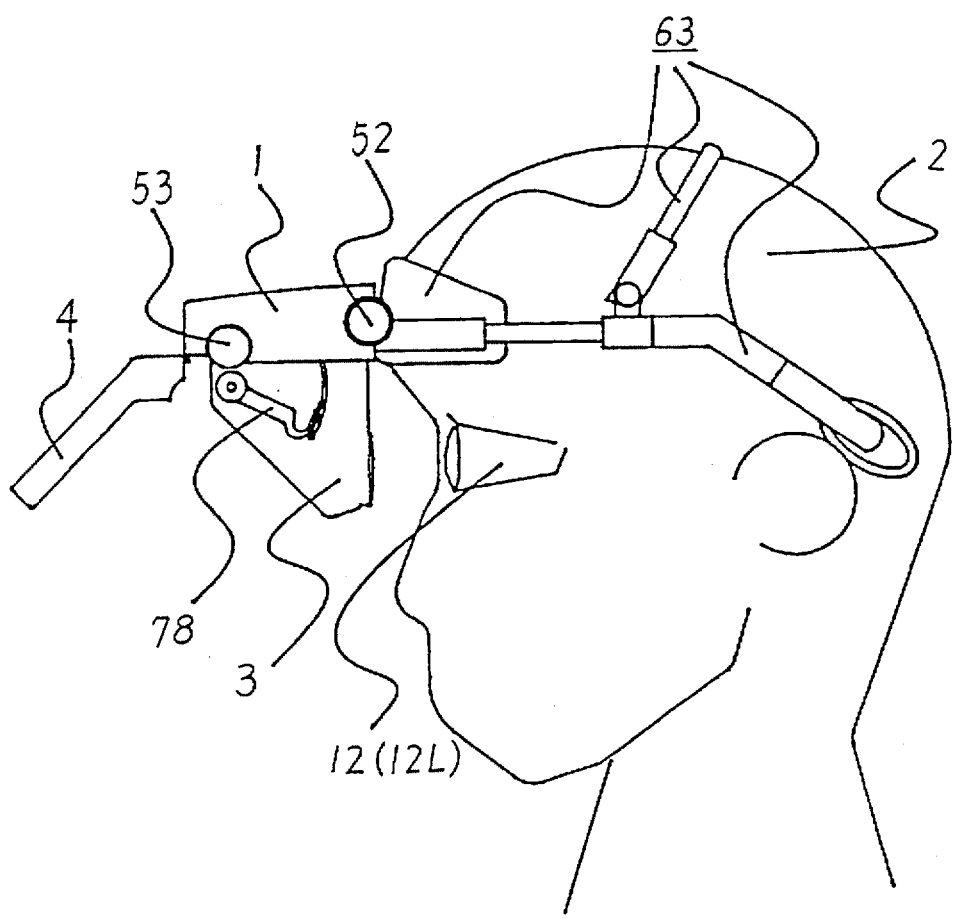
FIG. 23 is a model side view of the variation in FIG. 22.

In FIGS. 18 to 21, the image display element 9 is fixed inside a frame 76 including a rack section, a gear 77 that engages the rack section is disposed in front of the frame 76. A diopter adjustment control 78 is fixed to each side of the gear 77 via a screw 79. To adjust diopter, the diopter adjustment control 78 is rotated around a portion fixed by the screw 79 so as to draw an arc. This operation causes the gear 77 to rotate to move the image display element 9 upward or downward in order to vary the relative distance between the image display element 9 and the lens 11. According to this embodiment, the diopter adjustment control 78 is installed on both sides of the virtual image forming optical system 3, and each diopter adjustment control 78 moves together with the other. The user 2 has only to operate one of the diopter adjustment controls 78 of the virtual image forming optical system 3 to adjust diopter. Thus, whether the virtual image forming optical system 3 has been switched to the right or left, the user 2 can operate the corresponding diopter adjustment control from the corresponding side using the corresponding hand, resulting in improved operability of diopter adjustment. The operability can further be improved by employing a support structure with which the partially transparent shading plate 4 can be opened and closed in front of the user 2 in order to enable the user 2 to operate the diopter adjustment control 78 with the partially transparent shading plate 4 opened frontward, as shown in FIGS. 22 and 23.

As shown in FIG. 20, the image display element 9 and the drive circuit 75 for the image display element 9 which is fixed and disposed outside the movement space for the transverse movement of the virtual image forming optical system 3 are connected together via a flexible printed circuit (FPC) 82. The FPC 82 can improve the flexibility of the cable between the virtual image forming optical system 3 and the drive circuit 75 for the image display element 9 when the knobs 53 are rotated to move the optical system 3. As a result, the virtual image forming optical system 3 can be moved reliably and smoothly. The virtual image forming optical system 3 can also be moved within a cable housing space with a small height, thereby contributing to the reduction of the size of the device main body 1.

In FIG. 21, the substrate of the drive circuit 75 for the image display element 9 has circuit elements on its top side and an FPC connector 83 on its bottom side, and the drive circuit 75 and the virtual image forming optical system 3 are connected together through a guide hole 84 in the partition 73 via the FPC 82.

As shown in FIGS. 20 and 21, the drive circuit 75 should be flatly placed outside the movement space for the transverse movement of the virtual image forming optical system 3 in approximately parallel with the direction of the width of the user's eye. This improves the heat release effect of the drive circuit 75 to improve the reliability of the circuit. In addition, the flat placement of the drive circuit 75 serves to increase the packaging area for circuit parts to reduce the circuit space in the height direction. Furthermore, the FPC 82 is attached to or removed from the drive circuit 75 in the direction of the transverse movement of the virtual image forming optical system 3, and the guide hole 84 for guiding the FPC 82 approximately perpendicularly to the lateral movement of the virtual image forming optical system 3 is provided in the partition 73 disposed between the FPC connector 83 and the image display element 9. This constitution hinders stress from being applied to the FPC connector 83 and FPC 82 to prevent the FPC 82 from being accidentally removed, thereby enabling the virtual image forming optical system 3 to move transversely smoothly and reducing the size of the device. In addition, the guide hole 84 is provided in the partition 73, and has only to be located in a position in which the FPC 82 can be guided approximately perpendicularly to the direction of the lateral movement of the virtual image forming optical system 3. If, however, it is provided in that position of the drive circuit 75 which corresponds to the center line 85 of the user 2, the length of the FPC 82 can be minimized to reduce unwanted slack, thereby enabling the virtual image optical system 3 to move laterally smoothly.

(Embodiment 5)

Figure 24:
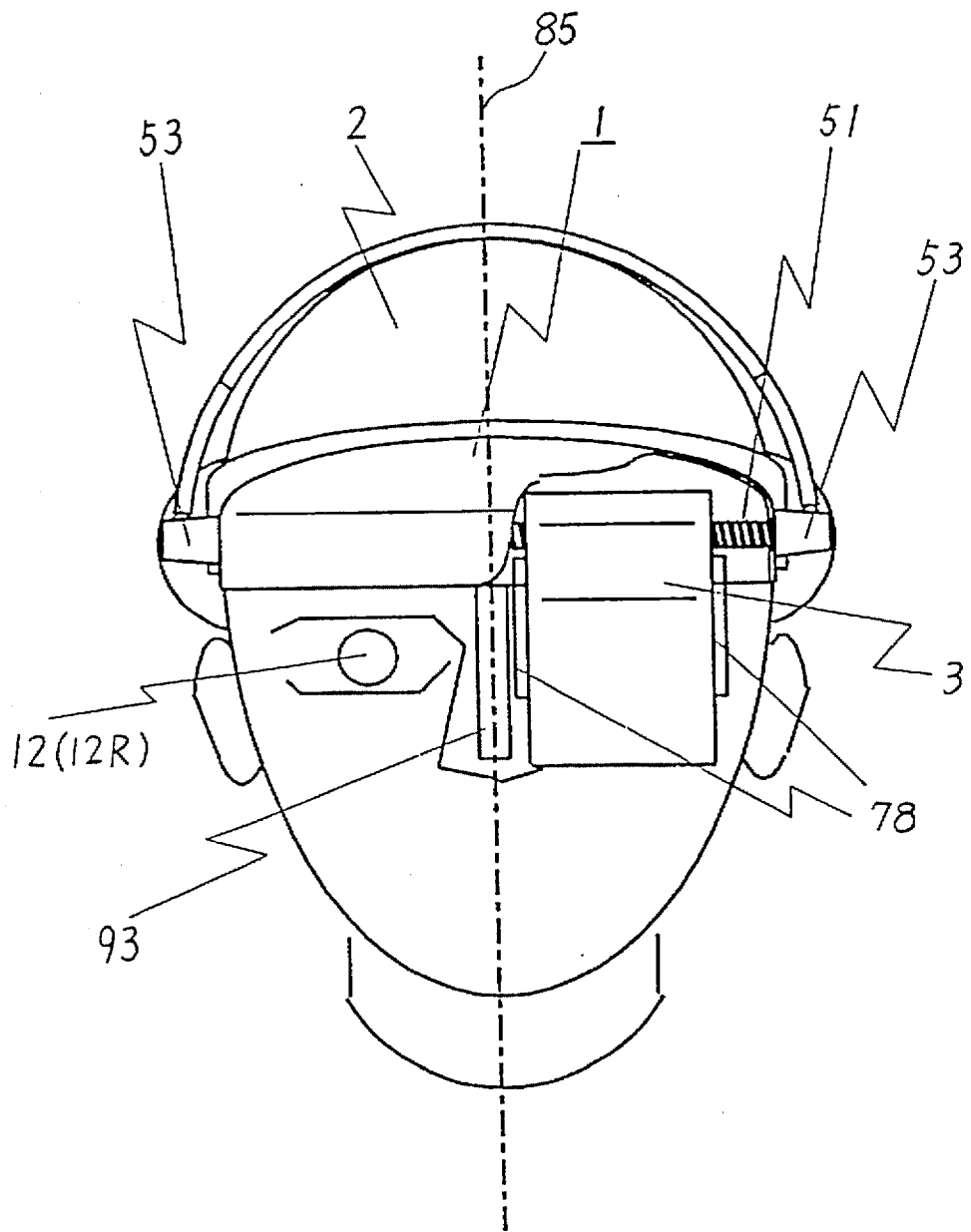
FIG. 24 is a model front view showing a fifth embodiment of this invention.
Figure 25:
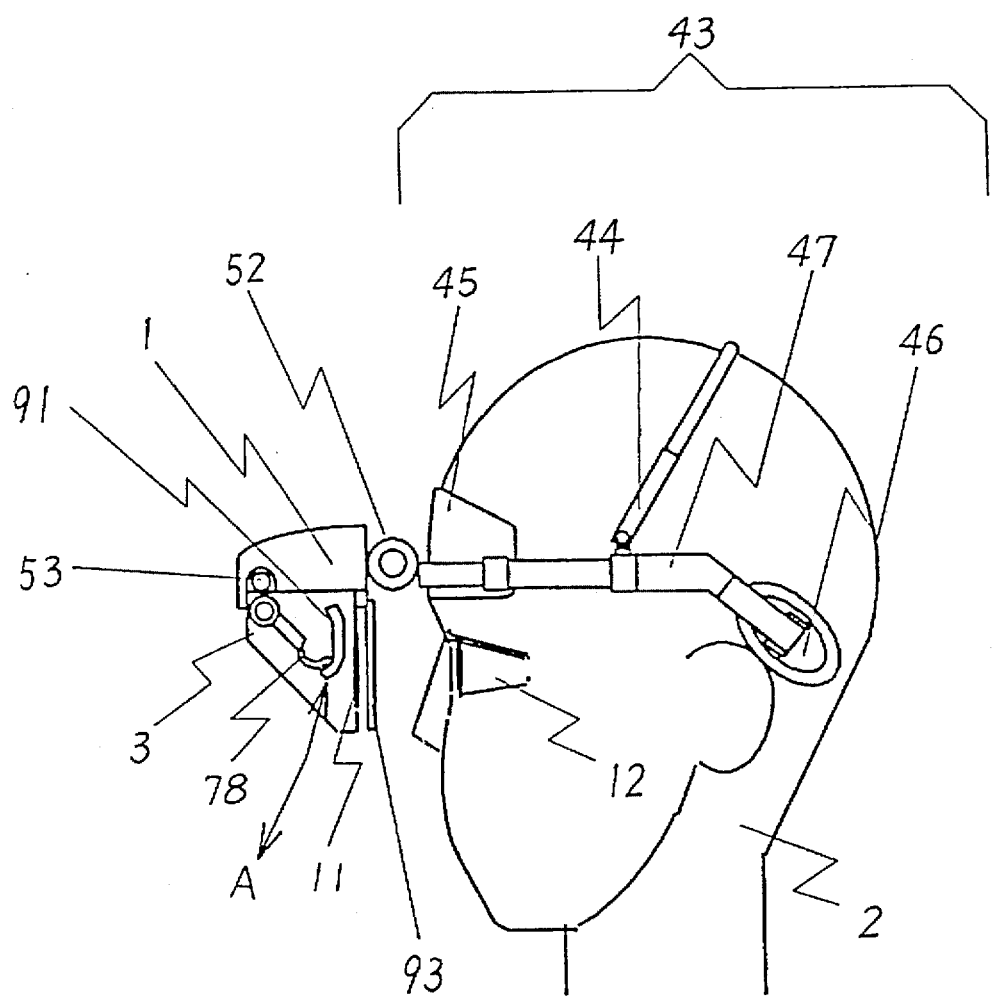
FIG. 25 is a model side view showing the fifth embodiment.

FIGS. 24 and 25 are model drawings showing a fifth embodiment of this invention. FIG. 24 is a front view, and FIG. 25 is a side view. FIG. 24 is partially shown in cross section for explanation.

The basic configuration of this embodiment is similar to that of the above embodiment, and is characterized by the provision of an antidominant eye determination support means 93. As mentioned in Embodiment 1, the eye to view the virtual image desirably has a poorer eyesight to reducing the fatigue of the eyes.

In this embodiment, to determine the antidominant eye that should be allowed to view the virtual image, the antidominant eye determination support means 93 is provided in the approximate center 85 of the width of the user' eye. The antidominant eye determination support means 93 comprises a band-like material as shown in FIG. 24, and is positioned between the near point of the user's eyes and the user. This means is thus defocusing for the user' eyes, but its position and shape can be identified as long as it has an appropriate size. The antidominant eye determination support means 93 can be seen by both eyes by placing it in the approximate center of the width of the user's eye and outside the virtual image forming optical system 3 in front of the eye 12 to view the virtual image.

Figure 26:
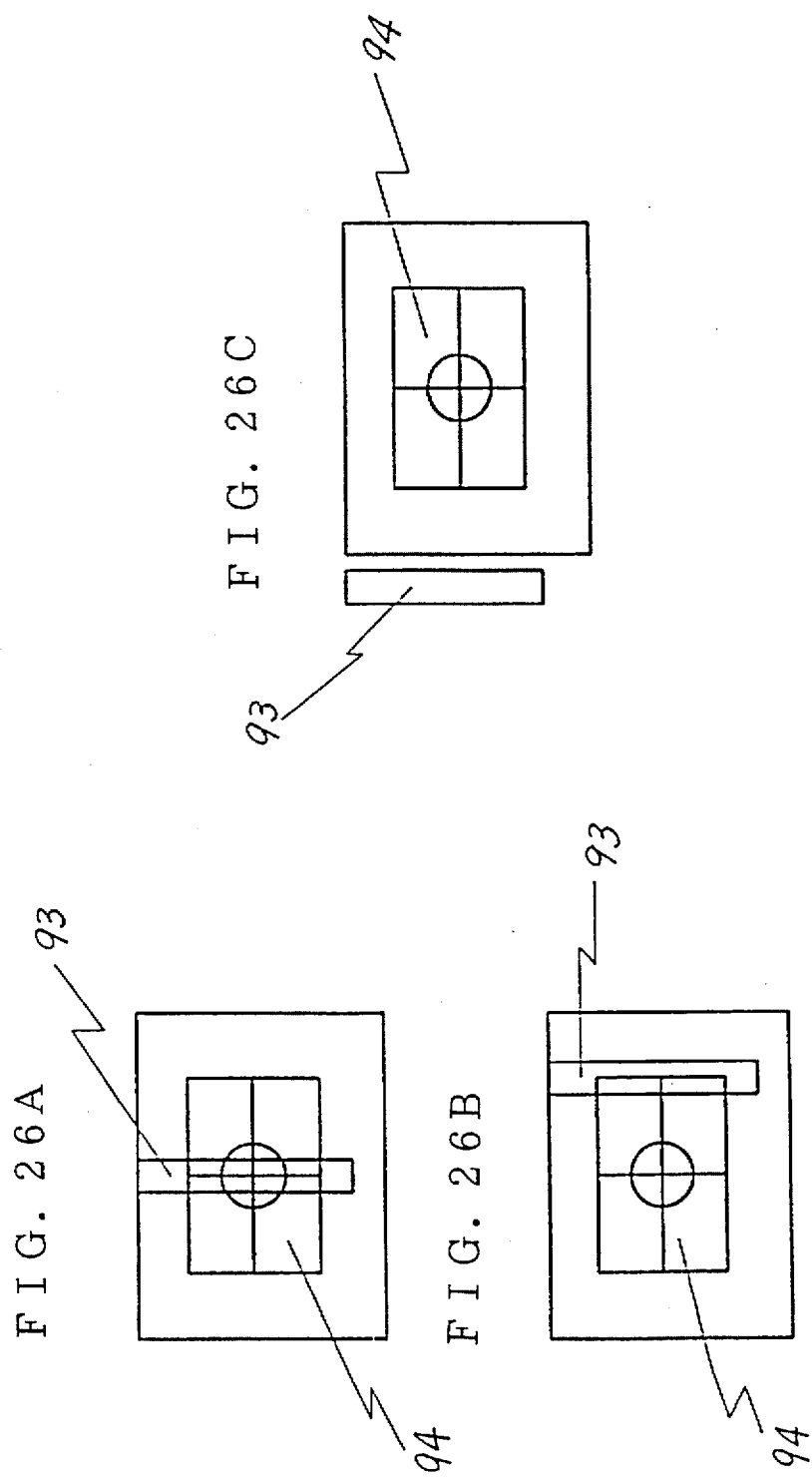
FIGS. 26A, 26B, and 26C show a relative positional relationship describing a method for determining the antidominant eye according to the fifth embodiment.

It is assumed that the user's right eye has a better eyesight. The user 2 mounts the device main body 1 on his or her head, and position the virtual image forming optical system 3 in front of his or her left eye. FIG. 26A shows the relative positions of a virtual image 94 formed by the virtual image forming optical system 3 and an image of the antidominant eye determination support means 93 as seen by both eyes, and FIG. 26B shows the misalignment of the relative positions observed when the right eye 12R that need not view the virtual image is closed. FIG. 26C shows the relative positions determined when the images are viewed by both eyes with the virtual image forming optical system 3 located in front of the right eye 12R with a better eyesight, and FIG. 26C shows the relative positions determined when the left eye 12L that need not view the virtual image is closed. These misalignments are compared, and the left eye, which was being tested when a larger misalignment occurred, is determined to be the antidominant eye, and the virtual image forming optical system 3 is moved to the antidominant eye to allow it to view the virtual image. There is no restriction on which eye should be tested first. If the antidominant eye determination support means 93 can be housed in the device main body after the antidominant eye determination, it will not obstruct the user during operations.

(Embodiment 6)

Figure 27:
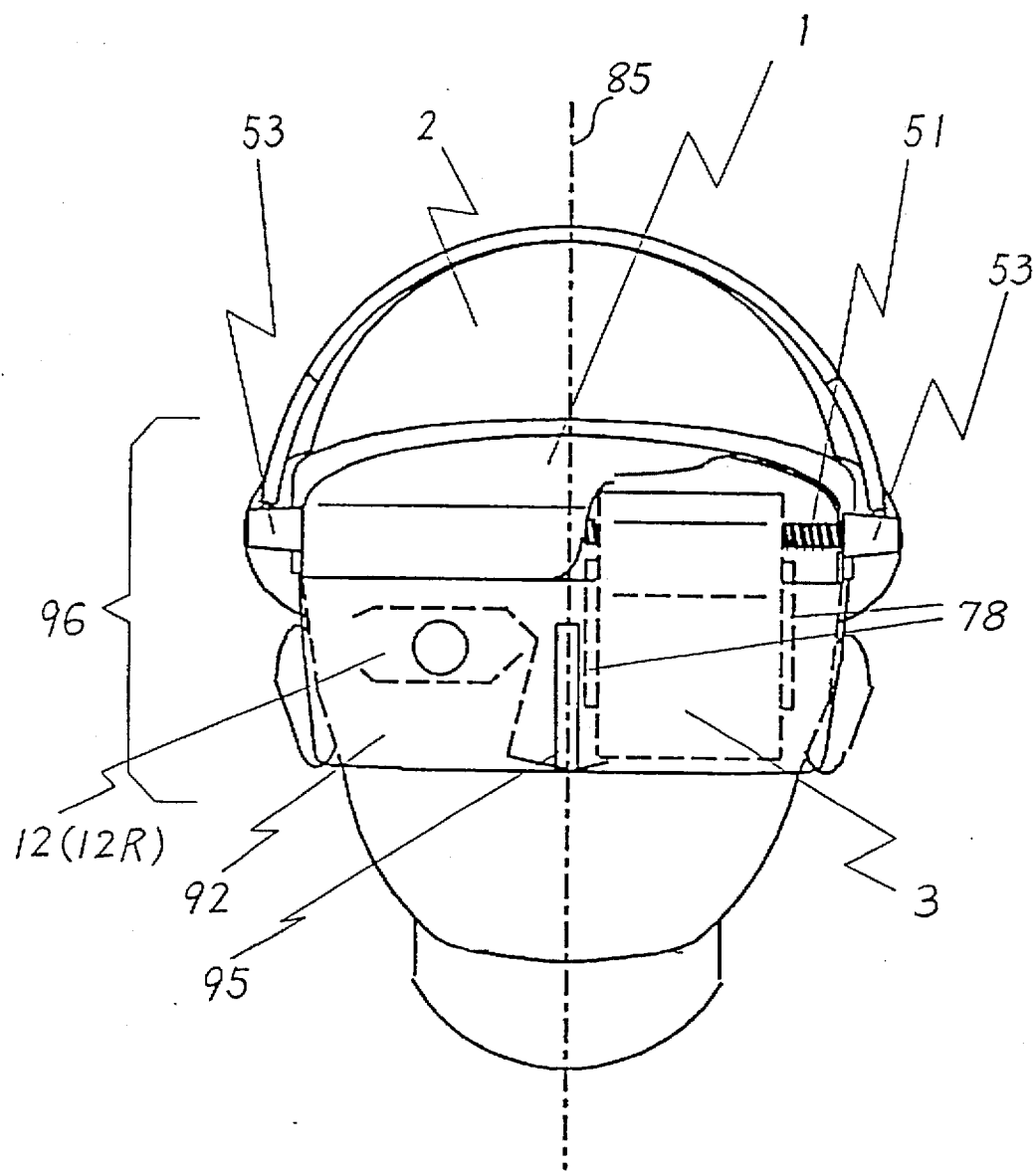
FIG. 27 is a model front view showing a sixth embodiment of this invention.
Figure 28:
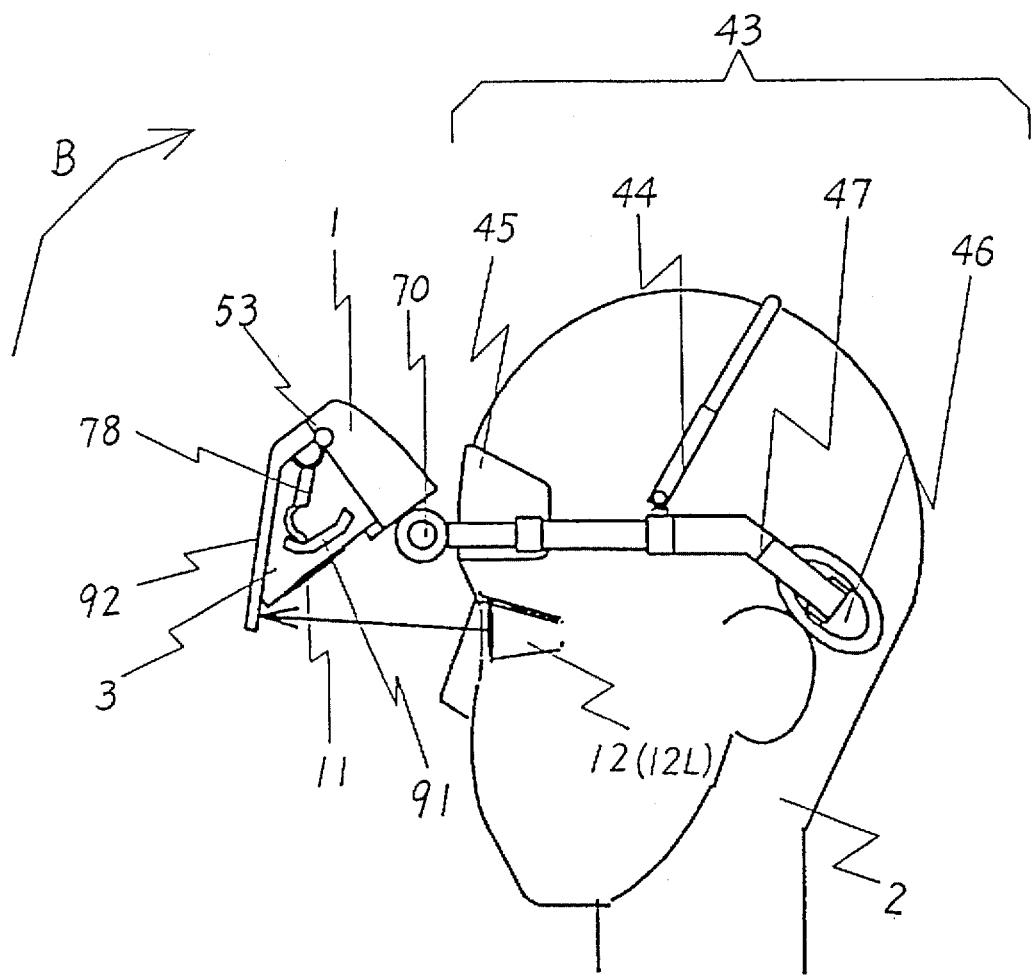
FIG. 28 is a model side view showing the sixth embodiment.

FIGS. 27, 28, and 29 are model drawings showing a sixth embodiment of this invention. FIG. 27 is a front view, and FIG. 28 and 29 are side views.

In this embodiment, the device main body 1 has a partially transparent shading plate 92 sized to partially cover the fields of view of both eyes of the user 2, outside the virtual image forming optical system 3 relative to the user 2. In a monocular type head-mounted display device, the partially transparent shading plate 92 prevents decreases in the contrast of virtual image information caused by optical information incident on the eye that need not view the virtual image (the right eye 12R in this figure). The partially transparent shading plate 92 is positioned outside the movement space of the virtual image forming optical system 3, and can partially remove information supplied to the eye 12R that need not view the virtual image, regardless of the movement of the optical system 3 to the user's right or left eye, as described above.

In this embodiment, the partially transparent shading plate 92 has an antidominant eye determination support means 95 in the approximate center 85 of the width of the user's eye. The antidominant eye determination support means 95 is a slit provided in the partially transparent shading plate 92 as shown in FIG. 27, and has an appropriate size to be identified by the user 2 despite defocusing, as in the above embodiment.

Figure 29B:
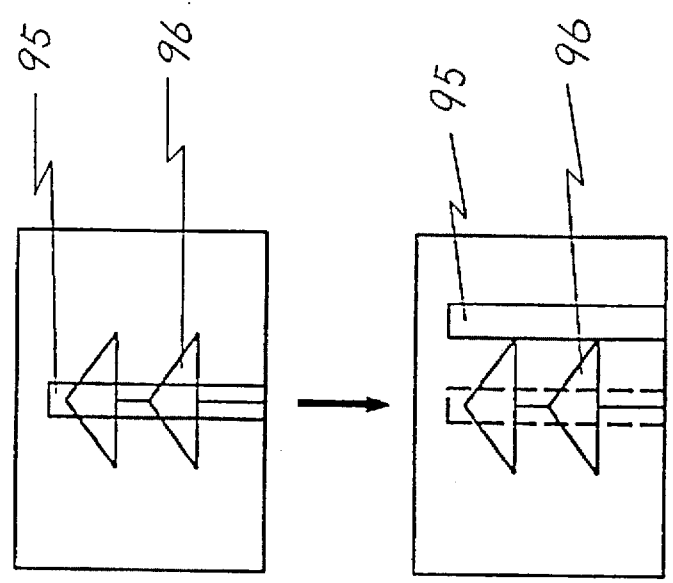
FIGS. 29A and 29B show a relative positional relationship describing a method for determining the antidominant eye in the sixth embodiment.
Figure 29A:
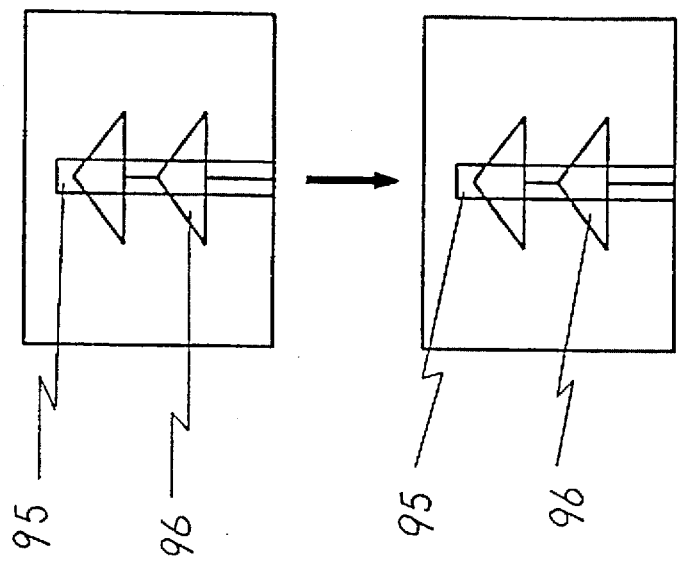

The antidominant eye determination support means 95 provided in the partially transparent shading plate 92 is located in dead space and obstructed by the virtual image forming optical system 3 when the device main body is mounted on the user's head. The device main body 1 is thus connected to the holding section 43 via the hinge section 70 so that the antidominant eye determination support means 95 can be identified by both eyes by moving the virtual image forming optical system 3 via the hinge section 70 in the direction shown by arrow B. The relative positions of external sight information 96 and an image of the antidominant eye determination support means 95 as seen by both eyes, or the right or left eye are described with reference to FIGS. 29A and 29B. These figures show an example in which the user's dominant eye is the right eye. FIG. 29A shows the relative positions determined when the images are viewed first with both eyes and subsequently with only the right eye. FIG. 29B shows the relative positions determined when the images are viewed first with both eyes and subsequently with only the left eye. These relative positions are compared, and the eye being tested when a larger misalignment occurred, that is, the left eye in the example in FIGS. 29A and 29B is determined to be an antidominant eye.

The antidominant eye determination support means 95 is located farther from the user 2 than the antidominant eye determination support means 93 in the above embodiment, and closer to the near point of the user's eyes, so this means can be seen more easily to enable the above antidominant eye determination to be conducted more easily. The antidominant eye determination support means 95 is not limited to a slit as long as it has a sufficient size and color to be identified by the user 2. It may be, for example, a round hole, an LED, a printed material, or paint.

Figure 30:
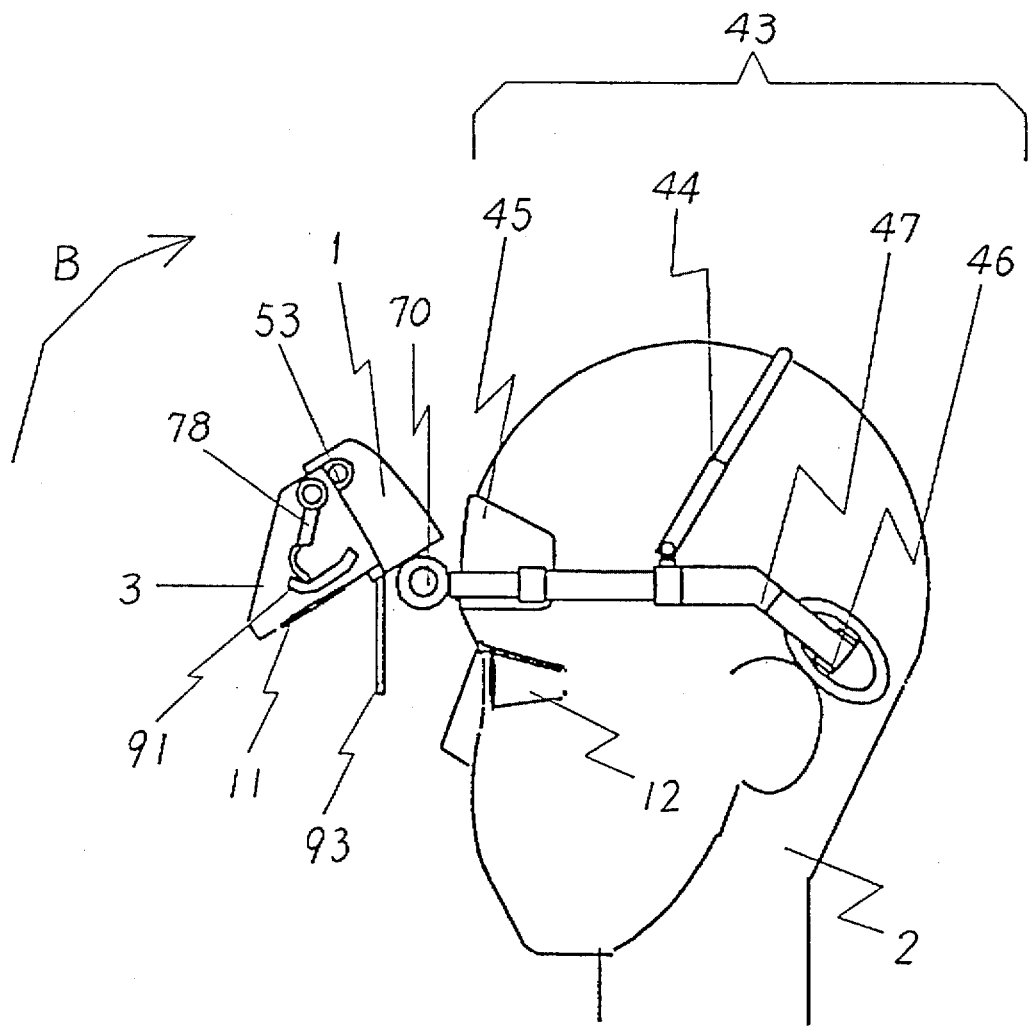
FIG. 30 is a model side view showing the sixth embodiment.

Furthermore, moving the virtual image forming optical system 3 to above the user's head enables the antidominant eye determination means 93 in the above embodiment to be used as shown in FIG. 30 to enable the antidominant eye determination to be conducted similarly.

(Embodiment 7)

FIGS. 31A and 31B are enlarged views of a head-mounted display device according to a seventh embodiment of this invention, and show the part designated by reference numeral 96 in FIG. 29.

In the above embodiment, when the slit that is the antidominant eye determination support means 95 is moved to above the user's head to prevent the antidominant eye determination support means 95 from being obstructed by the virtual image forming optical system 3. This embodiment employs a different means to enable the antidominant eye determination support means 95 to be seen by both eyes.

As in the above embodiment, the virtual image forming optical system 3 is retained on the device main body 1 via the shaft 51 shaped like a screw extending in the direction of the width of the user's eye, the shaft 51 including the knob 53 at both ends thereof. The optical system 3 is also retained so as to be moved in the direction of the width of the user's eye when the knob 53 is rotated as shown in FIG. 31A. In this case, the shaft 53 has a length at which the virtual image forming optical system 3 can move over the width of the user's eyes or longer. The maximum width of human eyes is generally 72 mm, so the virtual image forming optical system 3 must be able to move laterally over this length or longer. That is, any user can see the antidominant eye determination support means 95 with both eyes as long as the shaft 53 has a length at which the eye to view the virtual image can see the antidominant eye determination support means 95 from the inner surface of the virtual image forming optical system 3.

As a result, the virtual image forming optical system 3 can be simply moved outside the right or left line of sight to a position in which the antidominant eye determination support means 95 can be identified with both eyes, as shown in FIG. 31B, and the relative positions determined when the images are viewed by both eyes, the right or left eye can be compared to determine the antidominant eye eyesight, as in the above embodiment. The comparison of the relative positions of the virtual image and the antidominant eye determination support means 95 is the same as in FIGS. 29A and 29B.

(Embodiment 8)

Figure 32:
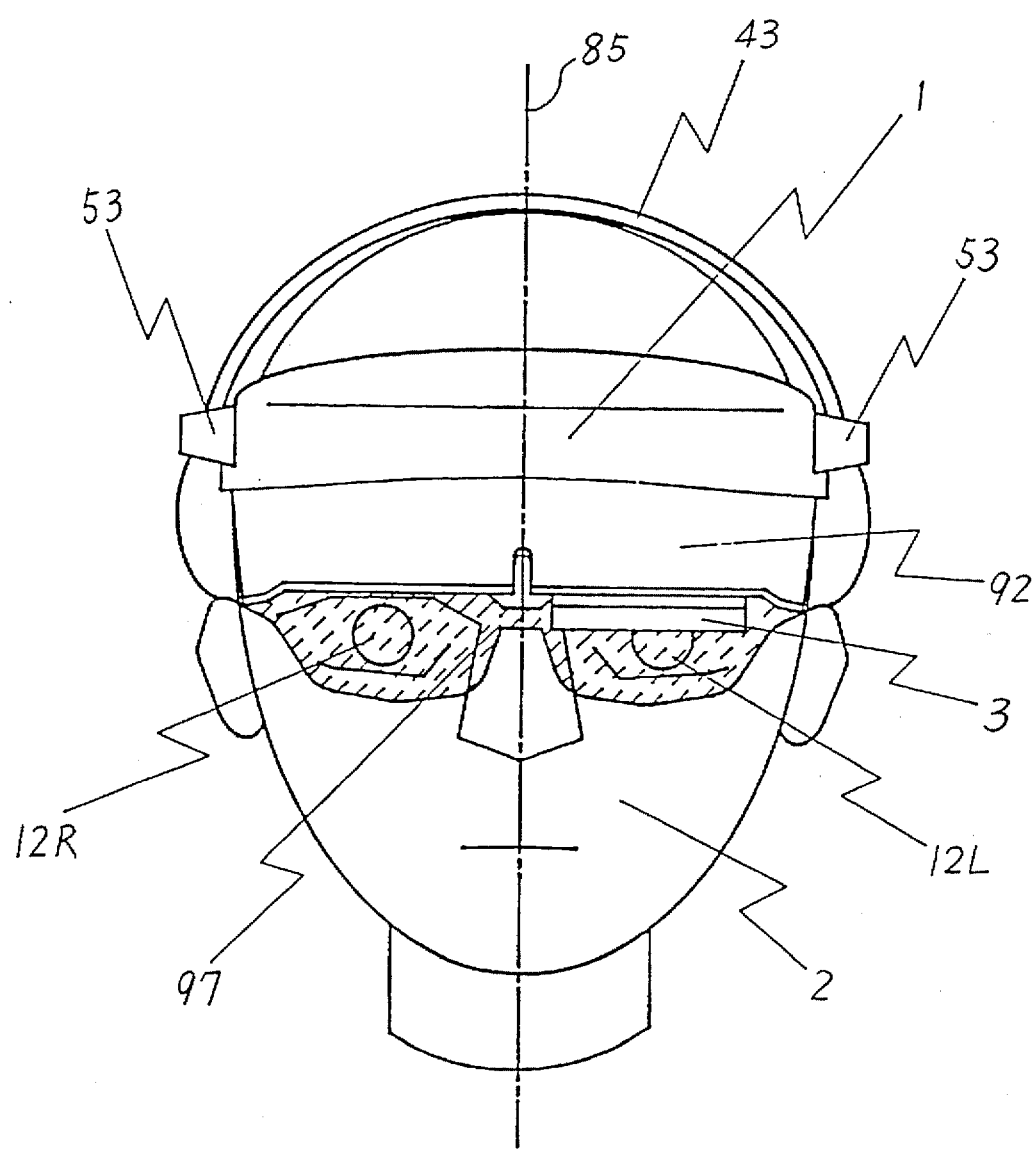
FIG. 32 is a model front view showing an eighth embodiment of this invention.
Figure 33:
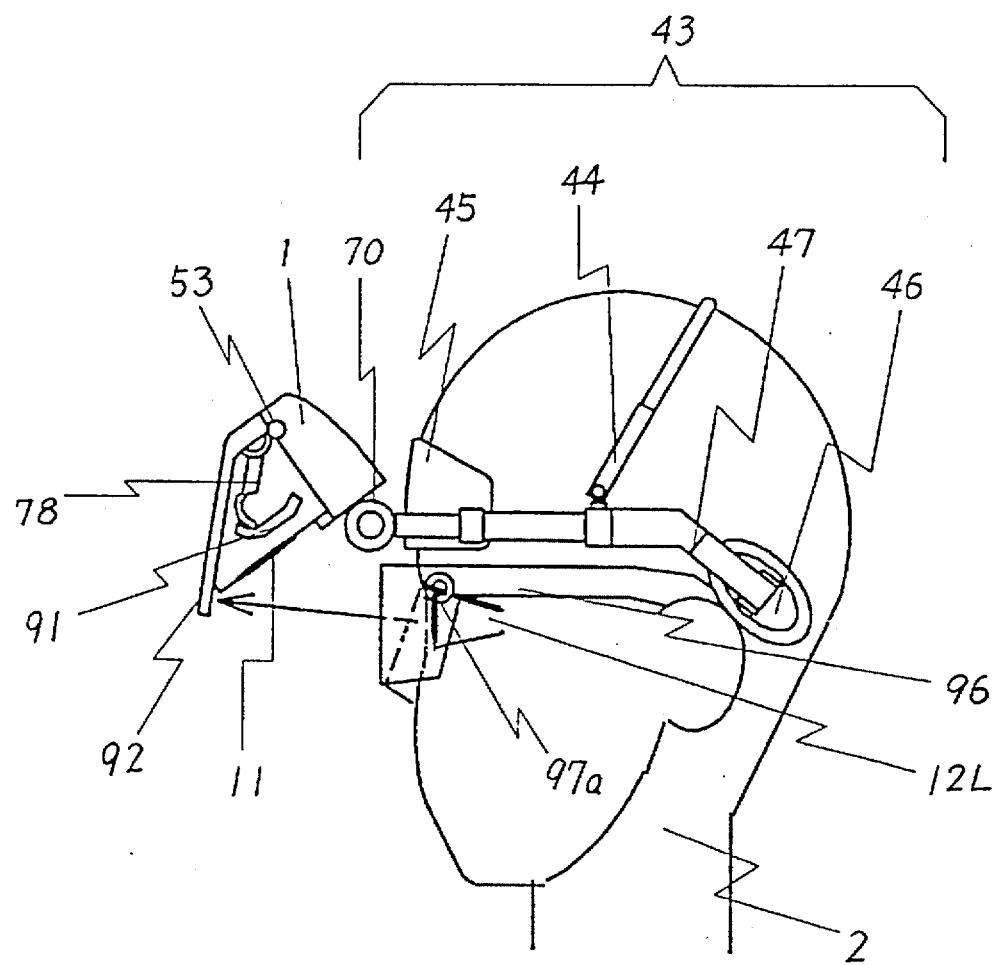
FIG. 33 is a model side view showing the eighth embodiment.

FIGS. 32 and 33 are model drawings showing an eighth embodiment of this invention. FIG. 32 is a front view, and FIG. 33 is a side view. As in the above embodiments, like components carry like reference numerals, and their explanation is thus omitted.

Figure 34:
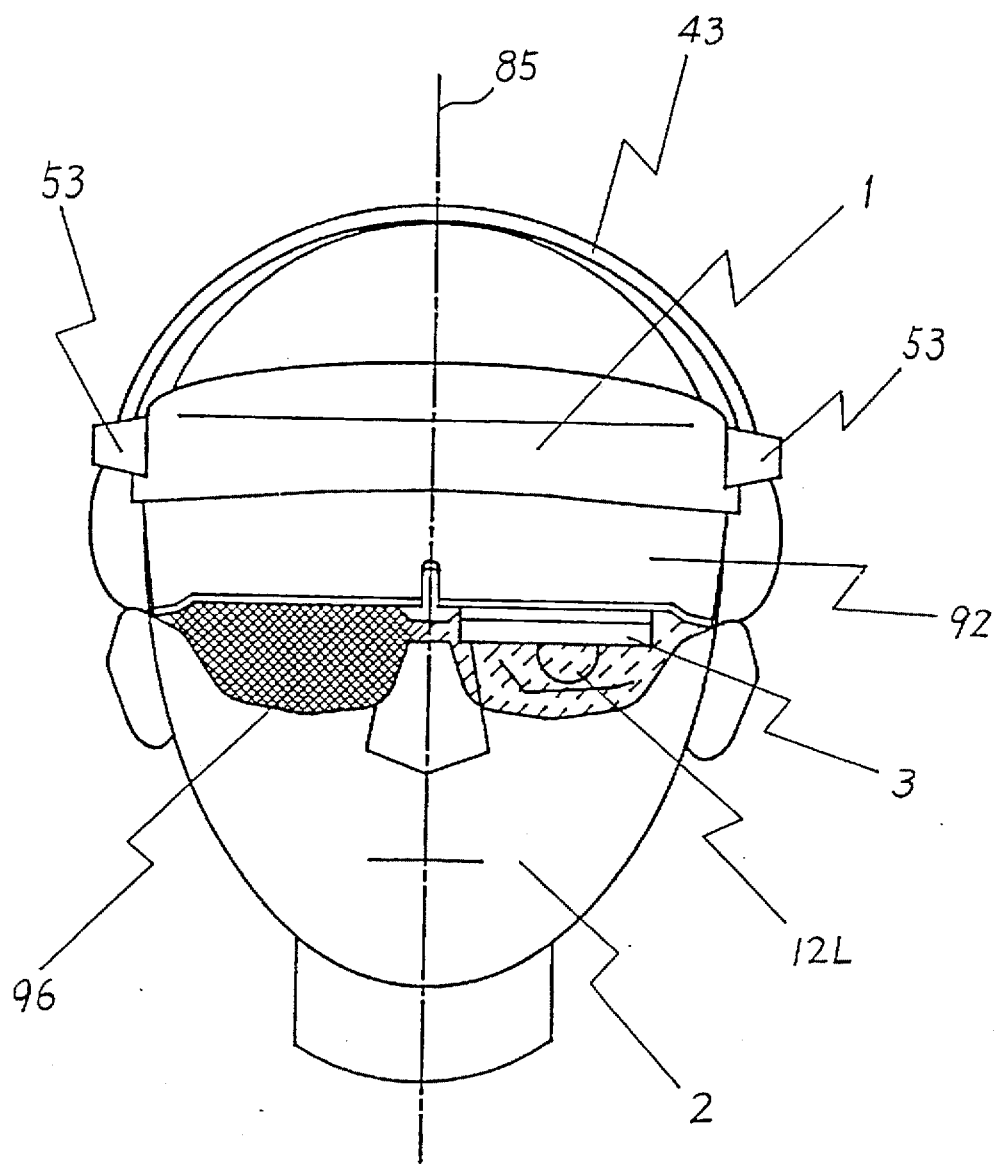
FIG. 34 is a model front view describing a shading means according to the eighth embodiment.

In the above antidominant eye determination, one of the user's eyes must be closed. The muscle around the open eye may thus somewhat contract and affect the antidominant eye determination. Thus, in this embodiment, a shading means 97 for allowing the eye to view the virtual image to be arbitrarily selected among both eyes, one of the eyes, or the other eye is provided between the device main body 1 and the user 2 to enable the user to determine the antidominant eye without closing his or her eye. The shading means 97 is shaped like spectacles, and its shading section comprises a liquid crystal display element and a polarizing element. The transmittance of the shading section is controlled by using a shading selection switch 97a provided on both sides of the shading means 97; each time the switch is pressed, shading and transmission are alternatively provided. The shading selection switches 97a are independent of each other, and shading and transmission are alternatively provided for the eye corresponding to the pressed switch. In FIG. 34, light is shaded on the right eye side while it is transmitted on the left eye side. By repeating this operation, both eyes or a single eye can be allowed to view the images. If the shading means 97 comprises a polarizing element, the fields of view in front of each eye can be mechanically and arbitrarily blocked by providing a sliding switch on the underside of the shading means 97. The shading means 97 may be integrated with the device main body 1.

(Embodiment 9)

Figure 35:
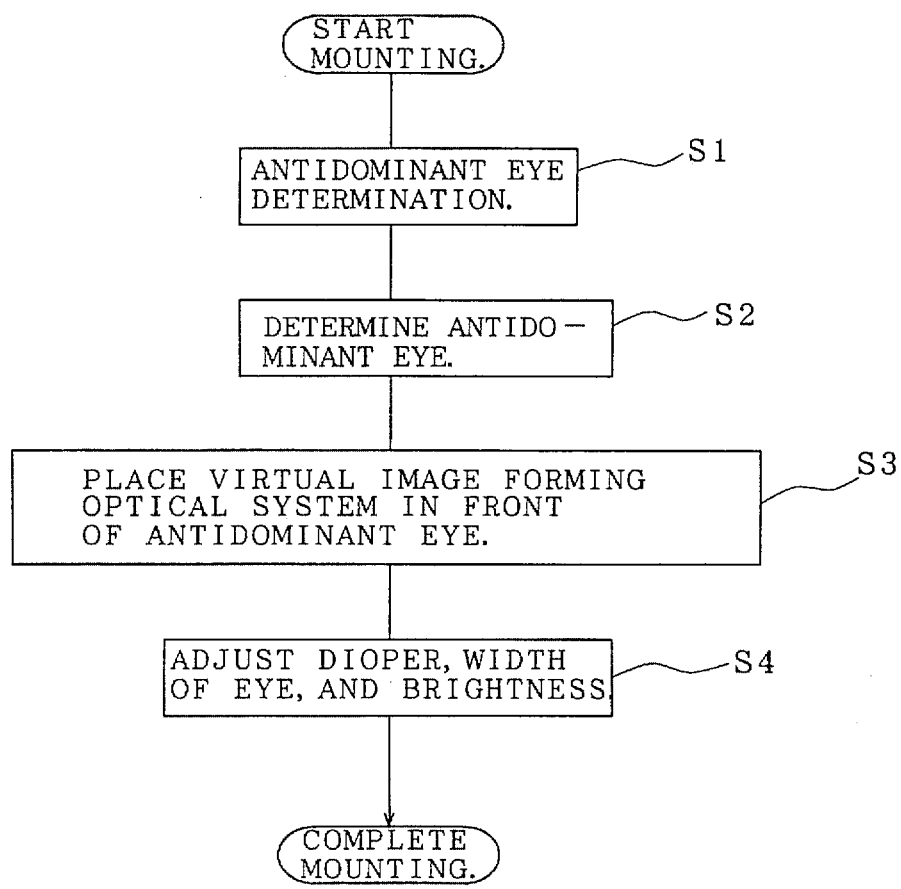
FIG. 35 is a flowchart describing a method for mounting the display device on the user's head according to the embodiments of this invention.
Figure 36:
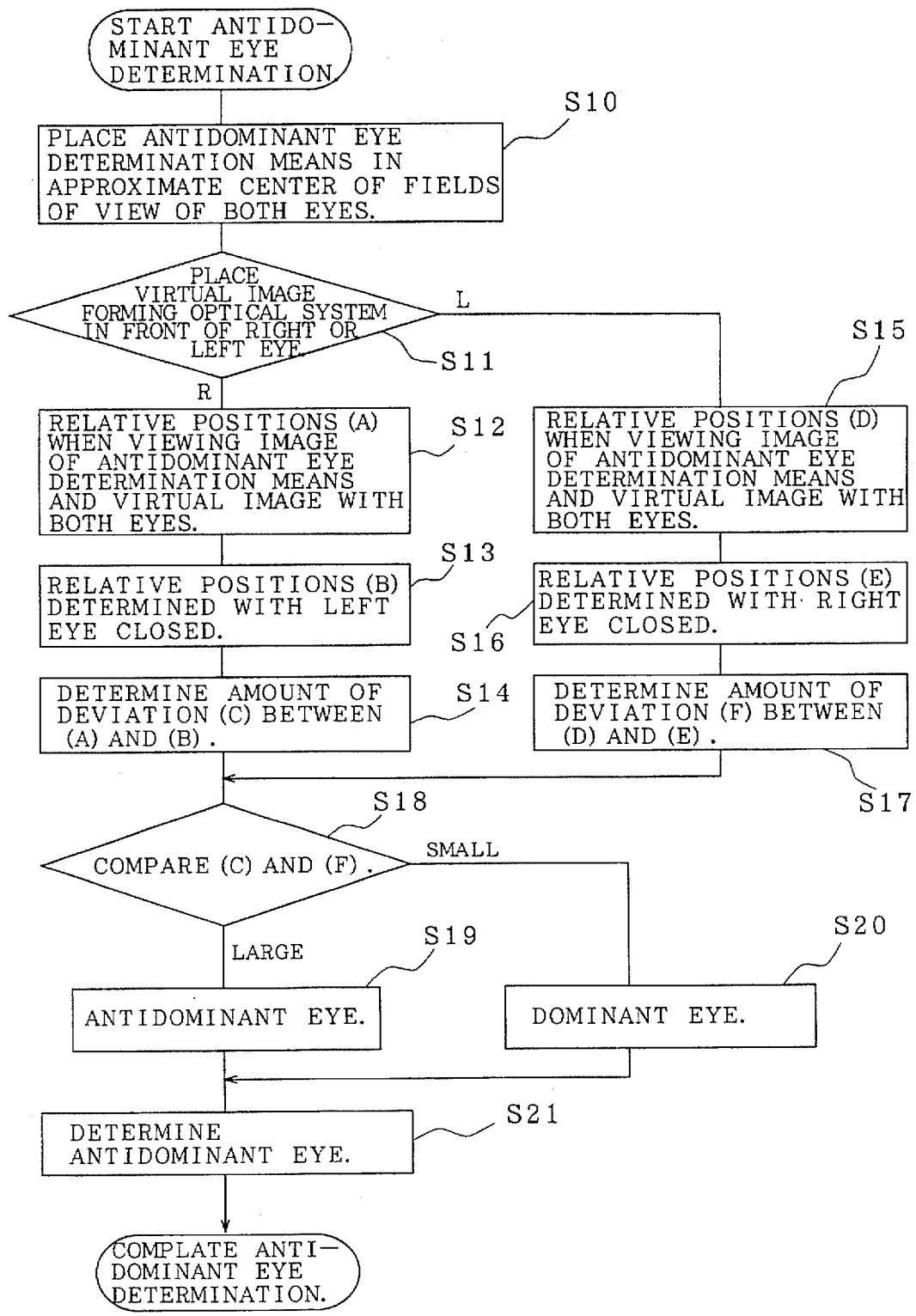
FIG. 36 is a flowchart describing a method for determining the antidominant eye according to the fifth embodiment.
Figure 37:
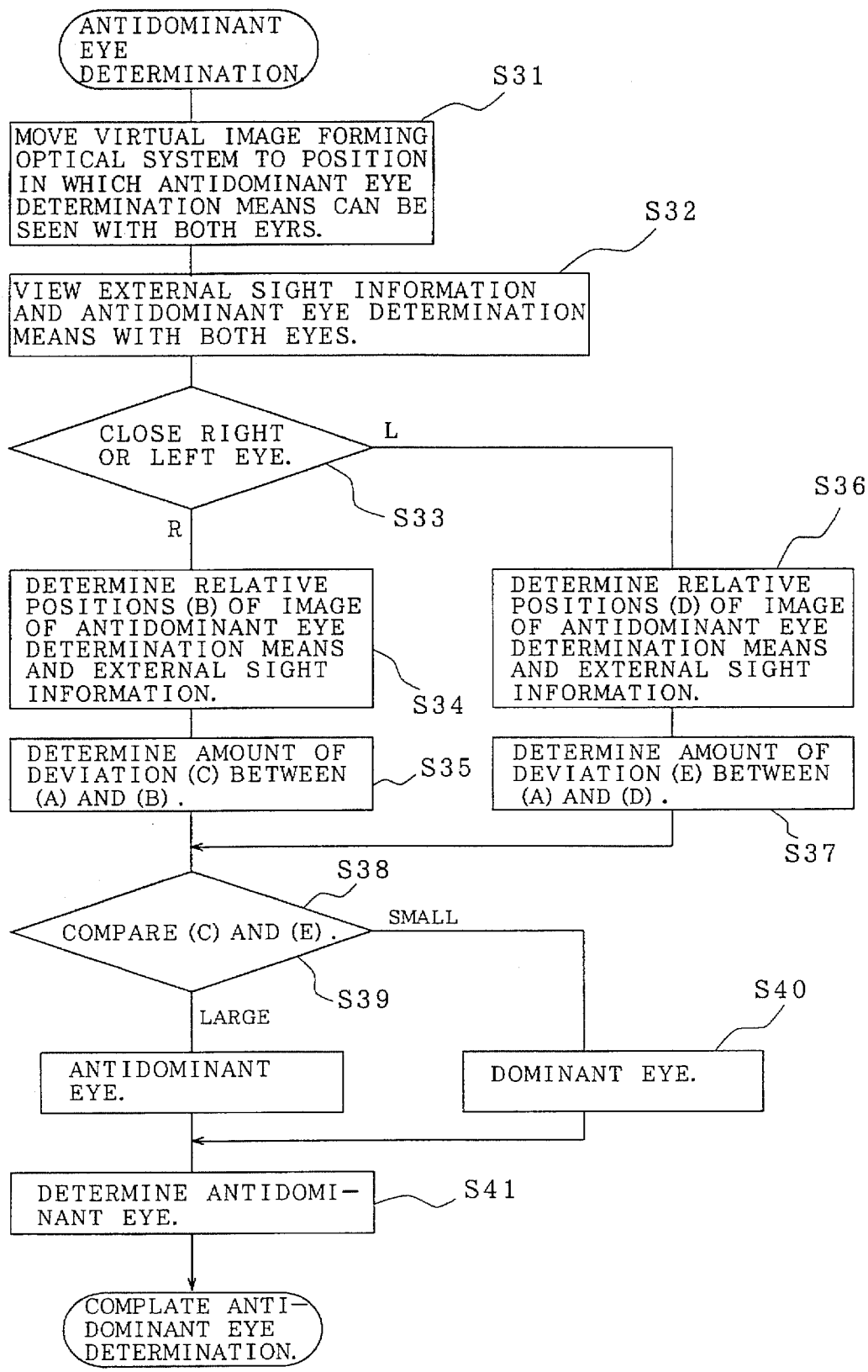
FIG. 37 is a flowchart describing a method for determining the antidominant eye according to the sixth and seventh embodiments.
Figure 38:
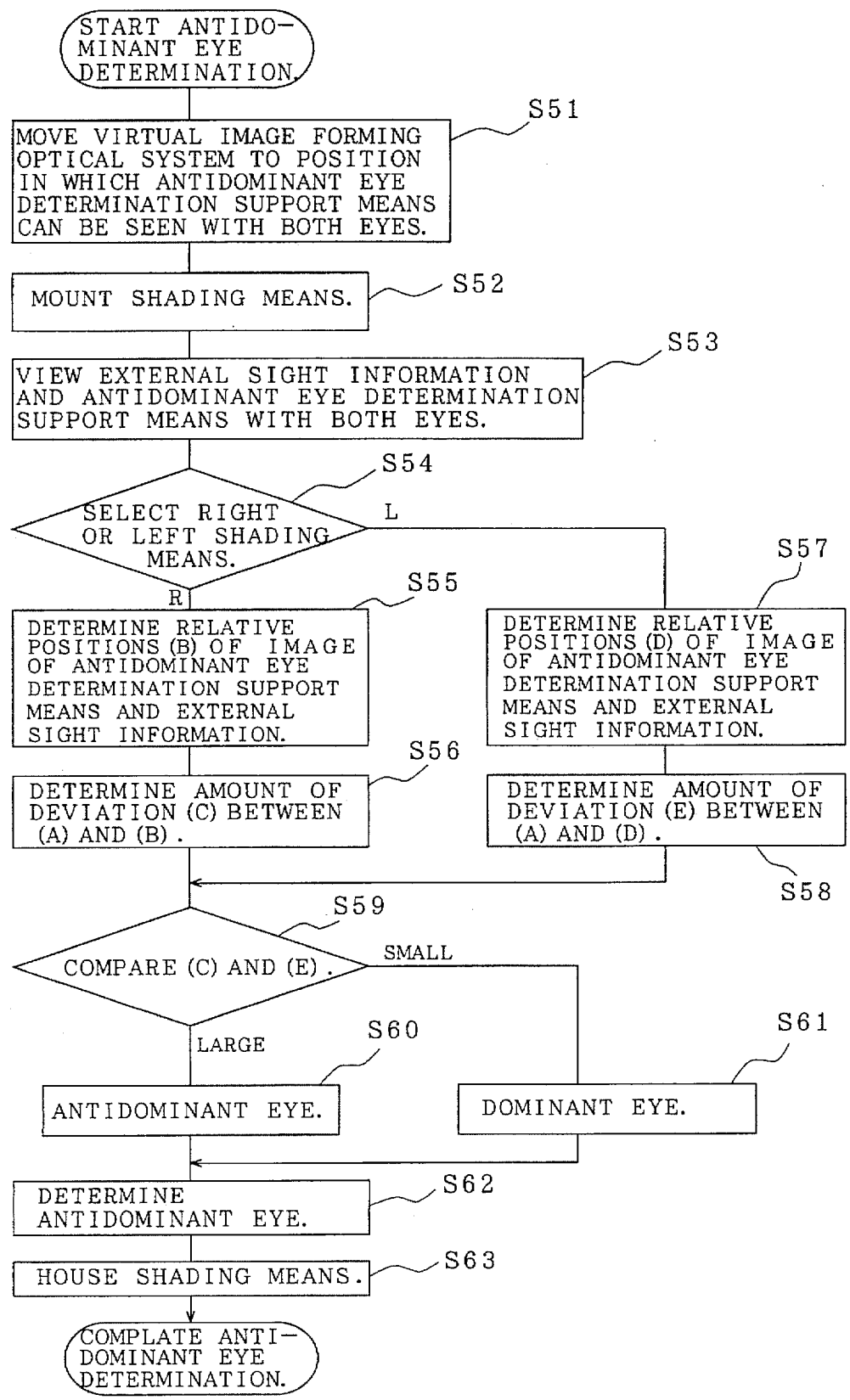
FIG. 38 is a flowchart describing a method for determining the antidominant eye according to the eighth embodiment.

FIGS. 35 to 38 are flowcharts describing a method for mounting the head-mounted display device on the user's head according to the embodiments of this invention. FIG. 35 explains the mounting of the overall device before the start of operation. FIG. 36 describes the antidominant eye determination method in the embodiment in FIGS. 24 and 25. FIG. 37 explains the antidominant eye determination method in FIGS. 27, 28, 30, 31A, and 31B. FIG. 38 describes the antidominant eye determination method in the embodiment in FIGS. 32 and 33.

As described above, since it has been found that allowing the antidominant eye to view the virtual image serves to reduce the fatigue, the device main body in this invention has a structure for determining the antidominant eye. To prevent the fatigue caused by mistakes in the selection of the eye to see the virtual image or the mounting of the device, the procedure for mounting the device main body on the user's head before initiating an operation is explained below.

As shown in FIG. 35, device main body 1 is held on the user's head so that the antidominant eye determination support means 93 or 95 is located in the approximate center of the width of the user's eye. The antidominant eye determination method of the corresponding embodiment is then used to conduct the above test (S1) to determine the user's antidominant eye (S2). The knob 53 is subsequently rotated to shift the virtual image forming optical system 3 to the antidominant eye (S3), while simultaneously the width of the eye is adjusted. The diopter adjustment control 78 is used to control diopter while viewing the virtual image 14 (94, 96) (S4). The mounting of the device is finished when the brightness of the back light has been adjusted to an optimum value.

FIG. 36 shows the procedure for the antidominant eye determination method according to Embodiment 5. The antidominant eye determination means 93 is placed in the approximate center of the fields of view of the user's eyes (S10), and the virtual image forming optical means 3 is positioned in front of one of the eyes (S11). Both eyes are allowed to view an image of the antidominant eye determination support means 93 and an image formed by the virtual image forming optical system 3 to determine their relative positions (A) (S12). The relative positions (B) are again determined with the eye that need not view the virtual image 12b closed (S13). (A) and (B) are compared to memorize the amount of misalignment (C) (S14). The virtual image forming optical means 3 is then moved to the opposite eye and a similar procedure is used to determine the amount of misalignment (F) (S15, S16, S17). (C) and (F) are compared (S18), and the eye being tested when a larger misalignment occurred is determined to be the antidominant eye (S19, S20, S21).

The procedure for Embodiments 6 and 7 is shown in FIG. 37. Since the antidominant eye determination means 93 is located in dead space with respect to the eye to view the virtual image, the virtual image forming optical means 3 is moved via the hinge section 52 to above the user's head to a position in which the antidominant eye determination means 93 can be seen by both eyes, or the knob 53 is rotated to move it in the direction of the width of the user's eye (S31). The same method as described above is used to determine the antidominant eye (S32 to S40).

FIG. 38 shows the procedure for Embodiment 8. As in FIG. 37, the virtual image forming optical means 3 is moved, the shading means 97 is installed between the device main body 1 and the user 2, and one of the shading selection switches located adjacent to the respective eyes is arbitrarily selected to allow one of the eyes to view the images. The shading means 97 is subsequently housed, and the virtual image forming optical means 3 is set in front of the antidominant eye determined.

These procedures enable the smooth and easy determination of the antidominant eye that is allowed to view the virtual image in order to prevent the wrong selection of the eye to view the virtual image and the resulting fatigue, whichever of Embodiments 5 to 8 may be used. They can also prevent the fatigue caused by mistakes in the mounting of the device.

(Embodiment 10)

Figure 39:
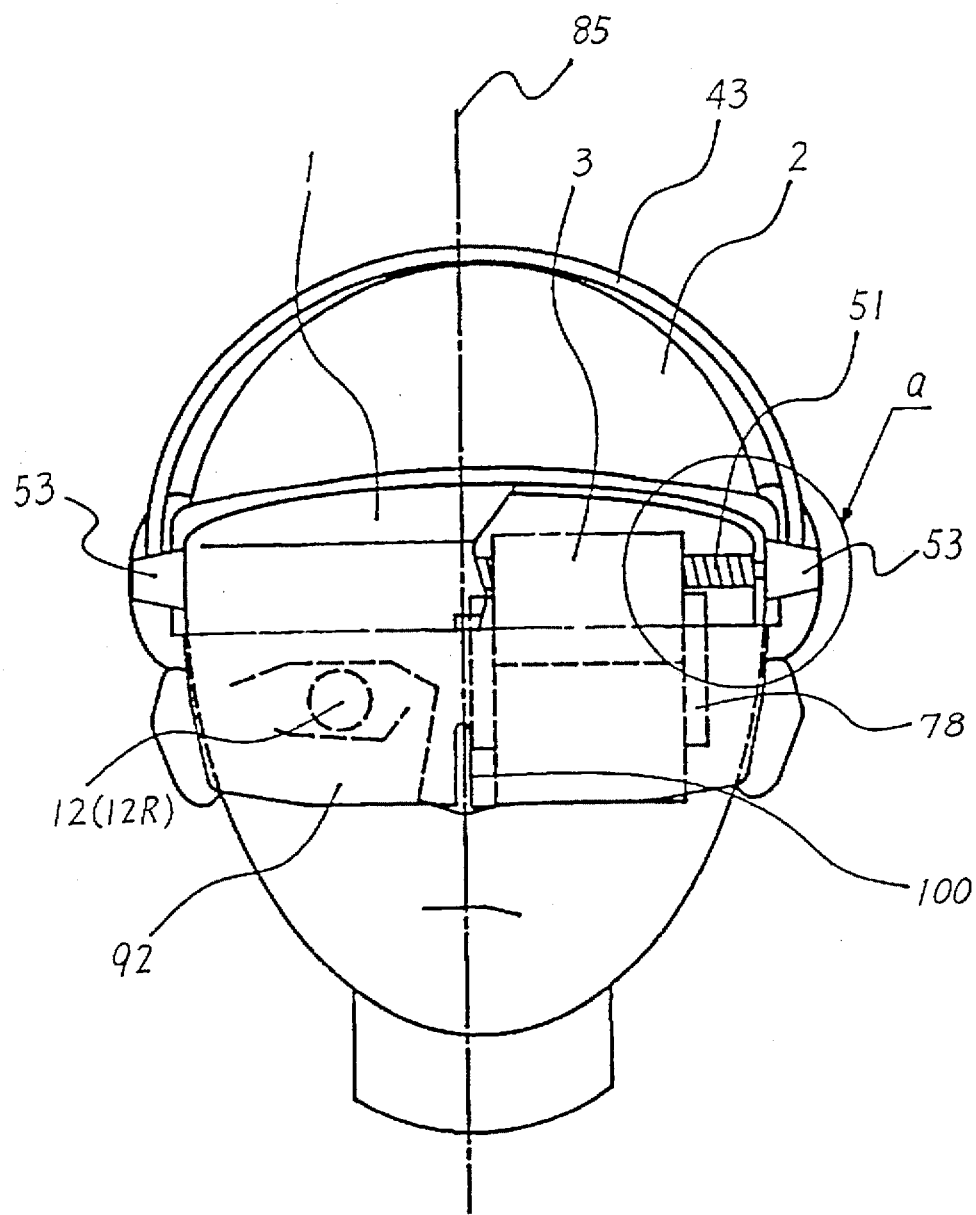
FIG. 39 is a model front view showing a tenth embodiment of this invention.
Figure 40:
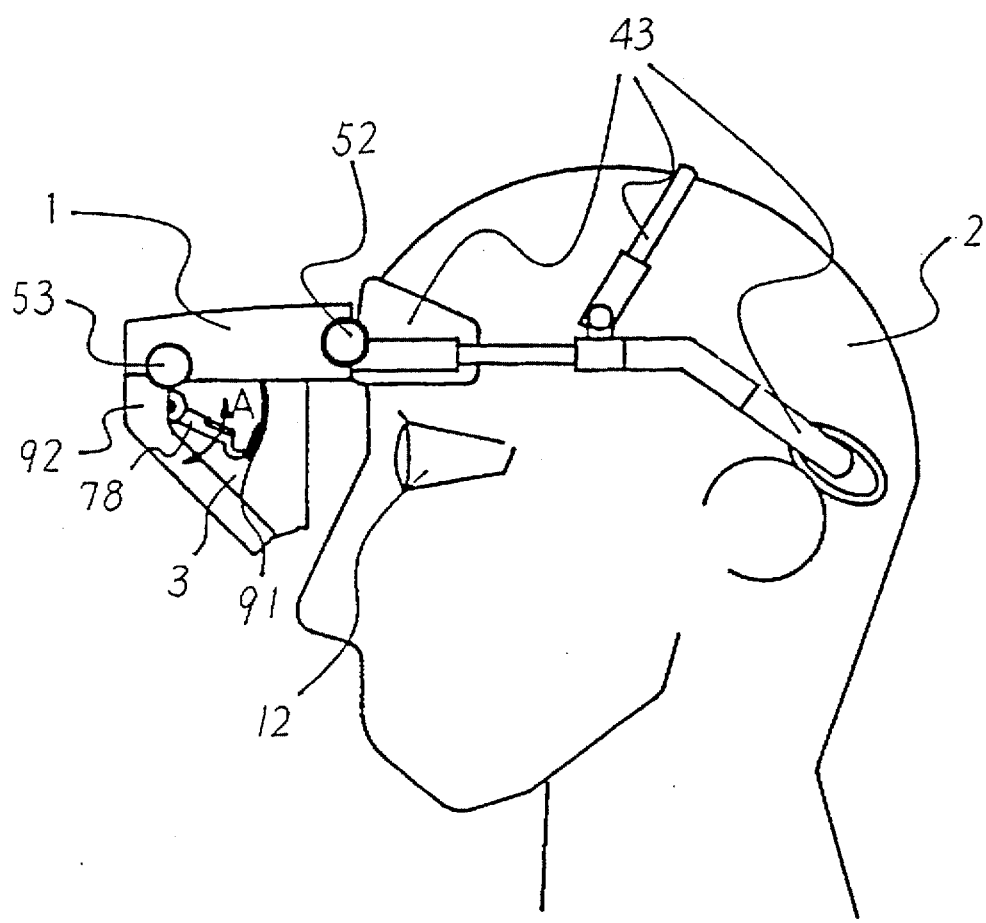
FIG. 40 is a model side view showing the tenth embodiment.

FIGS. 39 and 40 are model drawings showing a tenth embodiment of this invention. FIG. 39 is a front view, and FIG. 40 is a side view. The virtual image forming optical system 3 is the same as in, for example, the embodiment in FIG. 20, and its description is thus omitted.

The structure in FIGS. 39 and 40 has the same basic constitution as the structure according to the embodiment in FIGS. 27 and 28.

In this embodiment, the device main body 1 is disposed opposite to the user 2 relative to the virtual image forming optical system 3 and outside the movement space of the optical system 3, and includes the partially transparent shading plate 92 that partially covers the fields of view of both eyes of the user 2. The partially transparent shading plate 92 is generally used in monocular type head-mounted display devices to prevent decreases in the contrast of virtual image information caused by optical information incident on the eye that need not view the virtual image (the right eye 12R in the example shown in the figure). In this embodiment, since the partially transparent shading plate 92 is positioned outside the movement area of the virtual image forming optical system 3, it can partially remove information supplied to the eye that need not view the virtual image, regardless of the movement of the optical system 3 to the user's right or left eye.

While the device main body 1 is in operation, the optical axis 13 of the virtual image forming optical system 3 (see FIG. 20) must align with the user's line of sight. Since, however, the head-mounted display device is mounted on the user's head, the distance between the lens 11 and the eye to view the virtual image varies depending on the shape of the user's head. The lens 11 is usually set so as to have a relatively wide effective area to compensate for the variation. Thus, if the optical axis 13 of the virtual image forming optical system 3 somewhat deviates from the user's line of sight within the effective area, the user 2 sometimes fails to notice this misalignment and suffers fatigue.

In this embodiment, to prevent such misalignment, a slit 100 that acts as a location mark is provided on the partially transparent shading plate 92 in the intermediate position between the virtual image forming optical system 3 as placed in front of the user's right eye and the same optical system 3 as placed in front of the user's left eye. The partially transparent shading plate 92 is disposed between the near point of the user's eye and the user 2, so the slit 100 on the shading plate 92 is of course defocusing with respect to the user's eye. The position of the slit 100, however, can be identified as long as it has an appropriate size. Thus, after mounting the device main body 1 on his or her head, the user 2 can generally align the slit 100 with the user's center line 85 by rotating the device main body 1 around his or her head so that the slit 100 aligns with the center of his or her face. This reduces the occurrence of the fatigue caused by misuse including misalignment. The location mark that acts as a center determination support means is not limited to the slit 100 as long as it has a sufficient size and color to be identified by the user 2. It may be, for example, printing or paint on the partially transparent shading plate 92.

(Embodiment 11)

Figure 41:
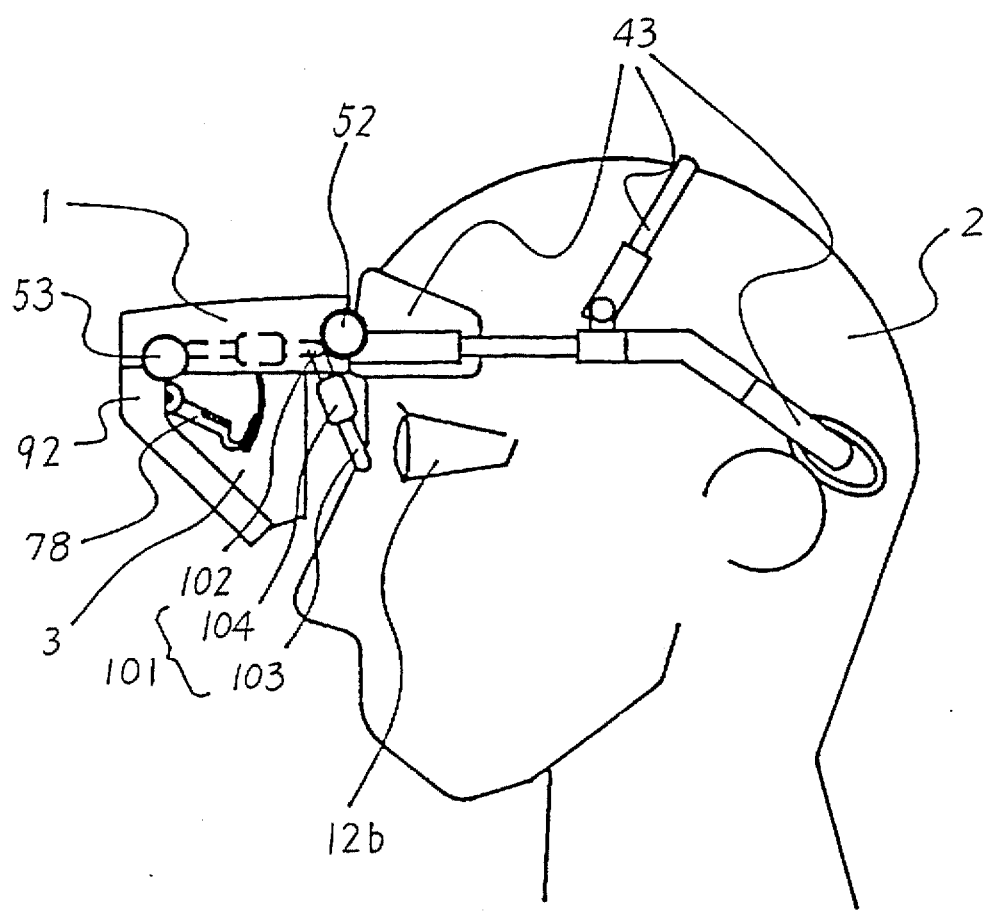
FIG. 41 is a model side view showing an eleventh embodiment of this invention.

FIG. 41 is a side view of a head-mounted display device representing an eleventh embodiment of this invention.

In this embodiment, the device main body 1 has a nose support means 101 that acts as a center determination support means, in the intermediate position between the virtual image forming optical system 3 as placed in front of the user's right eye and the same optical system 3 as placed in front of the user's left eye. The nose support means 101 is installed on the device main body 1 and has a rotational support point 102 outside the movement space of the virtual image forming optical system 3. The overall nose support means 101 is movably supported outside the movement space of the virtual image forming optical system 3, as shown by the broken line in the figure. The nose support means 101 includes a nose support section 103 that sits astride the user's nose and an adjustment section 104 for adjusting the length of the nose support means 101, and the nose support section 103 can be moved in the axial direction of the nose support means 101 by rotating the adjustment means 104.

In this configuration, the user 2 can align his or her center line 85 with the intermediate position between the virtual image forming optical system 3 as placed in front of the user's right eye and the same optical system 3 as placed in front of the user's left eye by mounting the device main body 1 on his or her head and adjusting the length of the nose support means 101 so that it sits astride the user's nose. By subsequently moving the nose support means 101 to outside the movement space of the virtual image forming optical system, the virtual image forming optical system 3 can be switched to the right or left without hinderance. The nose support means 101 may be moved to the outside the movement space of the virtual image forming optical system 3 only when the optical system is to be moved, or may be allowed to contact the user's nose only when the center is to be determined and otherwise housed in the device main body 1. The latter method is effective if the use of this means with spectacles is cumbersome or the user feels sick of constant contact with this means.

As described above, this embodiment also reduces the occurrence of the fatigue caused by the misuse of the device including misalignment.

(Embodiment 12)

Figure 42:
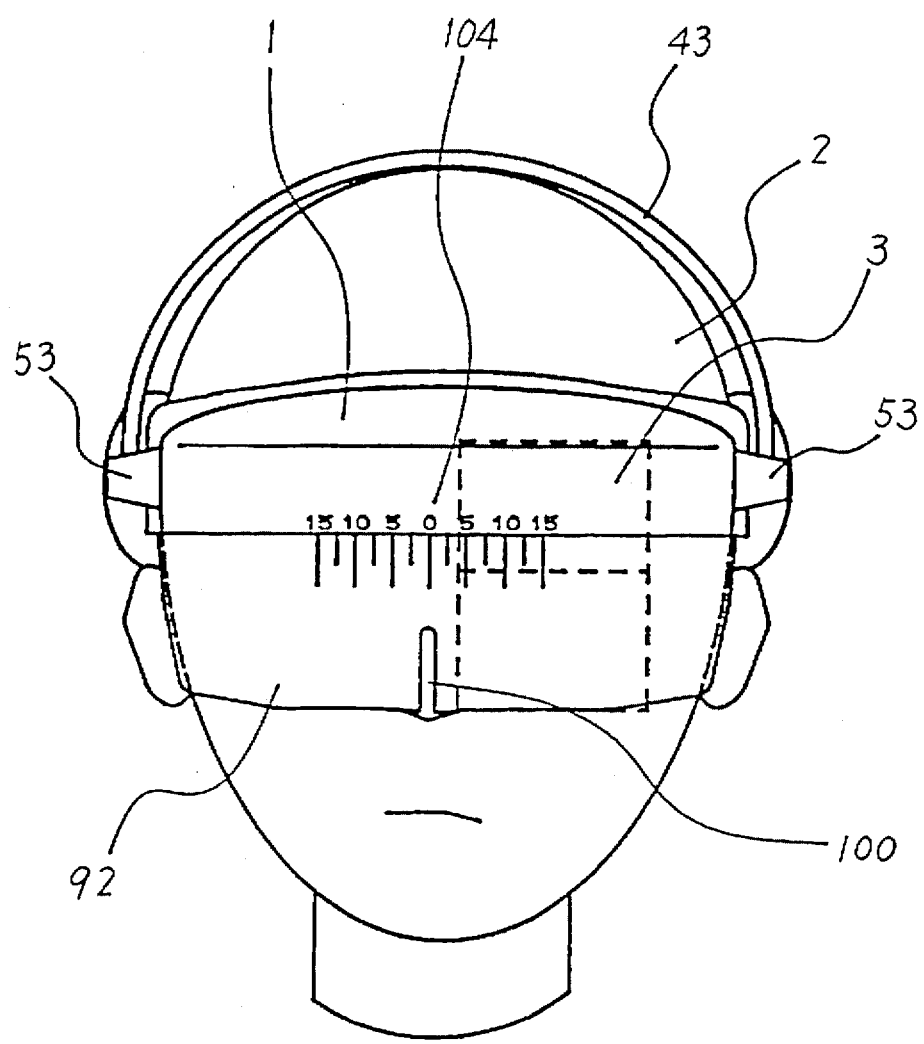
FIG. 42 is a model front view showing a twelfth embodiment.

FIG. 42 is a front view of a head-mounted display device representing a twelfth embodiment of this invention.

The center determination support means in FIG. 42 is the slit 100 described in Embodiment 10 above, and the user 2 determines the center of the device main body 1 as described above. Before viewing the virtual image, the user 2 also rotates the knob 53 to select the view to see the virtual image and to adjust the width of the user's eye. An indication 104 shown in FIG. 42 is provided on the partially transparent shading plate 92 and a wall above the shading plate. Since the partially transparent shading plate 92 partially transmits light, viewing the device main body 1 frontways enables the movement of the virtual image forming optical system 3 to be read from the graduation behind which the reference surface (for example, the user's nose side of the optical system 3) of the optical system 3 is situated.

Thus, if the user 2 must repetitively use the device, misalignment can be further hindered by reading the movement of the virtual image forming optical system 3 to move it to the determined position before mounting the device main body 1, in combination with the subsequent center determination.

The indication 104 is not limited to the one shown in FIG. 42, but may be numbers directly corresponding to the width of the user's eye or a marker movably and fixably provided for indicating the movement of the virtual image forming optical system 3. Of course, instead of the slit 100, the above nose support means 101 may be used for the center determination support means.

(Embodiment 13)

Figure 43:
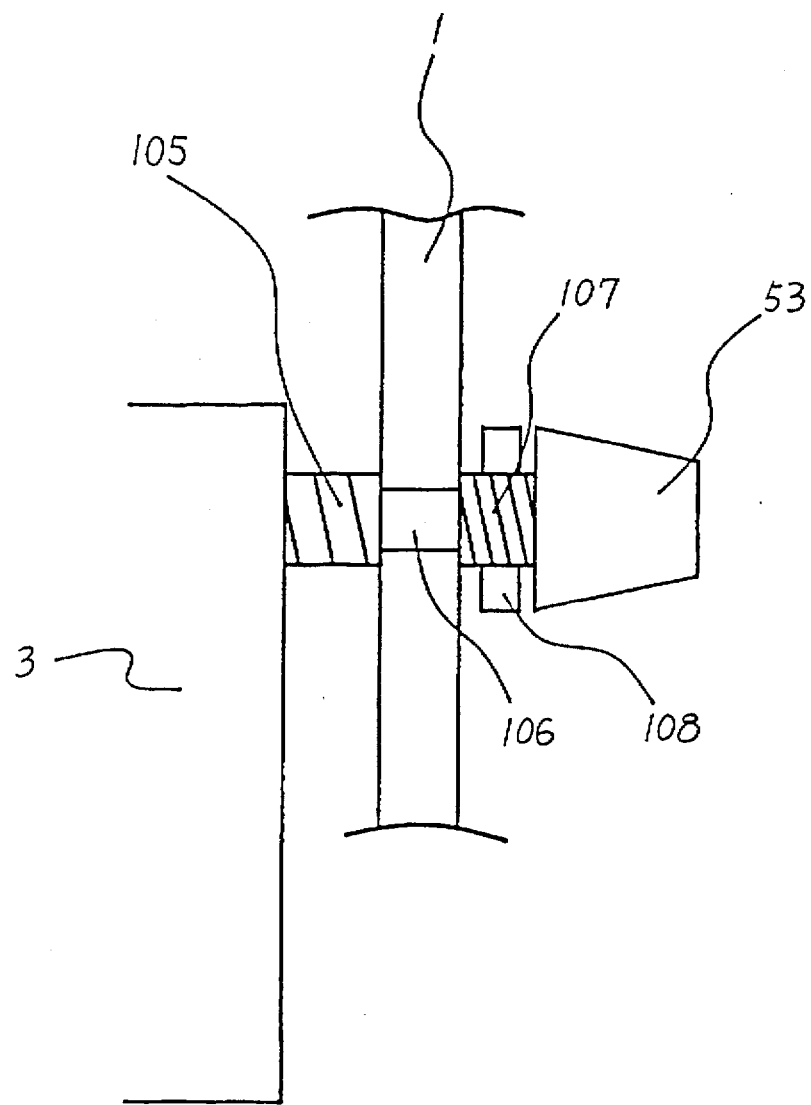
FIG. 43 is a partially enlarged view showing mechanisms around a knob in the above embodiment.

FIG. 43 is a partially enlarged view showing peripheral mechanisms for the knob 53 in the above embodiment, and shows the part (a) in FIG. 39.

In this figure, the virtual image forming optical system 3 extends approximately in the direction of the width of the user's eye, and is retained via a screw-like shaft 105 so as to move approximately in the direction of the width of the user's eye. Due to its non-screw section 106 fitted in the device main body 1, the shaft 105 is retained so as to rotate without affecting the device main body 1. The shaft 105 has beyond the non-screw section another screw section 107 that connects to the knob 53. A fixture 108 is spirally connected to the screw section 107. For simplification, only one end of the shaft 105 is shown, but the other end has a similar configuration.

A switching means including a fixing mechanism of the above constitution carries out switching as follows. When the knob 53 is rotated, the shaft 105 moves, according to the rotation, to rotate without affecting the device main body 1. The virtual image forming optical system 3 spirally connected and fitted to the shaft 105 thus moves approximately in the direction of the width of the user's eye. After the virtual image forming optical system 3 has moved to a desired position, the fixture 108 is rotated so as to contact the side wall of the device main body 1. Then, the knob 53 can no longer be rotated. Conversely, if under these conditions, the virtual image forming optical system 3 is to be moved again, the fixture 108 is rotated reversely so as to leave the side wall of the device main body 1.

Consequently, if the same user must repetitively view images, misalignment can further be hindered due to the pre-fixture of the virtual image forming optical system 3 to the user's optimum position, in combination with the subsequent center determination.

(Embodiment 14)

Figure 44:
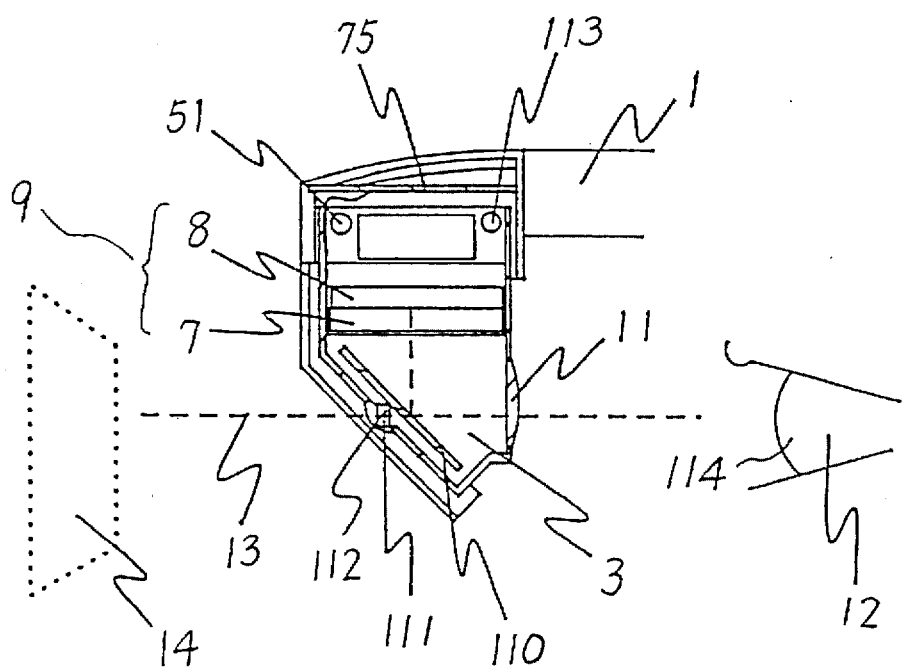
FIG. 44 is an enlarged view of an optical system representing a fourteenth embodiment of this invention.

FIG. 44 is a model drawing showing a fourteenth embodiment of this invention, and shows an enlarged view of an internal optical system.

In the virtual image forming optical system 3, an image light formed and output by the image display element 9 has its optical path changed by a partially transparent mirror 110, and is then formed by the lens 11 as an image in the user's eye 12. If the image formation surface of the image display element 9 is disposed between the object side focus of the lens 11 and the lens 11 and the eye 12 to view the virtual image is located near the image side focus of the lens 11, the image forming effect of the lens 11 allows the enlarged virtual image 14 of screen information to be seen on the extension of the optical axis 13 of the virtual image forming optical system 3. This embodiment also has a pupil detection means comprising a pupil detection sensor 111 and an infrared LED 112, on the transmission axis of the partially transparent mirror 110 and in a position corresponding to the optical axis 13 of the virtual image forming optical system 3.

An infrared light output from the infrared LED 112 penetrates the partially transparent mirror 110, is then reflected by the user's pupil, and again penetrates the partially transparent mirror 110. The light is then received by the pupil detection sensor 111 to detect its intensity in order to detect the position of the pupil. By rotating the control 53 (see FIG. 45, etc.) protruding sideward, the shaft 51 is rotated without affecting the device main body 1. The virtual image forming optical system 3 spirally connected to the shaft 51 can thus be moved approximately in the direction of the width of the user's eye. In this case, the virtual image forming optical system 3 can be moved more stably by providing the optical system 3 with a guide shaft 113 or a guide plane in parallel with a shaft A4.

To move and position the virtual image forming optical system 3 in front of the right or left eye, the user 2 rotates the control 53 of the shaft 51 to put out the back light 8. After moving the virtual image forming optical system 3 approximately to a position in which the overall virtual image 14 can be seen, the user lights the infrared LED 112 located behind the partially transparent mirror 110, uses the pupil detection sensor 111 to measure the intensity of infrared light reflected from the pupil, and feeds the result back to the drive circuit 75. The drive circuit 75 compares data on the quantity of reflected light transmitted from the pupil detection sensor 111, to the preset quantity of reflected light. If the quantity in the data is not equal to the set value, a means for informing the user of misalignment is used to alarm the user 2. To do this, for example, a buzzer 115 (see FIG. 45) may be activated, the image from the image display element may be allowed to disappear with the back light 8 prevented from turning on, or an image such as an alarm indication may be allowed to overlap the virtual image 14.

A simple alarm such as a buzzer sound serves to simplify the constitution of the device, and the user can notice it easily. If the image from the image display element 9 is allowed to disappear, the user cannot see the image unless he or she corrects the misalignment. This method can thus prevent the misuse of the device due to the misalignment of the user's pupil 114 with the virtual image forming optical system 3, and the user can notice the misuse without affecting surrounding people. If a specific image is allowed to overlap the virtual image, the user can notice the misuse without affecting surrounding people, even under noisy conditions, or even if he or she is hard of hearing.

As described above, according to this embodiment, the virtual image forming optical system 3 can be moved approximately in the direction of the width of the user's eye, and the pupil detection means can be used to accurately and easily adjust the position of the optical system 3 to the position of the pupil. As a result, the user 2 is prevented from moving his or her eyeballs unnaturally, so the fatigue of the eyes caused by the misalignment of the user's pupil with the device is avoided, and the structure of the associated adjustment mechanisms is simplified.

In addition, since the pupil detection means is provided on the transmission axis of the partially transparent mirror 110 and in a position corresponding to the optical axis 13 of the virtual image forming optical system 3, the constitution of this means can be simplified, and the position of the user's pupil can be detected without increasing the size of the device main body.

(Embodiment 15)

Figure 45:
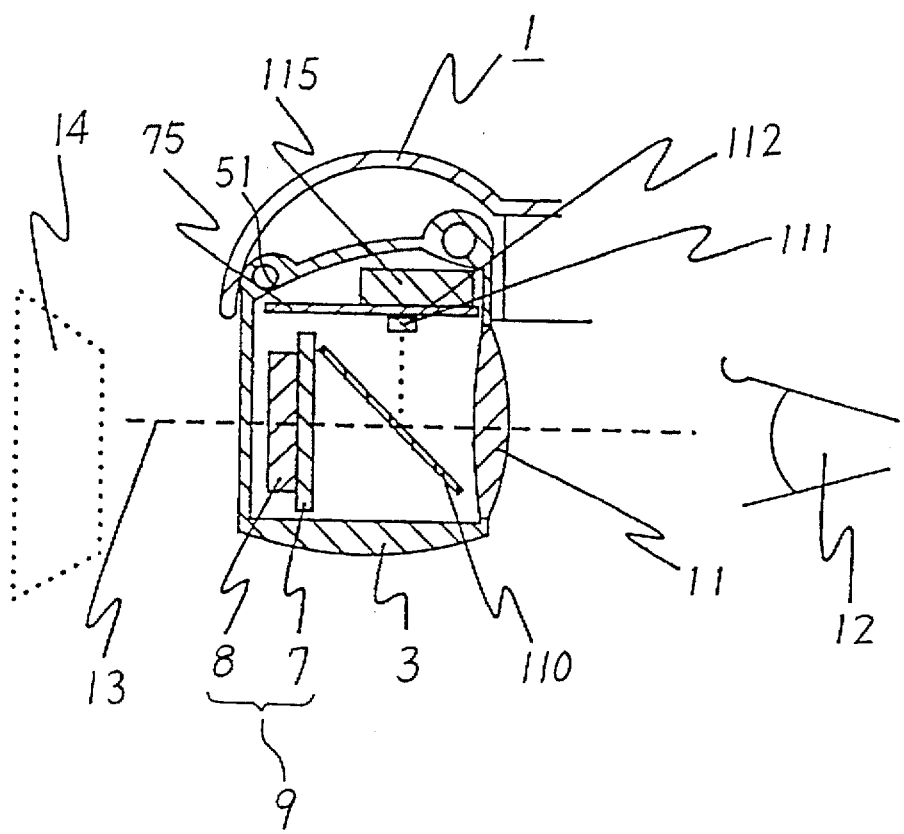
FIG. 45 is an enlarged view of an optical system representing a fifteenth embodiment of this invention.

FIG. 45 is a model drawing showing a fifteenth embodiment of this invention, and shows an enlarged view of an internal optical system.

In the virtual image forming optical system 3, an image light formed and output by the image display element 9 penetrates the partially transparent mirror 110, and is formed by the lens 11 as an image in the user's eye 12. If the image formation surface of the image display element 9 is disposed between the object side focus of the lens 11 and the lens 11 and the eye 12 to view the virtual image is located near the image side focus of the lens 11, the image forming effect of the lens 11 allows the enlarged virtual image 14 of screen information to be seen on the extension of the optical axis 13 of the virtual image forming optical system 3. The partially transparent mirror 110 is disposed on the optical path between the image display element 9 and the eye 12, and the pupil detection means comprising the pupil detection sensor 111 and infrared LED 112 is located on the reflected light path of the partially transparent mirror 110 and in a position corresponding to the optical axis 13 of the virtual image forming optical system 3.

An infrared light output from the infrared LED 112 is reflected by the partially transparent mirror 110, then by the user's pupil, and then again by the partially transparent mirror 110. The light is then received by the pupil detection sensor 111 to detect its intensity in order to detect the position of the pupil.

To move and position the virtual image forming optical system 3 in front of the right or left eye, the user 2 rotates the control 53 (see FIG. 45, etc.) of the shaft 51 to put out the back light 8. After moving the virtual image forming optical system approximately to a position in which the overall virtual image 14 can be seen, the user lights the infrared LED 112 located on the reflection axis of the partially transparent mirror 110, uses the pupil detection sensor 111 to measure the intensity of infrared light reflected from the pupil, and feeds its result back to the drive circuit 75. The drive circuit 75 compares data on the quantity of reflected light transmitted from the pupil detection sensor 111, to the preset quantity of reflected light. If the quantity in the data is not equal to the set value, a means for informing the user of misalignment, for example, the buzzer 115 is used to inform the user 2 of the misalignment.

As described above, the virtual image forming optical system 3 can be moved approximately in the direction of the width of the user's eye, and the pupil detection sensor 111 can be used to accurately and easily adjust the position of the optical system 3 to the position of the pupil. As a result, the user 2 is prevented from moving his or her eyeballs unnaturally, so the fatigue of the eyes caused by the misalignment of the user's pupil with the device is avoided, and the structure of the associated adjustment mechanisms is simplified.

In addition, since the partially transparent mirror 110 is disposed on the optical path between the image display element 9 and the user's pupil, this device can be applied to the virtual image forming optical system 3 of a linear arrangement such as shown in FIG. 45, thereby enabling the user's pupil to be detected without increasing the size of the device main body.

(Embodiment 16)

Figure 46:
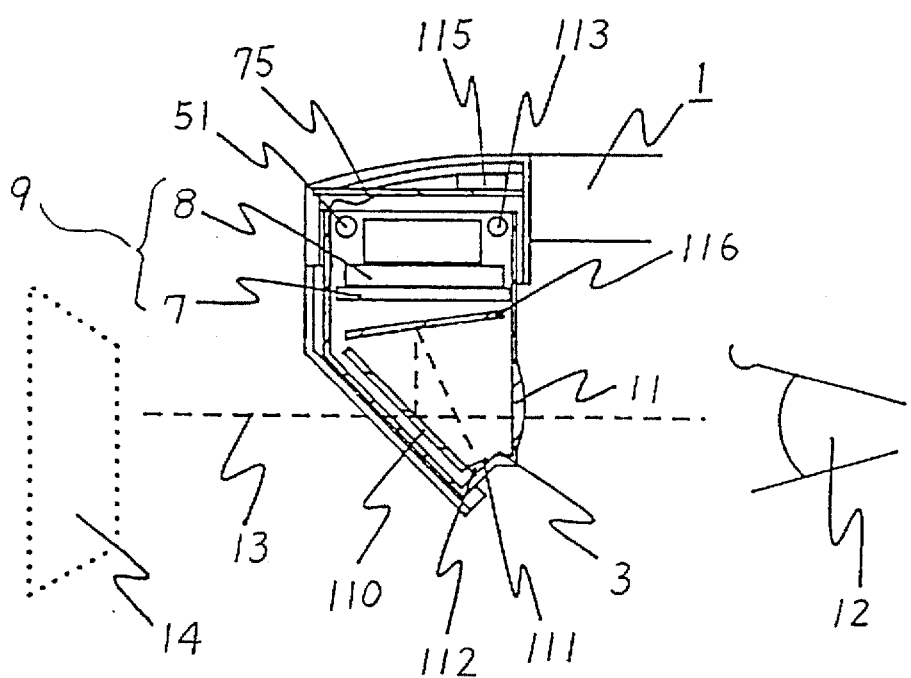
FIG. 46 is an enlarged view of an optical system representing a sixteenth embodiment of this invention.

FIG. 46 is a model drawing showing a sixteenth embodiment of this invention, and shows an enlarged view of an internal optical system.

After penetrating a partially transparent mirror 116, an image light formed and output by the image display element 9 has its optical path changed by the partially transparent mirror 110, and is then formed by the lens 11 as an image in the user's eye. If the image formation surface of the image display element 9 is disposed between the object side focus of the lens 11 and the lens 11 and the eye 12 to view the virtual image is located near the image side focus of the lens 11, the image forming effect of the lens 11 allows the enlarged virtual image 14 of screen information to be seen on the extension of the optical axis 13 of the virtual image forming optical system 3. The pupil detection means comprising the pupil detection sensor 111 and infrared LED 112 is located on the reflected light path of the partially transparent mirror 116 and in a position corresponding to the optical axis 13 of the virtual image forming optical system 3.

An infrared light output from the infrared LED 112 is reflected by the partially transparent mirror 116, then by the partially transparent mirror 110, then by the user's pupil, and then again by the partially transparent mirror 110. The light is then reflected by partially transparent mirror 116, and received by the pupil detection sensor 111 to detect its intensity in order to detect the position of the pupil.

To move and position the virtual image forming optical system 3 in front of the right or left eye, the user 2 rotates the control 53 (see FIG. 45) of the shaft 51 to put out the back light 8. After moving the virtual image forming optical system approximately to a position in which the overall virtual image 14 can be seen, the user lights the infrared LED 112 located on the reflection axes of the partially transparent mirrors 110 and 116, uses the pupil detection sensor 111 to measure the intensity of infrared light reflected from the pupil, and feeds the result back to the drive circuit 75. The drive circuit 75 compares data on the quantity of reflected light transmitted from the pupil detection sensor 111, to the preset quantity of reflected light. If the quantity in the data is not equal to the set value, for example, the buzzer 115 is used to inform the user 2 of the misalignment, as in the above embodiments (14 and 15).

As described above, according to this embodiment, the virtual image forming optical system 3 can be moved approximately in the direction of the width of the user's eye, and the pupil detection means can be used to accurately and easily adjust the position of the optical system 3 to the position of the pupil. As a result, the user 2 is prevented from moving his or her eyeballs unnaturally, so the fatigue of the eyes caused by the misalignment of the user's pupil with the device is avoided, and the structure of the associated adjustment mechanisms is simplified.

In addition, since the partially transparent mirror 116 is disposed on the reflection axis of the partially transparent mirror 110, the pupil detection means does not obstruct the field of view, and the application of this device to the see-through-type virtual image forming optical system 3 such as shown in FIG. 46 becomes possible. In addition, the angle of incidence of light on the partially transparent mirror 116 is set at a small value, so the user's pupil can be detected without increasing the size of the device main body 1.

If the power of the lens 11 must be canceled to view the external sight, a lens that functions to cancel the power of the lens 11 may be disposed on the transmission axis of the partially transparent mirror 110.

(Embodiment 17)

Figure 47:
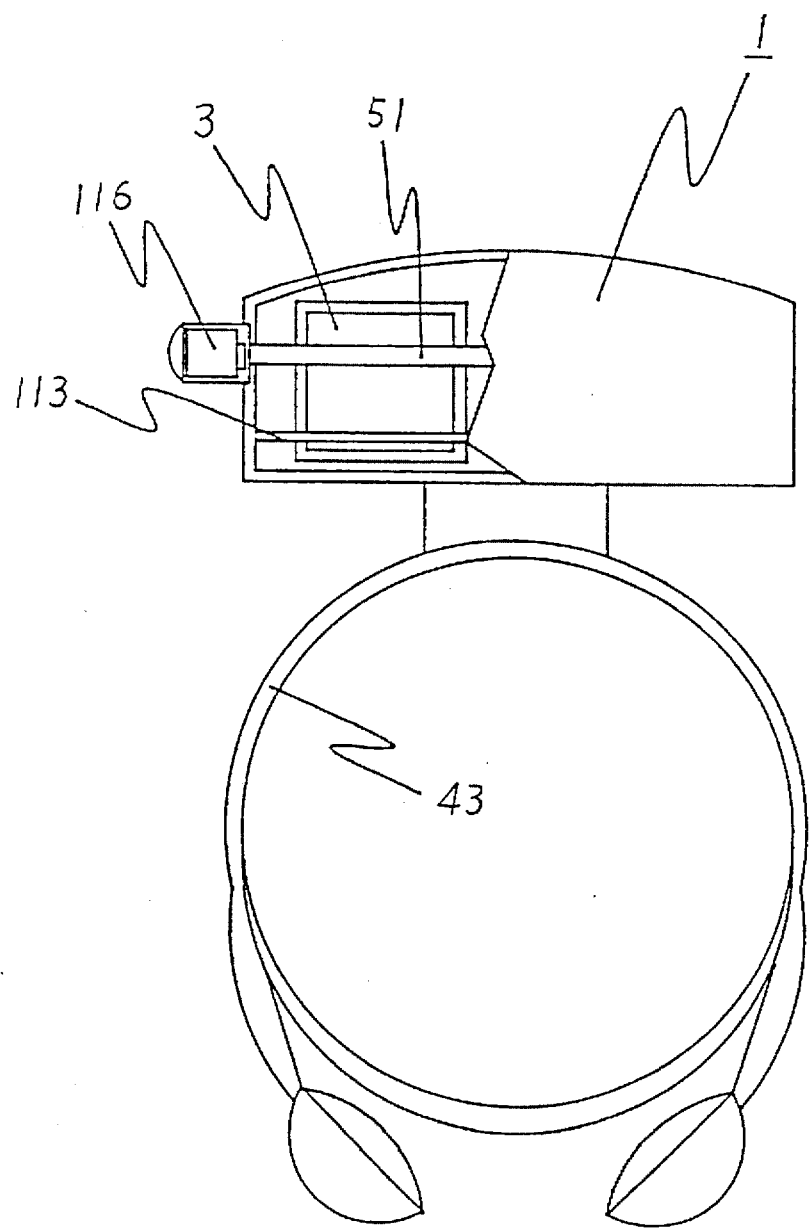
FIG. 47 is a model top view showing a seventeenth embodiment of this invention.
Figure 48:
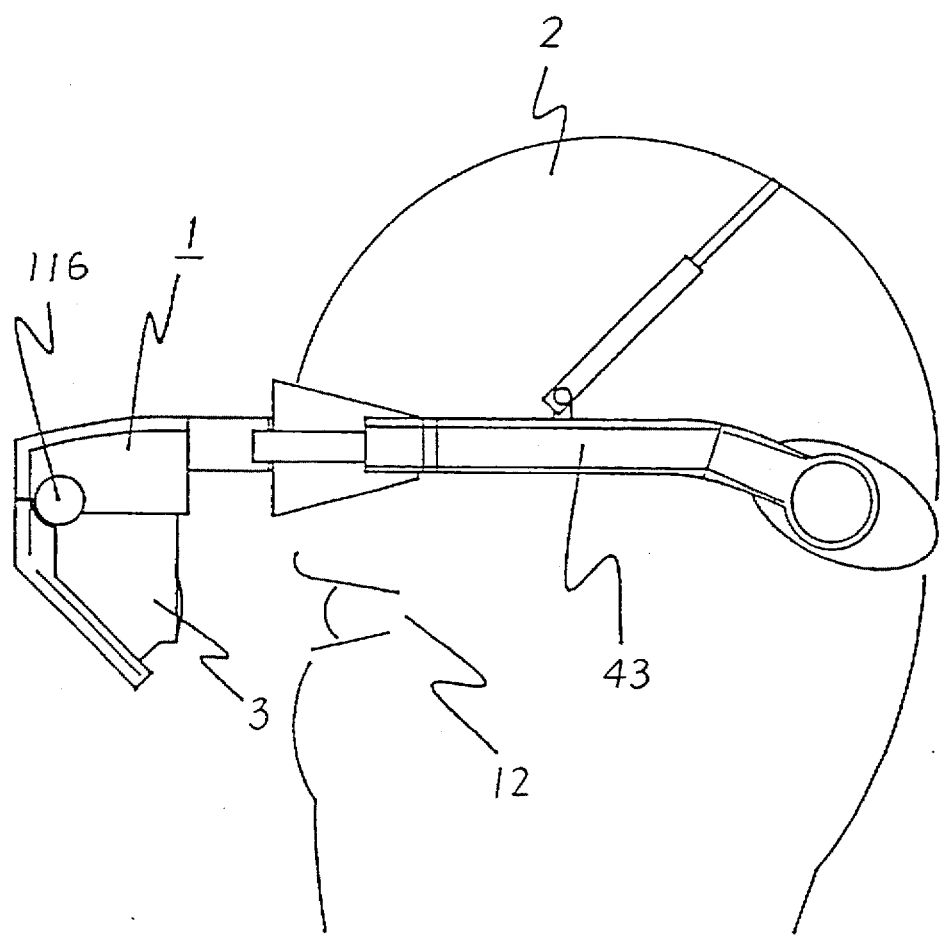
FIG. 48 is a model side view showing the seventeenth embodiment.

FIGS. 47 and 48 are model drawings showing a fourteenth embodiment of this invention. FIG. 47 is a top view, and FIG. 48 is a side view. The internal structure of the virtual image forming optical system 3 is the same as in the embodiment in FIG. 44, and its description is thus omitted.

The device main body 1 includes the virtual image forming optical system 3 located in front of one eye of the user 2. The virtual image forming optical system 3 is spirally connected to the shaft 51 retained so as to rotate without affecting the device main body 1, extending approximately in the direction of the width of the user's eye, and shaped like a screw, and engages the holding section 43. The shaft 51 has on its side a motor 116 that acts as a drive means, and driving the motor 116 causes the shaft 51 to rotate without affecting the device main body 1. The virtual image forming optical system 3 spirally connected to the shaft 51 can thus be moved approximately in the direction of the width of the user's eye. The virtual image forming optical system 3 can be moved more stably by providing the optical system 3 with the guide shaft 113 or the guide plane in parallel with the shaft 51.

To move and position the virtual image forming optical system 3 in front of the right or left eye, the user 2 puts out the back light 8, uses the pupil detection sensor 111 to detect the position of his or her pupil, and feeds the result back to the drive circuit 75. The drive circuit 75 compares data on the quantity of reflected light transmitted from the pupil detection sensor 111, to the preset quantity of reflected light. Based on the results of the comparison, the drive circuit 75 controls its own driving power for moving the virtual image forming optical system 3.

As described above, the virtual image forming optical system 3 can be moved approximately in the direction of the width of the user's eye, and the pupil detection sensor 111 can be used to accurately and easily adjust the position of the optical system 3 to the position of the pupil. As a result, the user 2 is prevented from moving his or her eyeballs unnaturally, so the fatigue of the eyes caused by the misalignment of the user's pupil with the device is avoided, and the structure of the associated adjustment mechanisms is simplified.

Furthermore, positions can be automatically adjusted, so the device can be mounted easily, and the mounting and removal of the device can be repetitively carried out in the same manner.

The position of the pupil detection means is not limited to the one in FIG. 44, and this embodiment is also applicable to the positions in FIGS. 45 and 46.

(Embodiment 18)

Figure 49:
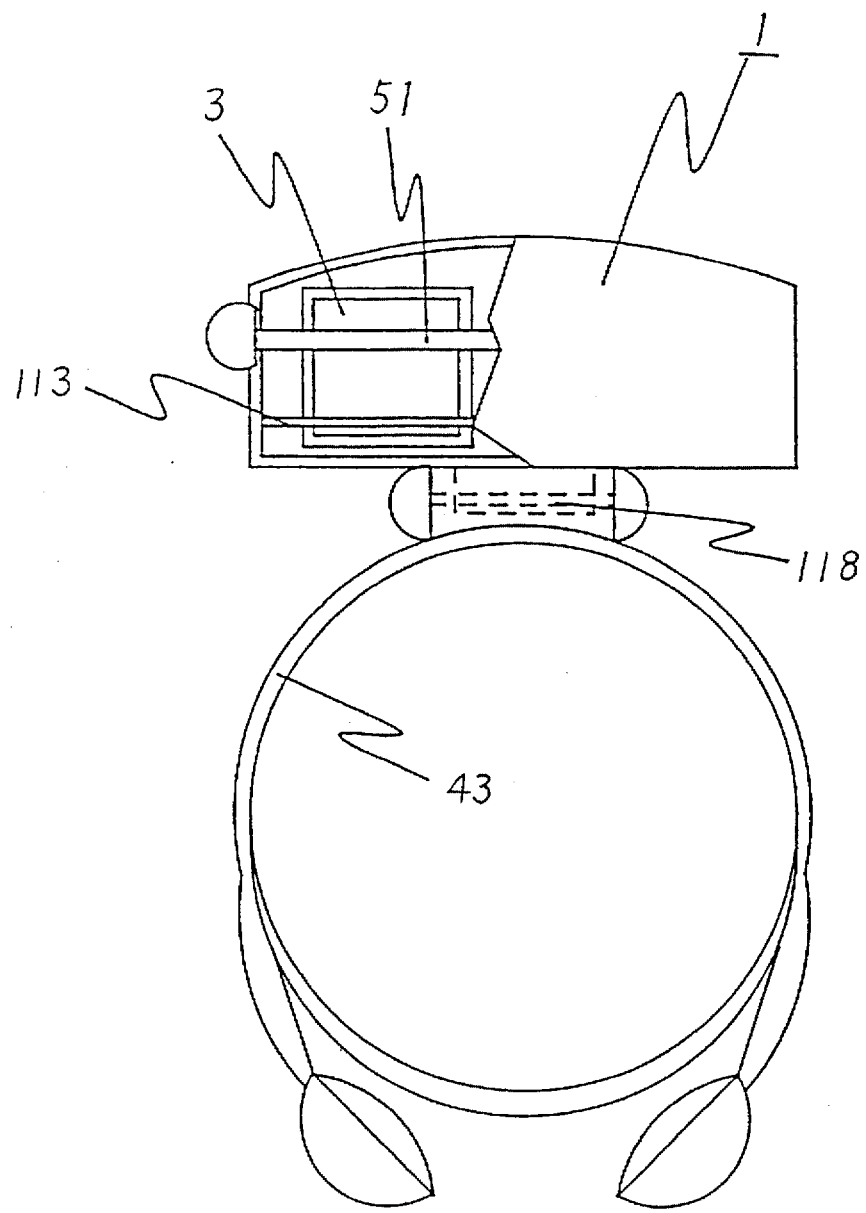
FIG. 49 is a model top view showing an eighteenth embodiment of this invention.
Figure 50:
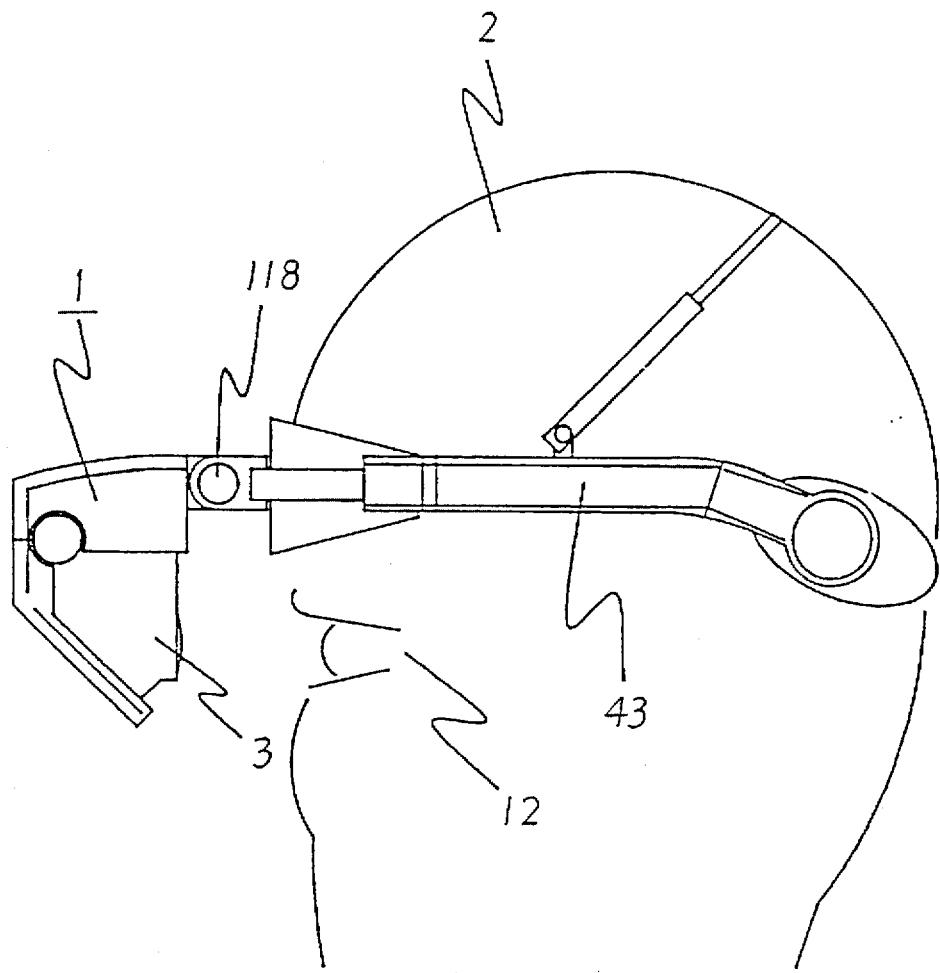
FIG. 50 is a model side view showing the eighteenth embodiment.

FIGS. 49 and 50 are model drawings showing an eighteenth embodiment of this invention. FIG. 49 is a top view, and FIG. 50 is a side view. The internal structure of the virtual image forming optical system 3 and the device main body 1 are the same as in the above embodiment, so they carry the same reference numerals, and their description is thus omitted.

The device main body 1 engages the holding section 43 via a hinge section 118, and the angle between the device main body 1 and the holding section 43 can be varied via the hinge section 118. That is, the inclination of the virtual image forming optical system 3 relative to the user's eye 12 can be corrected. In this embodiment, any of the constitutions of Embodiments 14 to 17 can be used to inform the user of misalignment caused by the inclination of the virtual image forming optical system 3.

The user 2 may adjust the inclination of the device main body 1, in particular, the virtual image forming optical system 3, via the hinge section 118 until the alarm from the means for informing the user of misalignment is cleared.

As described above, the inclination of the virtual image forming optical system 3 can be corrected accurately and easily based on the position of the pupil determined by the pupil detection sensor 111. As a result, the user 2 is prevented from moving his or her eyeballs unnaturally, so the fatigue of the eyes caused by the misalignment of the user's pupil with the device is avoided, and the structure of the associated adjustment mechanisms is simplified.

The hinge section 118 can be folded toward the holding section 43 to save space.

Although the construction for correcting the inclination can be used independently, using this constitution with the above Embodiments (FIGS. 44 to 48) enables both the horizontal position and the inclination to be adjusted accurately and easily, thereby minimizing the resultant fatigue.

In this case, the same pupil detection means can be used.

(Embodiment 19)

Figure 51:
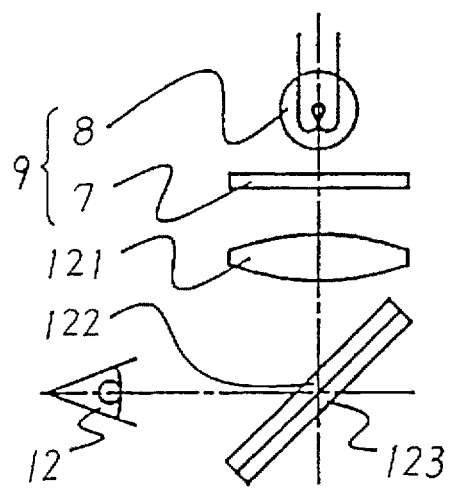
FIG. 51 schematically describes the configuration of a virtual image forming optical system representing a nineteenth embodiment of this invention.

FIGS. 51 to 54 are model drawings showing an embodiment in which the head-mounted display device according to this invention is used with a keyboard. The optical system in a monitor section comprises the image display element 9 consisting of the liquid crystal panel 7 and the back light 8, an enlarging lens 121, a partially transparent mirror 122 the rear surface of which is a reflection surface, and a full reflection mirror 123 the front surface of which is a reflection surface, as shown in FIG. 51. The full reflection mirror 123 can be arbitrarily switched between its closed state in FIG. 51 and its open state in FIG. 52. In the open state of the full reflection mirror 123 shown in FIG. 52, an image formed by the liquid crystal panel 7 is reflected by the rear surface of the partially transparent mirror 122, and enters the observing eye 12, while simultaneously an image of an external sight such as a keyboard also enters the observing eye 12. In the closed state of the full reflection mirror 123 shown in FIG. 51, that light of an image formed by the liquid crystal panel 7 which has penetrated the partially transparent mirror 122 is reflected by the surface of the full reflection mirror 123 and enters the partially transparent mirror 122. The reflection surfaces of the partially transparent mirror 122 and the full reflection mirror 123, however, adhere to each other, so that light becomes a double image, which never enters the observing eye 12. In this case, only the image light formed by the liquid panel 7 enters the observing eye 12 with little loss. As shown in can move along a s section 130 can move along a slide groove section 125 in a frame 124. The monitor section 130 is attached to the frame 124 by the tightening of a fixing screw 126, and fixed by a fixing control 127. Signals and power are supplied to the monitor section 130 via a cable 128.

Figure 52:
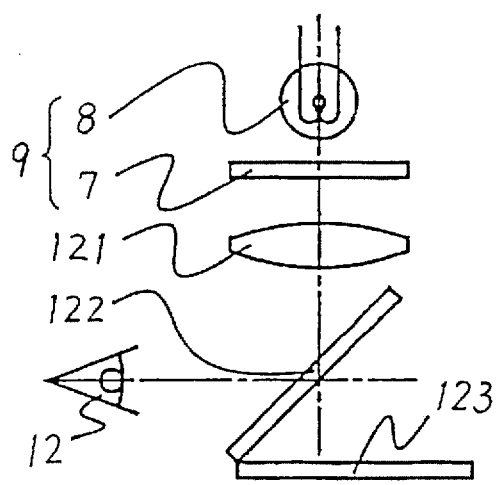
FIG. 52 schematically shows a method for using the virtual image forming optical system in FIG. 51.
Figure 53:
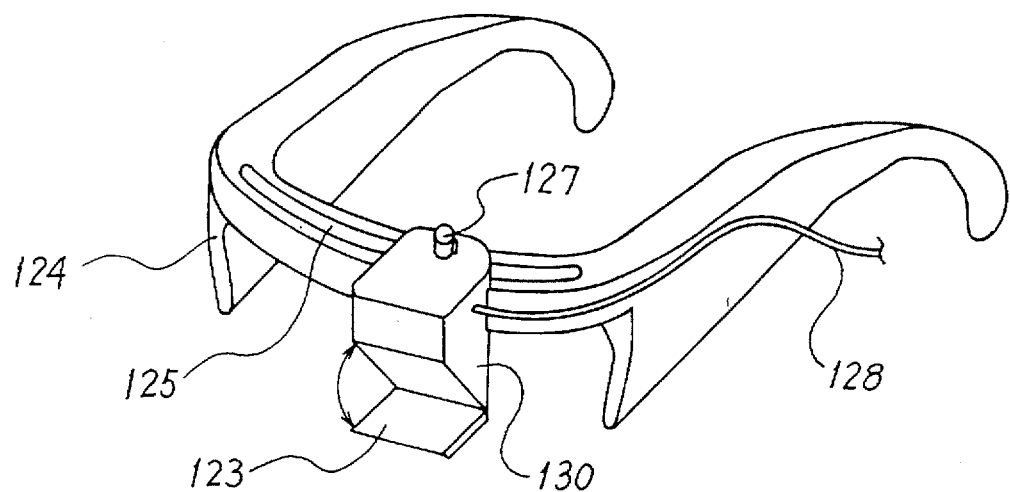
FIG. 53 is a perspective view of a head-mounted display device representing the nineteenth embodiment.
Figure 54:
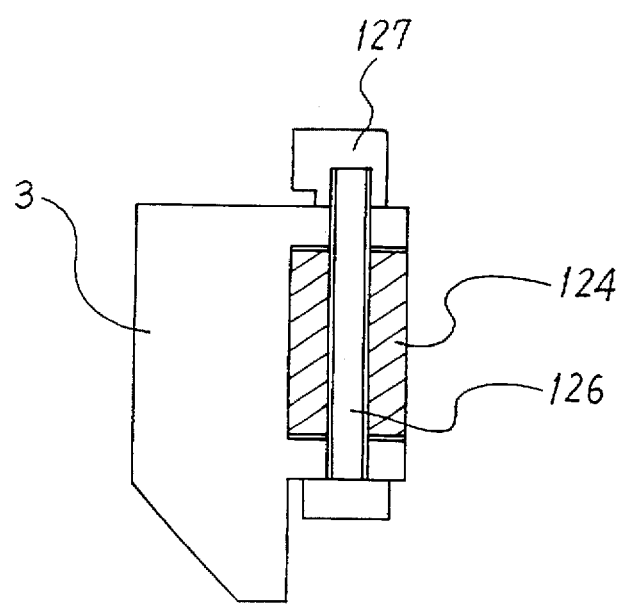
FIG. 54 is a schematic cross section of a monitor section mounting structure-according to the nineteenth embodiment.

Before starting an operation, the operator can view an image formed by the liquid crystal panel 7 and an overlapping image of objects around the operator including the keyboard, with the full reflection mirror 123 set in the open state as shown in FIG. 52. In this state, the visual distances between the operator's eye and the virtual image and between the eye and the keyboard can be adjusted accurately by moving the liquid crystal panel 7 in the direction of the optical axis to vary the length of the optical path in order to adjust the diopter between the image and the keyboard. Furthermore, since the monitor section 130 can be moved along the slide groove section 125 in the frame 124 as shown in FIG. 53, the selection of the eye over which the monitor section will be placed, the provision of appropriate settings for the visual line, and the arrangement of the positions of the image and the keyboard can be carried out flexibly and accurately. The operator subsequently switches to the full reflection mirror 123 to its closed state to start an operation. This saves the operator focusing for his or her eye which may be required due to the difference between the visual distances to the image and to the keyboard when the operator's glance is switched between the image and the keyboard, thereby significantly increasing working efficiency to substantially reduce his or her fatigue. Although in this embodiment, the full reflection mirror 123 can be opened and closed using one end of it as a support point, the same effect can be produced with a detachable structure.

(Embodiment 20)

Figure 55:
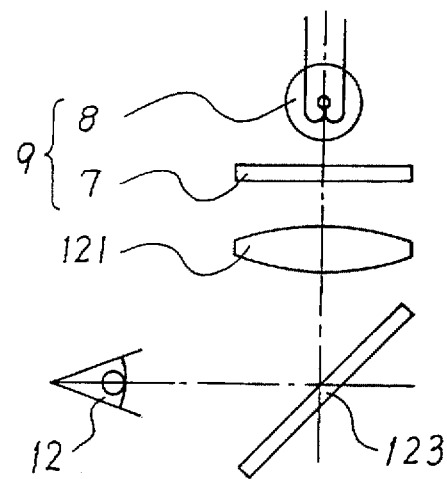
FIG. 55 schematically describes the constitution of a virtual image forming optical system showing a twentieth embodiment of this invention.
Figure 56:
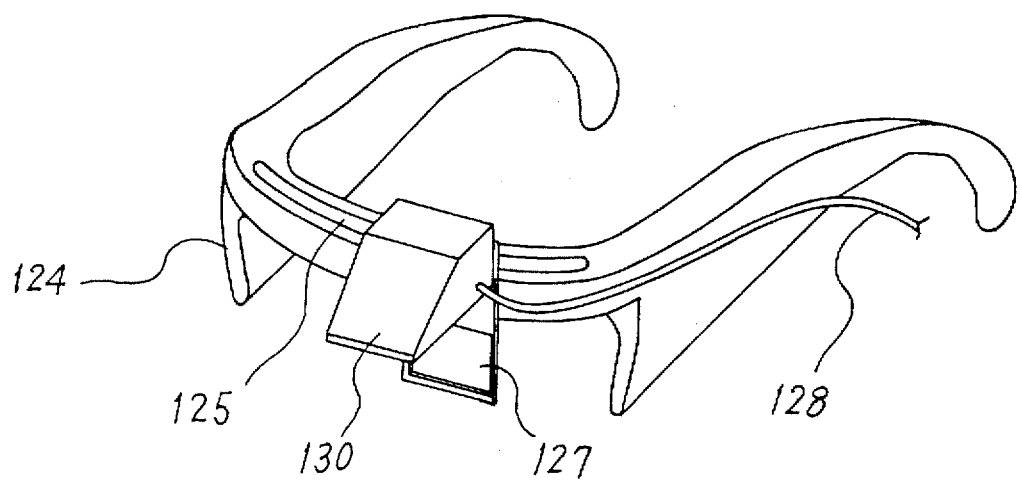
FIG. 56 is a perspective view of a head-mounted display device representing the twentieth embodiment.
Figure 57:
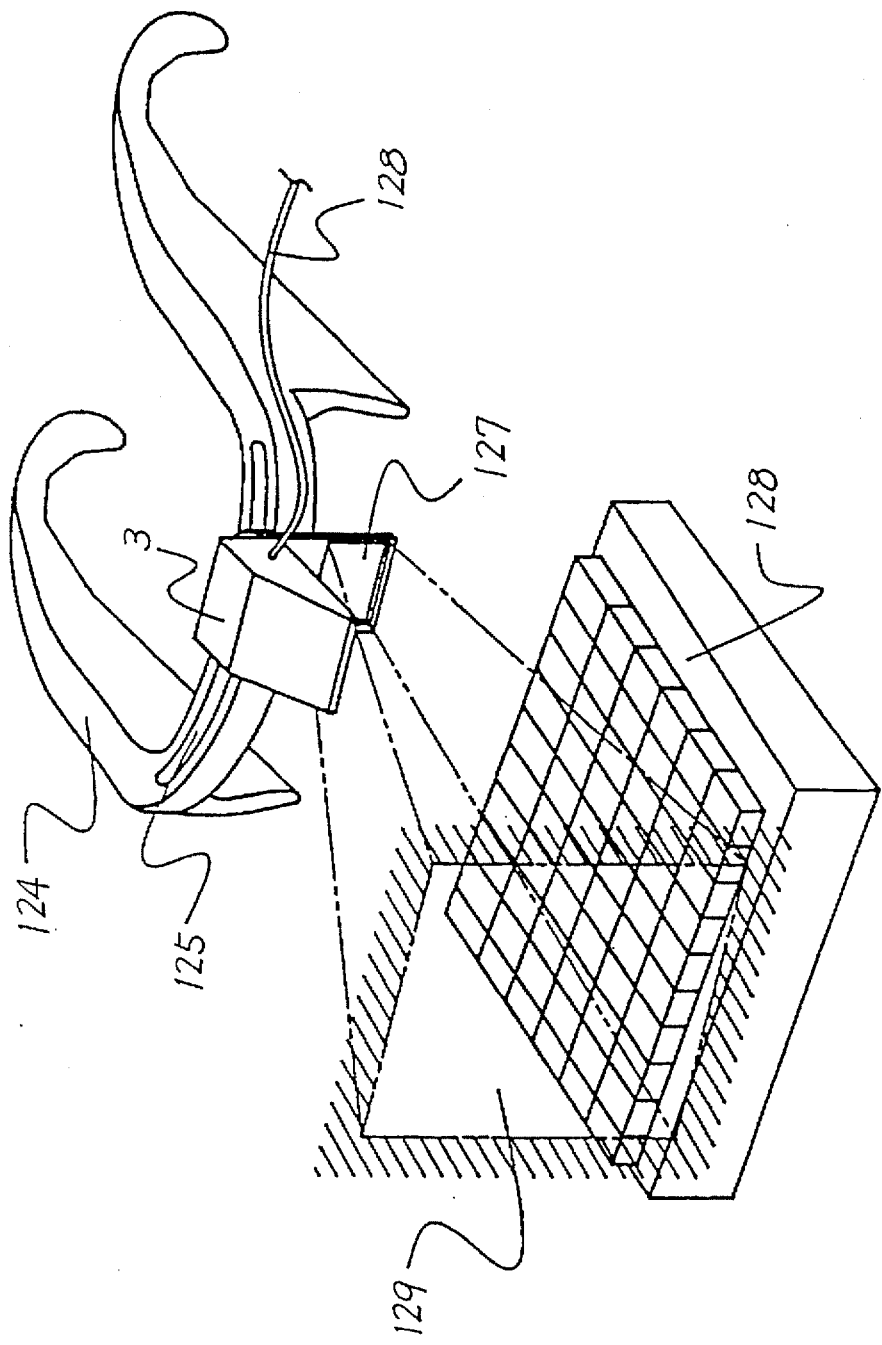
FIG. 57 describes the layout of an image and a keyboard according to the twentieth embodiment.

FIGS. 55 to 57 are model drawings showing another embodiment in which the head-mounted display device according to this invention is used with a keyboard. The optical system in a monitor section comprises the image display element 9 consisting of the liquid crystal panel 7 and the back light 8, the enlarging lens 121, and the full reflection mirror 123 the front surface of which is a reflection surface, as shown in FIG. 55. The monitor section 130 in FIG. 56 is fixed to an observation window 127 via a hinge, and the observation window 127 is rotatably mounted along the slide groove section 125 in the frame 124. The mounting structure is the same as in the above embodiment (FIG. 54), and its figure and description are thus omitted. The opening of the observation window 127 is the same size as the external shape of the screen of the monitor section, and the position of the observation window 127 is set so that the cross section of the field of view used when the virtual image is viewed aligns with the opening of the observation window 127.

Before staring an operation, the operator springs up the monitor section 130 so that it rests above the field of view, and moves the observation window 127 along the slide groove section 125 while viewing the external sight through the observation window 127, thereby selecting the eye over which the monitor section will be placed, adjusting the visual line, and arranging the positions 129 of the image and the keyboard 128. The monitor section 130 is then lowered and fixed. This enables the positions of the image and the keyboard to be determined flexibly and accurately, thereby preventing the two-dimensional overlapping of the image and the keyboard to improve working efficiency and to reduce the user's fatigue.

(Embodiment 21)

Figure 58:
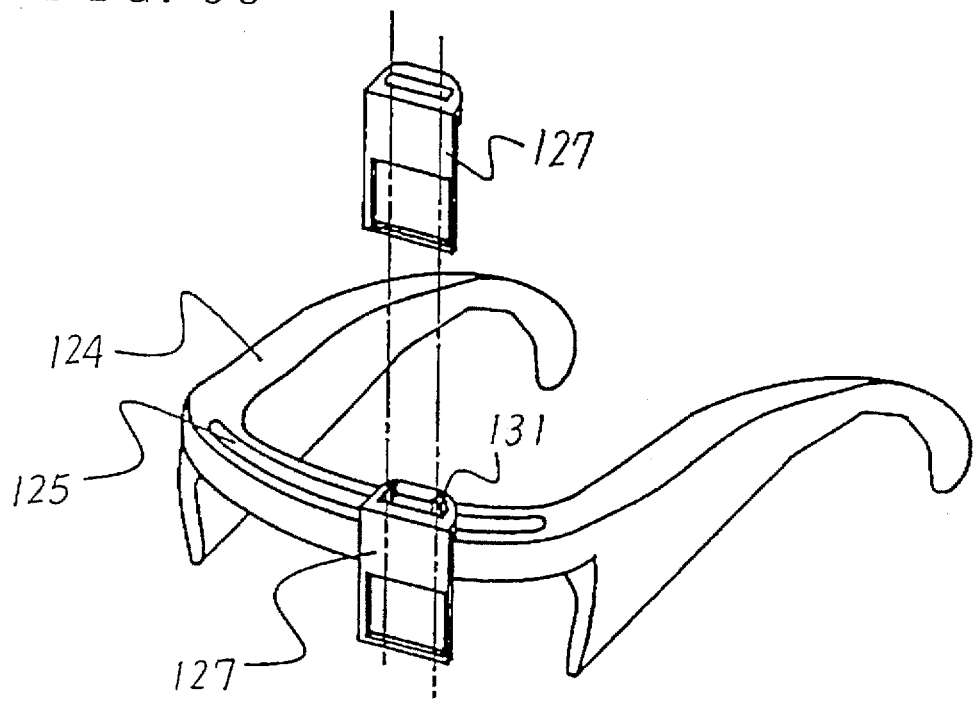
FIG. 58 is a perspective view describing a method for adjusting a head-mounted display device representing a twenty first embodiment of this invention.
Figure 59:
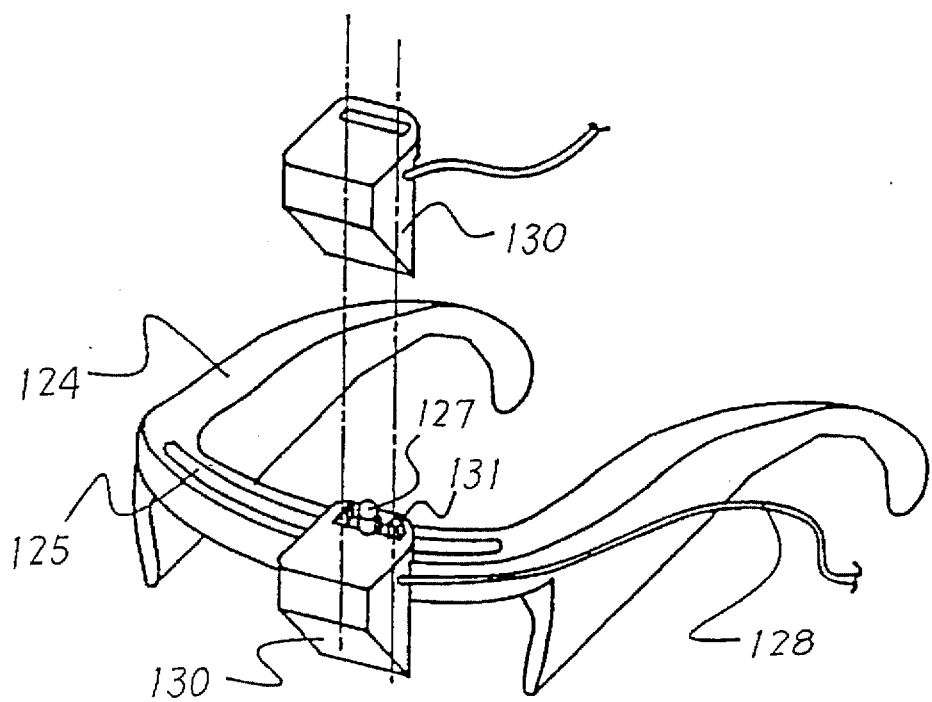
FIG. 59 is a perspective view describing a method for adjusting the head-mounted display device representing the twenty first embodiment of this invention.
Figure 60:
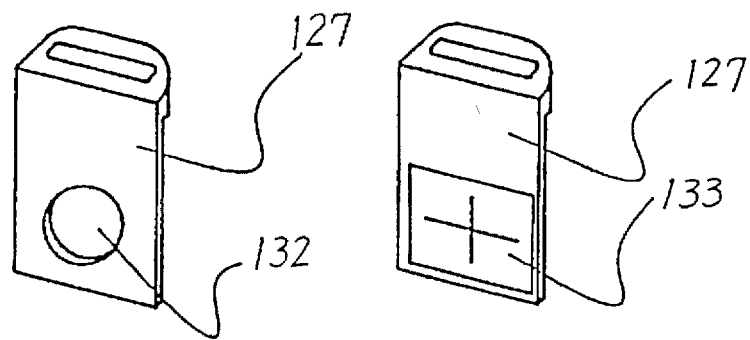
FIG. 60 is a perspective view showing, a window representing the twenty first embodiment.

FIGS. 58 to 60 are model drawings showing another embodiment in which the head-mounted display device according to this invention is used with a keyboard. The optical system in the monitor section is the same as in the embodiment in FIGS. 55 to 57, and its figure and description are thus omitted. As shown in FIGS. 58 and 59, the observation window 127 and the monitor section 130 are detachably attached to a fixed claw 131 movably disposed along the slide groove section 125 of the frame 124. The fixing structure is the same as in the above embodiment (FIG. 54), and its figure and description are thus omitted. The opening of the observation window 127 is the same size as the external shape of the screen of the monitor section, and the position of the observation window 127 is set so that the cross section of the field of view used when the virtual image is viewed aligns with the opening of the observation window 127.

As shown in FIG. 58, the operator attaches the observation window 127 to the fixing claw 131 that can be moved along the slide groove section 125, and moves the window 127 while viewing relevant objects through it in order to select the eye over which the monitor section will be placed, to adjust the visual line, and to determine the positions of the image and the keyboard. The operator then removes the observation window 127, and attaches and fixes the monitor section 130 to the position determined using the observation window 127 as shown in FIG. 59. This enables the positions of the image and the keyboard to be determined flexibly and accurately, thereby preventing the two-dimensional overlapping of the image and the keyboard to improve working efficiency and to reduce the user's fatigue.

The shape of the opening of the observation window is not limited to the one in this embodiment, and this invention is applicable to a round opening 132 or a crossed opening 133 formed in the observation window 127 of a transparent material with a cross section marked on the center thereof in order to enable more accurate settings for the image, as shown in FIG. 60.

(Embodiment 22)

There have been some reports on VDT operators' postures during operation. One example is from Nikkei Electronics, 1984.1.2, p. 158. Based on this report and the inventor's measured values, it can be said that the average distance from the operator's eyes to an inputting keyboard is 60 cm.

VDT operators do not necessarily assumes such a posture. The inventor randomly selected 20 VDT operators, and measured their postures during operation. Thirteen operators assumed a posture similar to that indicated in the above report, while other four preferred almost fully stretching their arms. Four of those who assumed the reported posture periodically stretched their arms during long time VDT operations. This is probably due to the operators' preference and intention to relax their bodies by changing their postures. The distance from these operators to the inputting keyboard was about 80 to 100 cm.

Three operators wore nearsight spectacles and took them off during VDT operation. They were closer to the inputting keyboard during operation.

This is, of course, due to their intention to view the keyboard more clearly. The distance from these operators to the inputting keyboard was 40 to 50 cm.

Nine operators wore nearsight spectacles, and the three of them who took them off during operation had an eyesight of 0.3 or higher. Other six operators had an eyesight of lower than 0.3, and wore their spectacles on during VDT operation.

It can thus be said that many of those nearsighted people who take off their spectacles during VDT operation have an eyesight of 0.3 or higher. The eyesight of 0.3 corresponds to a spectacle diopter of about −2D, which further corresponds to the distance of 40 to 50 cm between the eyes and the keyboard.

Based on the results of these measurements, the inventor constructed a virtual image forming mechanism for the head-mounted display device according to this invention. This mechanism is described with reference to FIGS. 61, 62A, and 62B.

Figure 61:
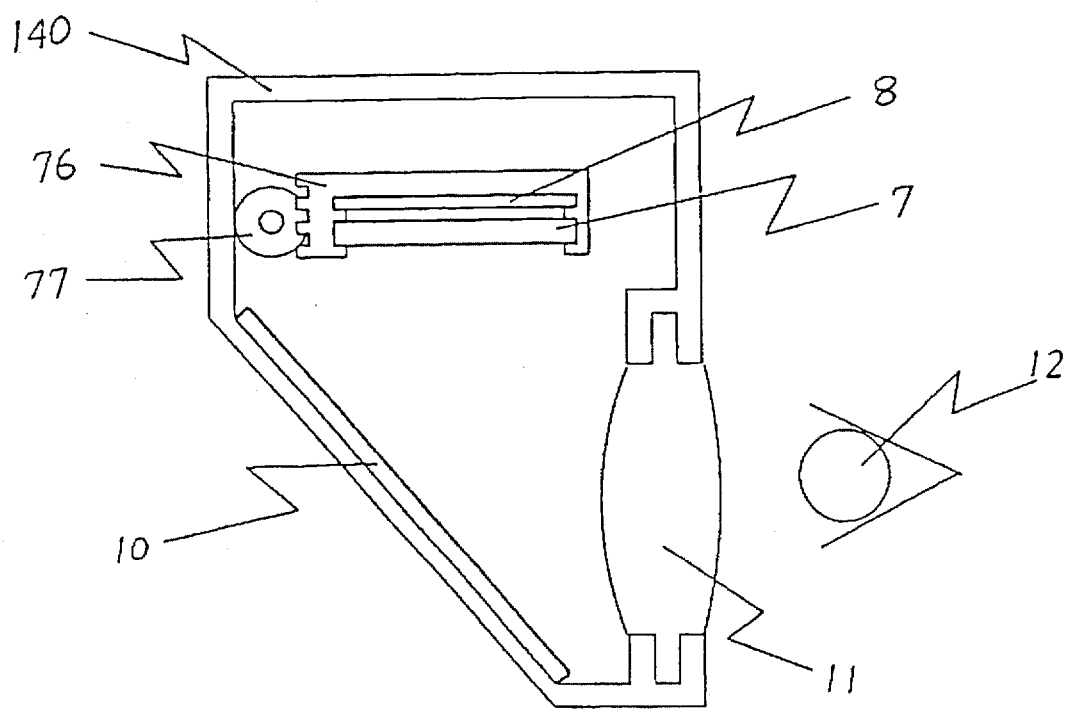
FIG. 61 describes the arrangement of the components of a virtual image forming optical system in a head-mounted display device according to a twenty second embodiment of this invention.

FIG. 61 shows the arrangement of the components of this embodiment. The liquid crystal pale 7 is fixed to the inside of the frame 76 including a rack section, and the gear 77 that engages the frame 76 is disposed in the rack section. Light output from the liquid crystal panel 7 is reflected by the mirror 10, enlarged by the lens 11, and then enters the operator's eye 12. These components are all housed in the housing case 140. This configuration is the same as in the above embodiments.

Figure 62A:
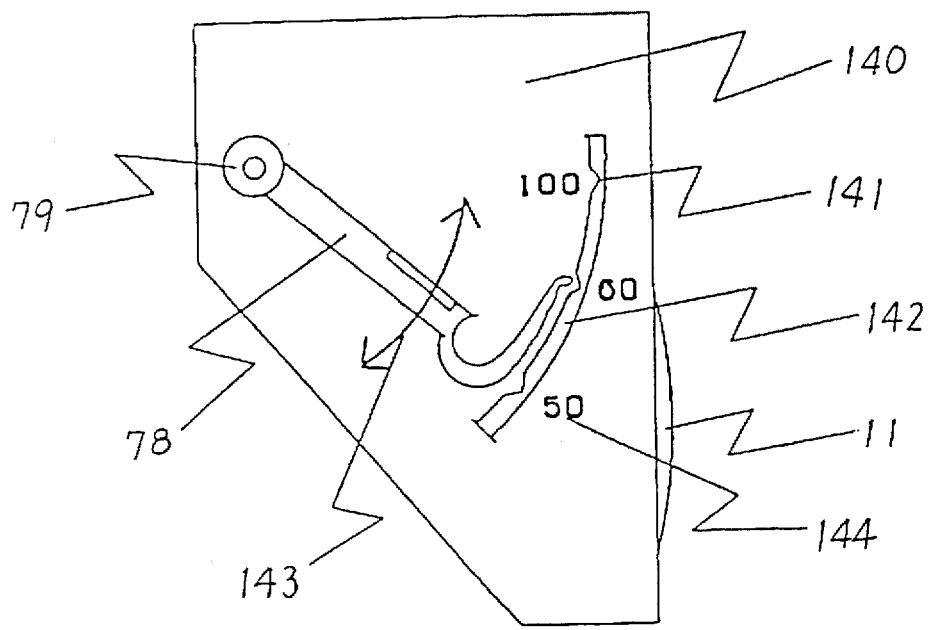
FIGS. 62A and 62B describe a diopter adjustment mechanism according to the twenty second embodiment.
Figure 62B:
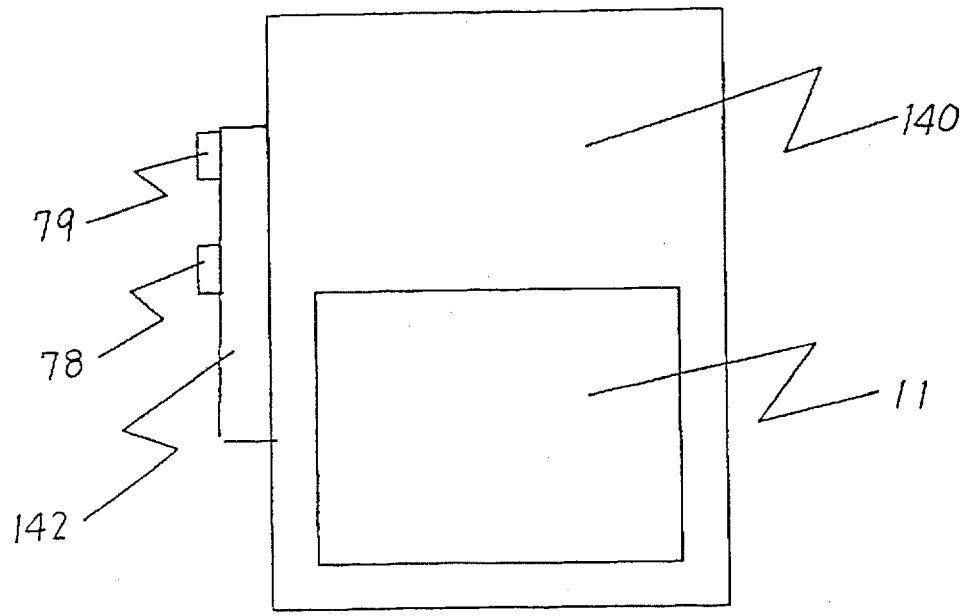

FIGS. 62A and 62B are sketch drawings of the housing case 107 in FIG. 61. FIG. 62A is a side view, and FIG. 62B is a view seen from the operator. The housing case 140 includes on its side the diopter adjustment control 78 connected to the gear 77 in FIG. 61 via the screw 79 through a hole provided in the housing case. The tip of the diopter adjustment control contacts a guide 142 integrally molded in the housing case 140 and having notches 141, and is frictionally retained by the elasticity the diopter adjustment control 78.

By moving the diopter adjustment control 78 along the guide 142 in the direction shown by arrow 143, the operator can rotate the gear 77 in FIG. 61 to accordingly vary the optical distance between the liquid crystal panel 7 and the lens in order to adjust the diopter.

An image formation distance 144 corresponding to the optical distance between the liquid crystal panel 7 and the lens 11 is displayed on the guide 142, so the operator can set an virtual image at an image formation distance most suitable for his or her VDT operation.

Although this embodiment has been described in conjunction with the lever type diopter adjustment control, this invention is not limited to this aspect, but is applicable to, for example, a dial type diopter adjustment control.

In this embodiment, the image formation distance was set 100 cm at maximum and 50 cm at minimum. This setting can reduce the range of setting errors in the image formation distance as well as the size of the diopter adjustment mechanism.

The notches 141 are positioned so as to correspond to the image formation distances of 50, 60, 100 cm. The results of the above measurements indicate that in many cases, the virtual image is preferably formed at such distances, and fixing the diopter adjustment control so as to correspond to these distances usually enables the operator to adjust the diopter quickly. In addition, even when the operator has changed his or her posture, he or she can adjust the diopter adequately with the head-mounted liquid crystal display device on using the positions of the notches 141 as references.

When this head-mounted liquid crystal display device is used, the image formation distance is set at 60 cm if the operator assumes the reported normal VDT operation posture. It is set at 100 cm if the operator stretches their arms during operation, while it is set at 50 cm if the operator usually wears spectacles and takes them off during operation. These settings substantially eliminate the need to vary settings for the liquid crystal when the operator switches his or her line of sight between the inputting keyboard and the enlarged image, thereby significantly reducing the user's fatigue.

To confirm the effects of this invention, the inventor had some operators perform VDT operations using the head-mounted liquid crystal display device according to this invention, a conventional head-mounted liquid crystal display device, and a conventional CRT monitor to compare the results. The results are shown in Table 3. The same 20 operators each performed each VDT operation for one hour. In this table, the error indicates the value of the largest error in diopter in each operation, and the number of operators who had a sense of fatigue denotes the number of operators who sensed a fatigue of the eyes after the operation.

TABLE 3

| Evaluation item | CRT | Head-mounted display device according to this invention | Conventional head-mounted display device |
| --- | --- | --- | --- |
| Error in diopter | 0.2D | 0.3D | 1.2D |
| Number of operators who had sense of fatigue | 3 | 5 | 16 |

As is apparent from the table 3, when the head-mounted liquid crystal display device according to this invention was used, the difference between the diopter for the inputting keyboard and the diopter for the enlarged virtual image is significantly small and generally similar to that for the CRT monitor. The difference, however, is relatively large for the conventional head-mounted liquid crystal display device.

The operators' fatigue from the head-mounted liquid crystal display device according to this invention is similar to that from the CRT monitor, and clearly much smaller than from the conventional head-mounted liquid crystal display device.

What is claimed is:

1. A head-mounted display device comprising a virtual image forming optical system including an image display element and an enlarging optical means for enlarging an image formed by said image display element as a virtual image; a device main body that houses said image forming optical system; and a switching means mounted in said device main body for holding said virtual image forming optical system in such a way that the system can be moved in the direction of the width of user's eyes and placing said virtual image forming optical system in front of one of the user's eyes, wherein:

said image display element and said enlarging optical means are disposed so that the optical axis of said virtual image forming optical system approximately aligns with the user's line of sight taken while he or she is looking horizontally.

2. A head-mounted display device according to claim 1 wherein said switching means comprises a shaft that is retained so as to rotate without affecting said device main body, that extends approximately in the direction of the width of the user's eyes, that is shaped like a screw, and that has said virtual image forming optical system spirally fitted thereto.

3. A head-mounted display device according to claim 1 further having a partially transparent shading plate provided in front of the eye that need not see an image enlarged by said enlarging optical means and having a transmittance of less than 1.

4. A head-mounted display device according to claim 3 further having a control means for variably controlling the transmittance of said partially transparent shading plate according to the surrounding illuminance.

5. A head-mounted display device according to claim 4 wherein the transmittance of said partially transparent shading plate is controlled so as to be 3% or less.

6. A head-mounted display device according to claim 4 wherein the transmittance of said partially transparent shading plate is controlled so as to increase when the surrounding illuminance is 1001× or less.

7. A head-mounted display device according to claim 3 further having a partially transparent shading plate with a transmittance of less than 1 which is provided in a space opposite to the user relative to said virtual image forming optical system to cover at least the overall movement area of said virtual image forming optical system.

8. A head-mounted display device according to claim 1 further having a control means for variably controlling the brightness of said virtual image forming optical system based on the surrounding brightness under said device main body and near the user's hands while the device is in use.

9. A head-mounted display device according to claim 8 wherein the brightness of said virtual image forming optical system is controlled so as to be equal to said surrounding brightness.

10. A head-mounted display device according to claim 8 wherein the brightness of said virtual image forming optical system is controlled so as to be approximately in proportion to said surrounding brightness.

11. A head-mounted display device according to claim 1 further having a diopter adjustment means for adjusting the position in which an enlarged virtual image from said image display element is formed.

12. A head-mounted display device according to claim 11 wherein said diopter adjustment means further has a diopter adjustment control provided on both sides of said virtual image forming optical system.

13. A head-mounted display device according to claim 11 wherein the conditions of said diopter adjustment means are shown so as to correspond to the position in which said virtual image is formed.

14. A head-mounted display device according to claim 11 wherein the position in which said enlarged virtual image is formed can be set stepwise at one of a plurality of positions using said diopter adjustment means.

15. A head-mounted display device according to claim 1 further having a holding means attached to said device main body via a rotatable hinge section for holding said device main body to the user's head.

16. A head-mounted display device according to claim 1 further having a drive circuit fixed and disposed outside the movement space in the transverse movement area of said virtual image forming optical system for driving said image display element; and a flexible printed circuit interposed between said image display element and said drive circuit for connecting them together.

17. A head-mounted display device according to claim 16 wherein said drive circuit has a detachable part disposed approximately in parallel with the direction of the width of the user's eyes for allowing said flexible printed circuit to be attached to or removed from said drive circuit in the direction that aligns with the lateral moving direction of said virtual image forming optical system, and further has a guide means disposed between said detachable part and said image display element for guiding said flexible printed circuit approximately perpendicular to the lateral moving direction of said virtual forming optical system.

18. A head-mounted display device according to claim 1 further having a center determination support means provided in the approximate center of said device main body and used to determine whether or not the user's center line aligns with the center of the device main body while the device is in use.

19. A head-mounted display device according to claim 1 further having an antidominant eye determination support means provided in the approximate center of said device main body and used to determine the antidominant eye.

20. A head-mounted display device according to claim 1 wherein said virtual image forming optical system has a partially transparent mirror and further has a pupil detection means disposed in the position corresponding to the optical axis of said optical system for detecting the position of the user's pupil via said partially transparent mirror, and a means for informing the user of the misalignment of said virtual image forming optical system with the pupil in response to the output of said pupil detection means.

* * * * *